(12) United States Patent
Sarlioglu et al.

(10) Patent No.: US 12,355,328 B2
(45) Date of Patent: Jul. 8, 2025

(54) ELECTRICAL MACHINE COOLING WITH AXIAL AND RADIAL INLETS AND OUTLETS

(71) Applicant: Wisconsin Alumni Research Foundation, Madison, WI (US)

(72) Inventors: Bulent Sarlioglu, Madison, WI (US); Gregory F. Nellis, Waunakee, WI (US); Leyue Zhang, Madison, WI (US); Hao Ding, Carson, CA (US)

(73) Assignee: Wisconsin Alumni Research Foundation, Madison, WI (US)

( * ) Notice: Subject to any disclaimer, the term of this patent is extended or adjusted under 35 U.S.C. 154(b) by 299 days.

(21) Appl. No.: 17/937,798

(22) Filed: Oct. 4, 2022

(65) Prior Publication Data

US 2023/0112852 A1 Apr. 13, 2023

Related U.S. Application Data

(60) Provisional application No. 63/253,634, filed on Oct. 8, 2021.

(51) Int. Cl.
*H02K 5/20* (2006.01)
*H02K 1/20* (2006.01)
*H02K 1/32* (2006.01)

(52) U.S. Cl.
CPC ............... *H02K 5/20* (2013.01); *H02K 1/20* (2013.01); *H02K 1/32* (2013.01)

(58) Field of Classification Search
CPC .. H02K 5/20; H02K 1/20; H02K 1/32; H02K 5/207; H02K 2201/03; H02K 9/06; H02K 1/276
See application file for complete search history.

(56) References Cited

U.S. PATENT DOCUMENTS 7,021,905 B2 4/2006 Torrey et al.
8,248,302 B2 8/2012 Tsai et al.
(Continued)

FOREIGN PATENT DOCUMENTS

DE 202008015895 U1 * 3/2009 ............. H02K 11/33
WO WO-2021199376 A1 * 10/2021 ............... H02K 1/32

OTHER PUBLICATIONS

DE202008015895U1 English translation (Year: 2024).*
(Continued)

*Primary Examiner* — Christopher M Koehler
*Assistant Examiner* — Viswanathan Subramanian
(74) *Attorney, Agent, or Firm* — Bell & Manning, LLC

(57) ABSTRACT

An electrical machine includes a rotor, a stator, and a winding mounted within a housing. The rotor includes a rotor core mounted to a shaft and a plurality of blades extending radially away from the rotor core. Each blade of the plurality of blades is curved axially along the rotor core. The stator includes a stator core and a plurality of teeth extending from the stator core toward the rotor core to define a plurality of slots between successive teeth. The winding is wound through at least two slots of the plurality of slots. The stator is mounted radially relative to the rotor. The housing includes a front wall, a back wall, and a radial sidewall mounted between the front wall and the back wall to define an enclosure. A radial inlet aperture wall is formed circumferentially through the radial sidewall to form an opening through the radial sidewall.

20 Claims, 55 Drawing Sheets
(12 of 55 Drawing Sheet(s) Filed in Color)

(56) References Cited

U.S. PATENT DOCUMENTS

| | | |
|---|---|---|
| 8,790,236 B2 | 7/2014 | LaRose et al. |
| 10,539,147 B2 | 1/2020 | Sarlioglu et al. |
| 2010/0117475 A1 | 5/2010 | Leonardi et al. |
| 2017/0149308 A1* | 5/2017 | Sayre .................... H02K 5/207 |

OTHER PUBLICATIONS

WO2021199376A1 English translation (Year: 2024).*
NPLDing (Year: 2024).*
NPLZhang (Year: 2024).*
N. Rotevatn, Design and testing of Flux Switched Permanent Magnet (FSPM) Machines, Master of Science in Energy and Environment, Norwegian University of Science and Technology, Department of Electrical Power Engineering, Jun. 2009.
Wang et al., Reduction of Cogging Torque in Permanent Magnet Flux-Switching Machines, J. Electromagnetic Analysis & Applications 1, Mar. 2009, pp. 11-14.
Yang et al., Acoustic Noise/Vibration Reduction of a Single-Phase SRM Using Skewed Stator and Rotor, IEEE Transactions On Industrial Electronics, vol. 60, No. 10, Sep. 6, 2012, pp. 4292-4300.
Zhang, Leyue, et al. "Radial and Axial Inlet and Outlet Design for End Winding Cooling of High-Speed Integrated Flux-Switching Motor-Compressor." 2021 IEEE Energy Conversion Congress and Exposition (Ecce). IEEE, Oct. 2021.
Sayed, Ehab, et al. "A comprehensive review of flux barriers in interior permanent magnet synchronous machines." IEEE Access 7 (2019): 149168-149181.
Mccluskey, F. Patrick, et al. "Cooling for electric aircraft motors." 2019 18th IEEE Intersociety Conference on Thermal and Thermomechanical Phenomena in Electronic Systems (ITherm). IEEE, May 2019. pp. 1134-1138.
Cui, Shumei, et al. "A thermal-electromagnetic coupled motor design flow for electric aircraft propeller drive application." 2017 IEEE Transportation Electrification Conference and Expo, Asia-Pacific (ITEC Asia-Pacific). IEEE, 2017.

* cited by examiner

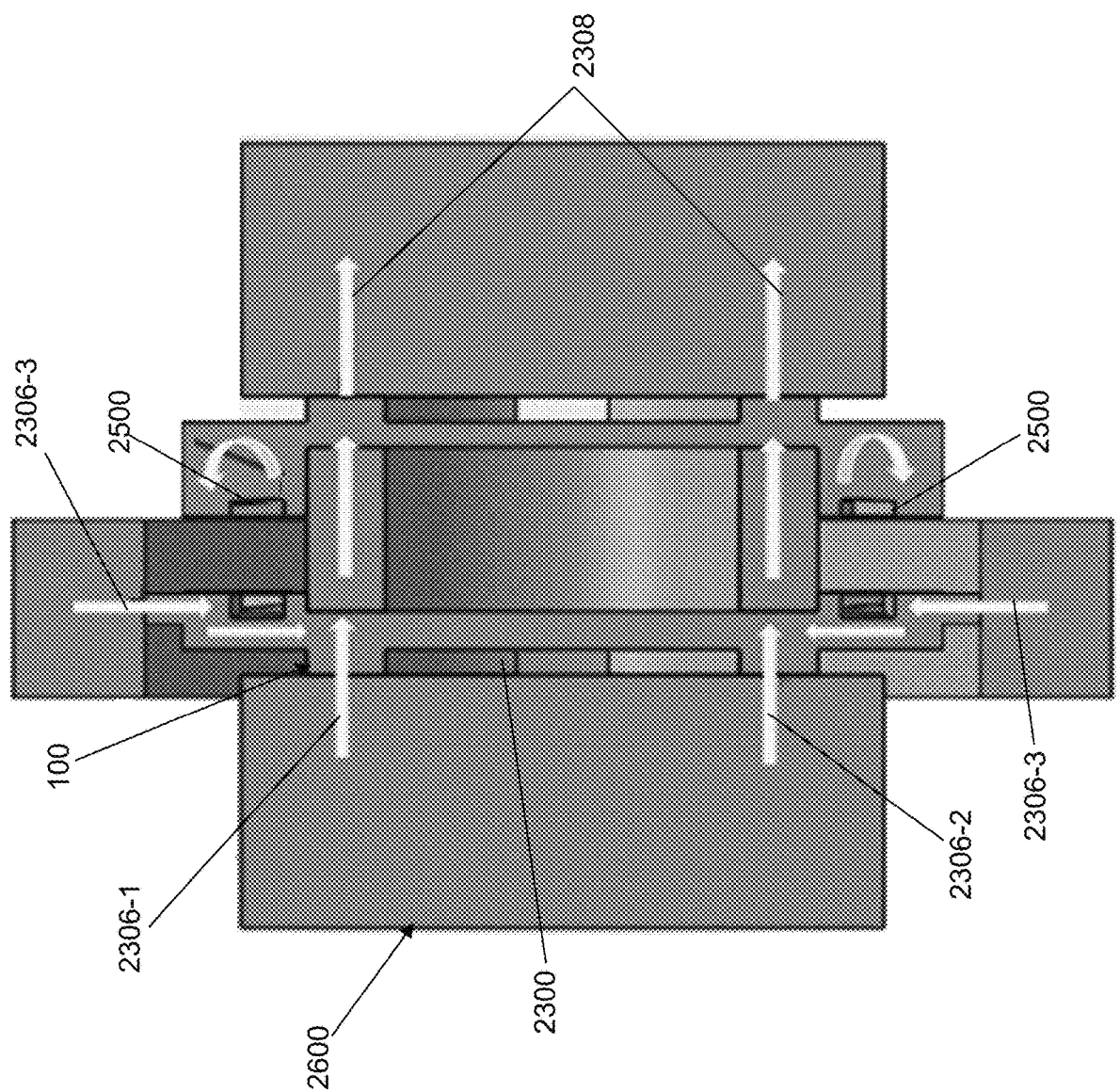

ELECTRICAL MACHINE COOLING WITH AXIAL AND RADIAL INLETS AND OUTLETS

CROSS REFERENCE TO RELATED APPLICATIONS

The present application claims priority to U.S. Provisional Patent Application No. 63/253,634 that was filed Oct. 8, 2021, the entire contents of which are incorporated herein by reference.

REFERENCE TO GOVERNMENT RIGHTS

This invention was made with government support under 1552942 awarded by the National Science Foundation. The government has certain rights in the invention.

BACKGROUND

Electrification in aerospace and automotive systems has attracted more and more attention in recent years to help reduce greenhouse gas emissions and mitigate climate change. Electrical machines need to have high power density, high efficiency, and be compact. In the machine design process, the thermal limit has become a dominant constraint because temperature-sensitive materials are often used to improve power and torque densities. A high winding temperature can lead to large resistance and copper loss.

Permanent magnet (PM) machines are widely used in many sectors (electric vehicles, wind generators, aircraft applications, industrial drives, HVAC) due to their high-power density, high efficiency, and compactness. Almost all electric and hybrid vehicles use PM motors. Conventional permanent magnet machines such as interior permanent magnet (IPM) machines and surface permanent magnet (SPM) machines have their magnets located on or buried in the rotor. Since permanent magnet materials are temperature sensitive, the cooling of the rotor is crucial to avoid the demagnetization of magnets.

Air-cooling and/or liquid-cooling techniques are commonly used for thermal management in electrical machines. Two particular methods, including forced air-cooling and water jacket cooling, focus on the stator and do not efficiently cool the rotor. Direct cooling of the rotor using spray cooling or in-shaft cooling, where oil is brought inside the shaft, is extremely complex and expensive. Similarly, induction motors need to be cooled because of the large conductor losses in the rotor. Therefore, appropriate thermal management is crucial for electrical machine operation. Existing solutions, such as liquid cooling, can be expensive or are not sufficient to keep the machine rotor and the copper windings at the proper temperatures.

SUMMARY

In an example embodiment, an electrical machine includes, but is not limited to, a rotor, a stator, a winding, and a housing. The rotor includes, but is not limited to, a rotor core configured to mount to a shaft for rotation of the rotor core and shaft together and a plurality of blades extending radially away from the rotor core. Each blade of the plurality of blades is curved axially along the rotor core. The stator includes, but is not limited to, a stator core, and a plurality of teeth extending from the stator core toward the rotor core. The plurality of teeth defines a plurality of slots between successive teeth of the plurality of teeth. The winding is wound through at least two slots of the plurality of slots. The stator is mounted radially relative to the rotor. The housing includes, but is not limited to, a front wall, a back wall, and a radial sidewall mounted between the front wall and the back wall to define an enclosure. A radial inlet aperture wall is formed circumferentially through the radial sidewall to form an opening through the radial sidewall. The rotor and the stator are mounted within the enclosure.

In another example embodiment, an electrical machine includes, but is not limited to, a hub, a rotor core, a stator, a winding, and a housing. The hub includes, but is not limited to, a hub core configured to mount to a shaft for rotation of the hub core and shaft together and a plurality of blades extending radially away from the hub core. Each blade of the plurality of blades is curved axially along the hub core. The rotor core is configured to mount to the plurality of blades and is mounted radially relative to the hub. The stator includes, but is not limited to, a stator core and a plurality of teeth extending from the stator core toward the rotor core. The plurality of teeth defines a plurality of slots between successive teeth of the plurality of teeth. The winding is wound through at least two slots of the plurality of slots. The stator is mounted radially relative to the rotor core. The housing includes, but is not limited to, a front wall, a back wall, and a radial sidewall mounted between the front wall and the back wall to define an enclosure. A radial inlet aperture wall is formed circumferentially through the radial sidewall to form an opening through the radial sidewall. The hub, the rotor core, and the stator are mounted within the enclosure.

Other principal features of the disclosed subject matter will become apparent to those skilled in the art upon review of the following drawings, the detailed description, and the appended claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Illustrative embodiments of the disclosed subject matter will hereafter be described referring to the accompanying drawings, wherein like numerals denote like elements.

FIG. 29 depicts a side cross-sectional view of the computational fluid dynamics simulation model of the housing of FIG. 26 with the electrical machine of FIG. 20 mounted within the housing in accordance with an illustrative embodiment.

DETAILED DESCRIPTION

Figure 1:
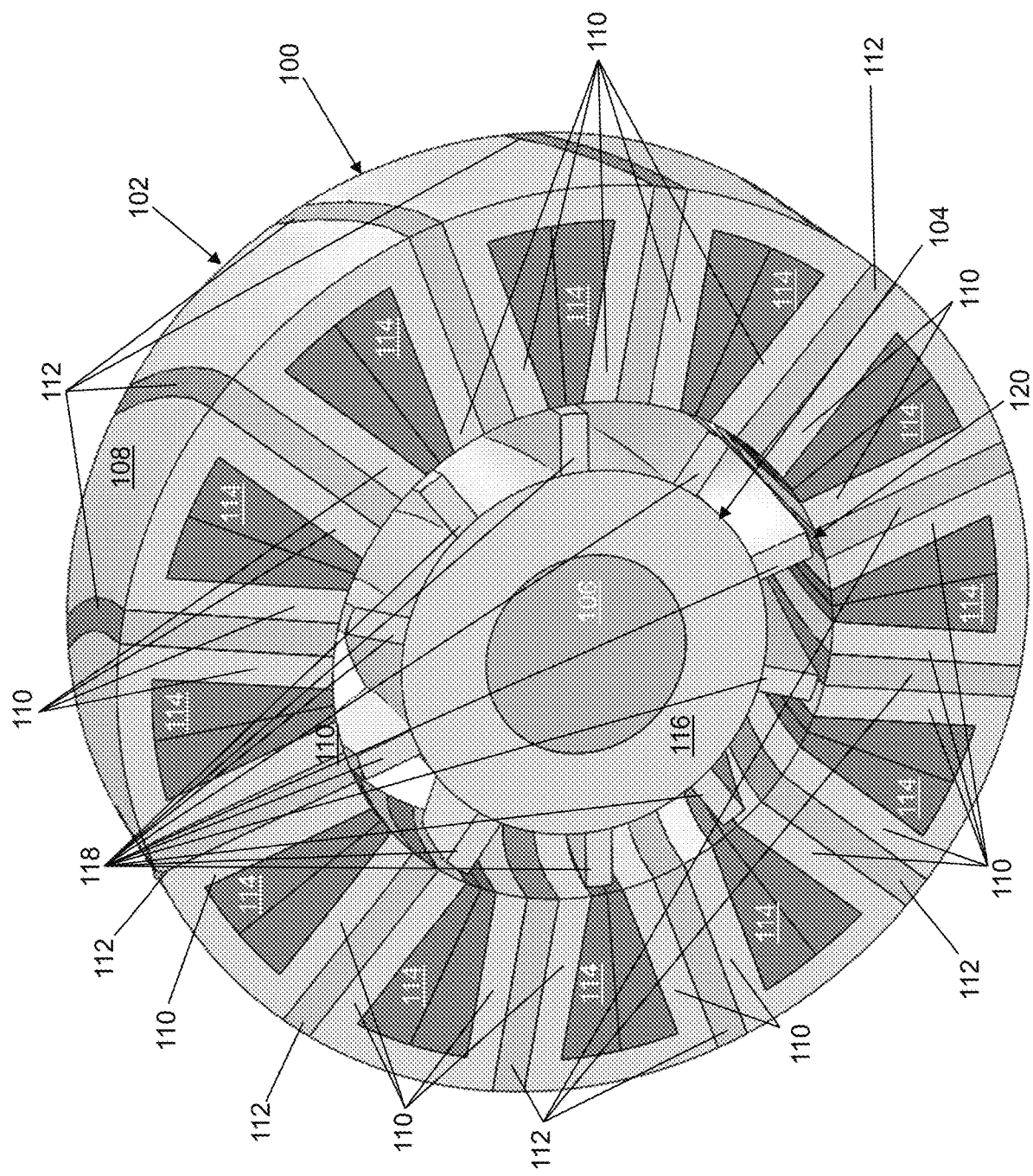
FIG. 1 depicts a perspective view of an electrical machine in accordance with an illustrative embodiment.

Referring to FIG. 1, a perspective view of an electrical machine 100 is shown in accordance with an illustrative embodiment. In the illustrative embodiment of FIG. 1, electrical machine 100 is a radial flux switching permanent magnet machine (FSPM). Electrical machine 100 may include a stator 102, a rotor 104, and a plurality of windings 114. In the illustrative embodiment, electrical machine 100 is a three-phase machine that can be configured as a generator or as a motor as understood by a person of skill in the art. In alternative embodiments, electrical machine 100 can be configured to support a fewer or a greater number of phases.

Use of directional terms, such as top, bottom, right, left, front, back, upper, lower, horizontal, vertical, behind, etc. are merely intended to facilitate reference to the various surfaces of the described structures relative to the orientations shown in the drawings and are not intended to be limiting in any manner unless otherwise indicated.

Electrical machine 100 may be used in various orientations. A shaft 106 may be mounted to extend parallel to a z-axis (shown referring to FIGS. 3 and 5) that is perpendicular to an x-axis and a y-axis (shown referring to FIGS. 2, 3, 4, and 5). The x-axis and the y-axis are perpendicular to each other so that the x-axis, y-axis, and z-axis form an orthonormal coordinate system. The z-axis defines an axial direction that extends through a center of rotor 104. In the illustrative embodiment of FIG. 1, rotor 104 is mounted radially within stator 102, and rotor 104 is mounted to shaft 106 for rotation. Rotor 104 is separated from stator 102 by an air gap 120. In an alternative embodiment, stator 102 may be mounted radially within rotor 104, and shaft 106 may or may not extend through a center of electrical machine 100.

As used in this disclosure, the term "mount" includes join, unite, connect, couple, associate, insert, hang, hold, affix, attach, fasten, bind, paste, secure, bolt, screw, rivet, pin, nail, clasp, clamp, cement, fuse, solder, weld, glue, form over, slide together, layer, and other like terms. The phrases "mounted on" and "mounted to" include any interior or exterior portion of the element referenced. These phrases also encompass direct mounting (in which the referenced elements are in direct contact) and indirect mounting (in which the referenced elements are not in direct contact, but are mounted together via intermediate elements). Elements referenced as mounted to each other herein may further be integrally formed together, for example, using a molding process as understood by a person of skill in the art. As a result, elements described herein as being mounted to each other need not be discrete structural elements. The elements may be mounted permanently, removably, or releasably.

Stator 102 may include a stator core 108, a plurality of teeth 110, and a plurality of magnets 112 that form a plurality of stator poles. Stator 102 has a generally circular cross section with a hollow core sized to accommodate shaft 106 and rotor 104. Stator core 108 and the plurality of teeth 110 may be formed of a ferromagnetic material such as lamination steel, iron, cobalt, nickel, etc. Stator core 108 and the plurality of teeth 110 may be formed of laminations stacked in the axial direction. The laminations may be punched or laser cut. In the illustrative embodiment, the number of stator slots or stator poles of stator 102 is $P_s=12$ though stator 102 may include a fewer or a greater number of stator poles.

Rotor 104 has a generally circular cross section with a hollow core sized to accommodate shaft 106. Rotor 104 may include a rotor core 116 and a plurality of blades 118 that form a plurality of rotor poles. The number of rotor poles may depend on the number of phases supported by electrical machine 100. In the illustrative embodiment, the number of rotor blades or rotor poles of rotor 104 is $P_r=10$ though rotor 104 may include a fewer or a greater number of rotor poles. Rotor core 116 and the plurality of blades 118 may be formed of a ferromagnetic material such as lamination steel, iron, cobalt, nickel, etc. Rotor core 116 and the plurality of blades 118 may be formed of laminations stacked in the axial direction that is parallel to the z-axis. The laminations may be punched or laser cut.

Rotor 104 may control rotation of shaft 106 when electrical machine 100 is acting as a motor, and shaft 106 may control rotation of rotor 104 when electrical machine 100 is acting as a generator. Electrical machine 100 may be configured to act as both a generator and a motor or as only a generator or as only a motor.

The excitation frequency, $f_e$, of an FSPM machine is proportional to the number of rotor poles ($p_r$) as $$f_e = \frac{np_r}{60},$$

where n is a rotational speed, for example, in revolutions per minute (RPM). A typical FSPM machine has $P_s=12$ and $P_r=10$ though a minimum number of stator slots is six for a three-phase machine because the number of stator slots is an even number and a multiple of the number of phases. The number of rotor poles can be 4, 5, 7, 8, etc. though not all of these combinations may be suitable for practical use.

Figure 2:
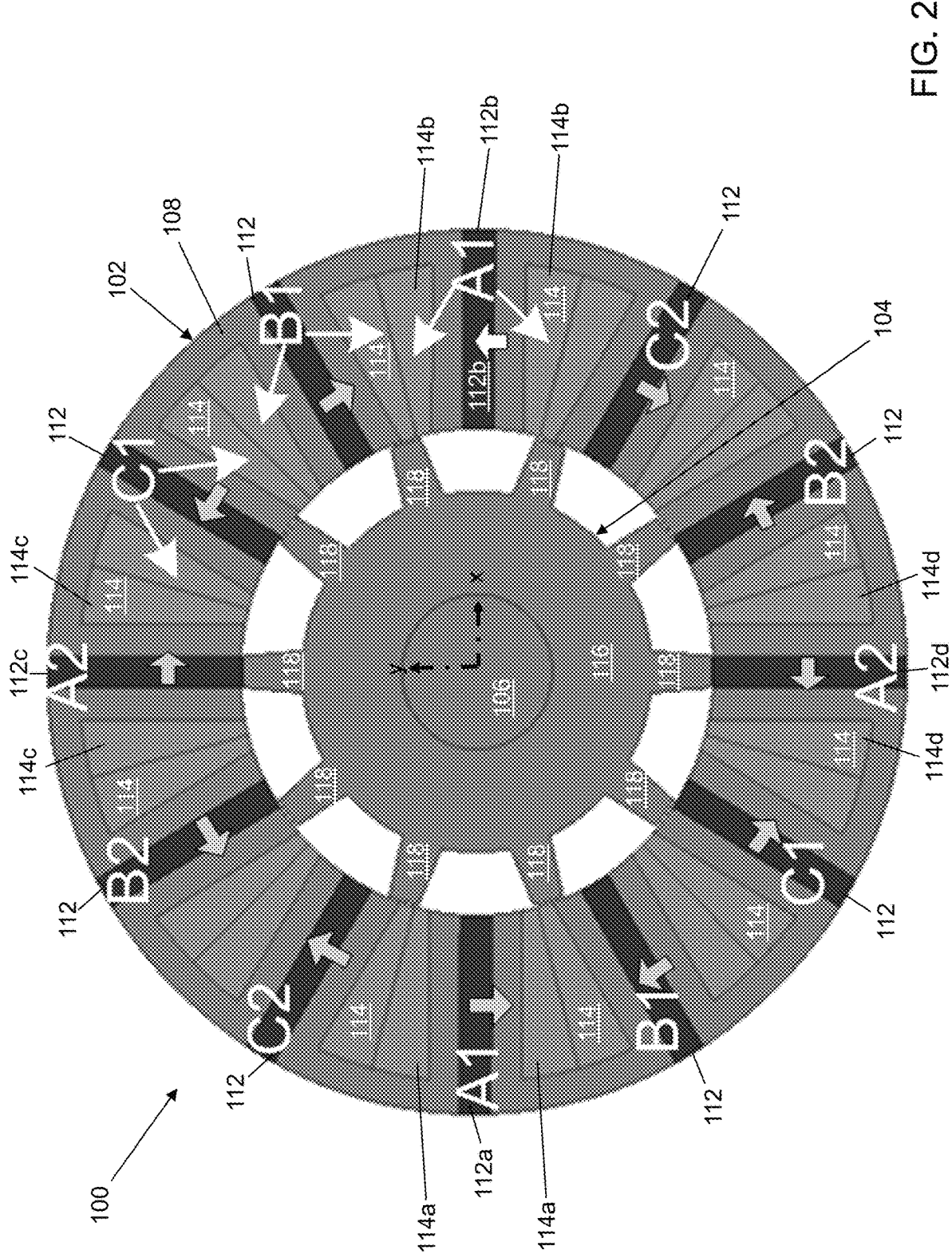
FIG. 2 depicts a front view of the electrical machine of FIG. 1 in accordance with an illustrative embodiment.

Referring to FIG. 2, a front view of electrical machine 100 is shown in accordance with an illustrative embodiment. Stator core 108 and the plurality of teeth 110 form a plurality of slots in which the plurality of windings 114 are wound. A winding of the plurality of windings 114 is wound over at least one magnet of the plurality of magnets 112 and through at least two slots of the plurality of slots. For example, in the illustrative embodiment of FIG. 2, a first winding 114a is wound over a first magnet 112a and defines a first phase "A" winding. A second winding 114b is wound over a second magnet 112b and defines a second phase "A" winding. A third winding 114c is wound over a third magnet 112c and defines a third phase "A" winding. A fourth winding 114d is wound over a fourth magnet 112d and defines a fourth phase "A" winding. First winding 114a and second winding 114b may be connected in series. Third winding 114c and fourth winding 114d may be connected in series. First winding 114a, second winding 114b, third winding 114c, and fourth winding 114d may be connected in series in various orders. Similarly, the remaining windings are wound over the remaining magnets to form four phase "B" windings and four phase "C" windings. Each of the plurality of windings 114 may form a concentrated coil. Each winding of the plurality of windings 114 conducts a current in a positive or a negative direction.

The plurality of magnets 112 are permanent magnets formed of non-rare or rare earth elements such as ferrite, samarium-cobalt, neodymium-iron-boron, etc. The plurality of magnets 112 may be cast, sintered, molded, etc. Each magnet of the plurality of magnets 112 is magnetized to form a south (S) pole on a first side and a north (N) pole on a second side opposite the first side, wherein the magnetization direction is in a circumferential direction from the first side to the second side of the magnet relative to the generally circular cross section of stator 102. The plurality of magnets 112 are mounted with N poles adjacent N poles and S poles adjacent S poles to form pole pairs. The pole pairs are formed at a regular pitch circumferentially around stator 102. In the illustrative embodiment, the block arrows point from the north polarity to the south polarity.

Figure 3:
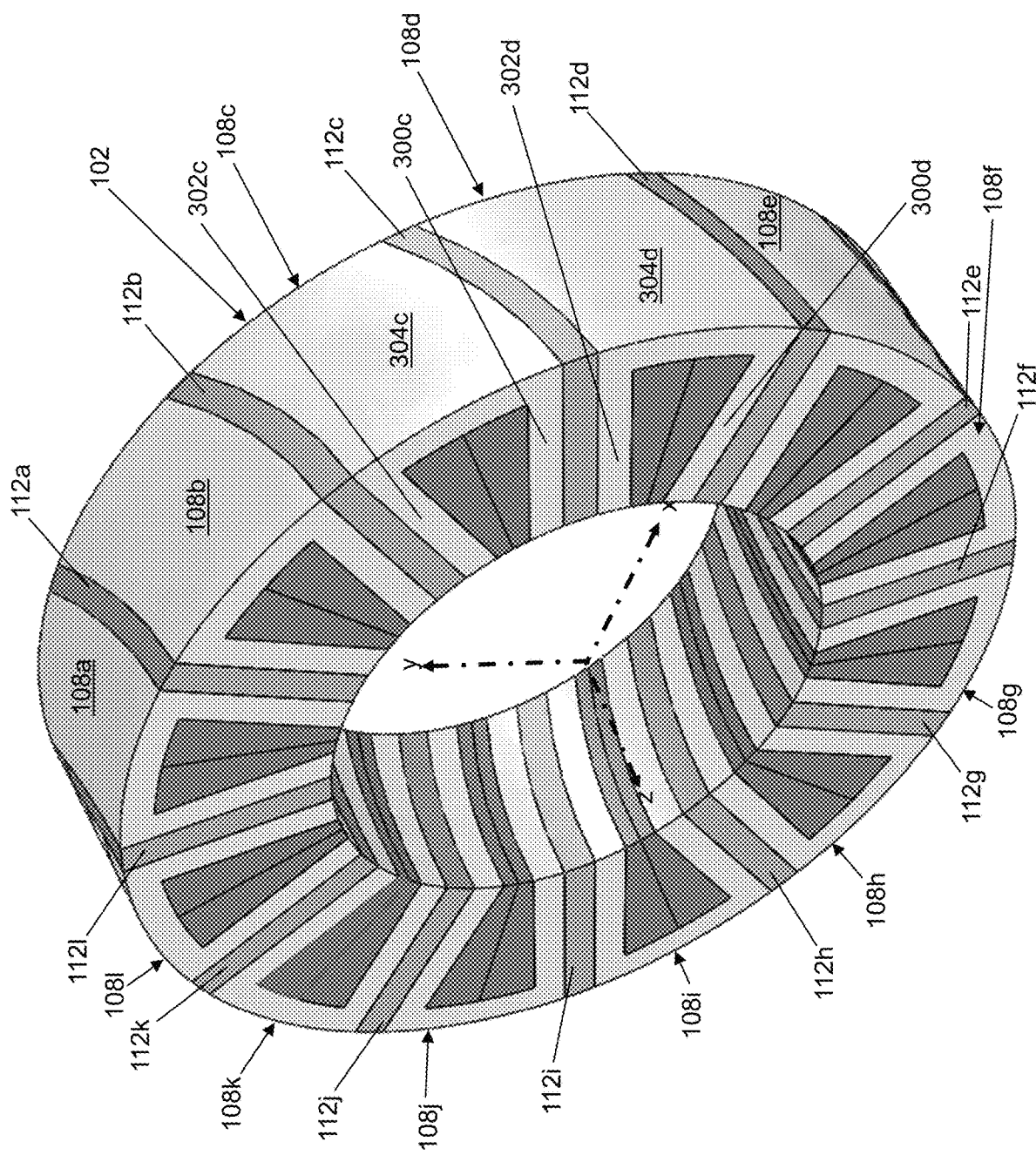
FIG. 3 depicts a perspective view of a stator of the electrical machine of FIG. 1 in accordance with an illustrative embodiment.

Referring to FIG. 3, a perspective view of stator 102 of electrical machine 100 is shown in accordance with an illustrative embodiment. Stator 102 has a hollow cylindrical shape with an aperture through a center of the cylinder. Stator core 108 and the plurality of teeth 110 may form a plurality of core pieces. In the illustrative three-phase embodiment, the plurality of core pieces includes four core pieces for each phase such that the plurality of core pieces includes a first core piece 108a, a second core piece 108b, a third core piece 108c, a fourth core piece 108d, a fifth core piece 108e, a sixth core piece 108f, a seventh core piece 108g, an eighth core piece 108h, a ninth core piece 108i, a tenth core piece 108j, an eleventh core piece 108k, and a twelfth core piece 108l. In the illustrative embodiment, each core piece of the plurality of core pieces has the same size and shape. In the illustrative embodiment, each core piece has a "C"-shape distributed circumferentially at a regular pitch around the z-axis and open towards rotor 104. For example, third core piece 108c has a first tooth 300c, a second tooth 302c, and a core section 304c, and fourth core piece 108d has a first tooth 300d, a second tooth 302d, and a core section 304d. First tooth 300c and second tooth 302c extend from core section 304c to form a C-shaped face that opens towards the z-axis and rotor 104. First tooth 300d and second tooth 302d extend from core section 304d to form a C-shaped face that opens towards the z-axis and rotor 104. The hollow of the C-shape of each core piece defines a stator slot within which the plurality of windings 114 is wound. The slots are distributed at equal angles around a circumference of stator 102.

In the illustrative embodiment of FIG. 3, the plurality of magnets 112 are mounted between the teeth of adjacent core pieces. For example, a third magnet 112c fits in a slot formed between a first tooth 300c of third core piece 108c and second tooth 302d of fourth core piece 108d. The remaining magnets are similarly mounted and distributed circumferentially around stator core 108. For example, a first magnet 112a fits in a slot formed between first core piece 108a and second core piece 108b, a second magnet 112b fits in a slot formed between second core piece 108b and third core piece 108c; a fourth magnet 112d fits in a slot formed between fourth core piece 108d and fifth core piece 108e; a fifth magnet 112e fits in a slot formed between fifth core piece 108e and sixth core piece 108f, a sixth magnet 112f fits in a slot formed between sixth core piece 108f and seventh core piece 108g, a seventh magnet 112g fits in a slot formed between seventh core piece 108g and eighth core piece 108h; an eighth magnet 112h fits in a slot formed between eighth core piece 108h and ninth core piece 108i; a ninth magnet 112i fits in a slot formed between ninth core piece 108i and tenth core piece 108j; a tenth magnet 112j fits in a slot formed between tenth core piece 108j and eleventh core piece 108k; an eleventh magnet 112k fits in a slot formed between eleventh core piece 108k and twelfth core piece 108l; and a twelfth magnet 112l fits in a slot formed between twelfth core piece 108l and first core piece 108a.

In the illustrative embodiment, each magnet of the plurality of magnets 112 has the same size and shape. For example, each magnet of the plurality of magnets 112 has a rectangular shape in the x-y-plane though each magnet of the plurality of magnets 112 may have a truncated wedge shape or other polygonal and/or elliptical shape in the x-y-plane in alternative embodiments. The plurality of core pieces and the plurality of magnets 112 form the circular cross section of stator 102 in the x-y-plane with the z-axis extending axially through a center of the circular cross section of stator 102.

Each magnet of the plurality of magnets 112 is curved in the x-y-plane in the direction of the z-axis to axially align the plurality of magnets 112 with an axially extending edge or face of a blade of the plurality of blades 118. Being curved in the x-y-plane in the direction of the z-axis means that a location of each magnet of the plurality of magnets 112, such as third magnet 112c, is at a different (x,y) coordinate value at each location along the z-axis. The (x,y) coordinate variation follows a continuous curve with a non-zero curvature value (not a straight line) between a front face of stator 102 and a back face of stator 102. The continuous curve may be monotonic.

A stator pole width may or may not have the same value in the axial direction, i.e. the width may change, for example, as a trade-off between manufacturability and torque production. Each magnet of the plurality of magnets 112 and each core piece may be segmented in the axial direction such that the segmentation follows the curvature line.

Figure 4:
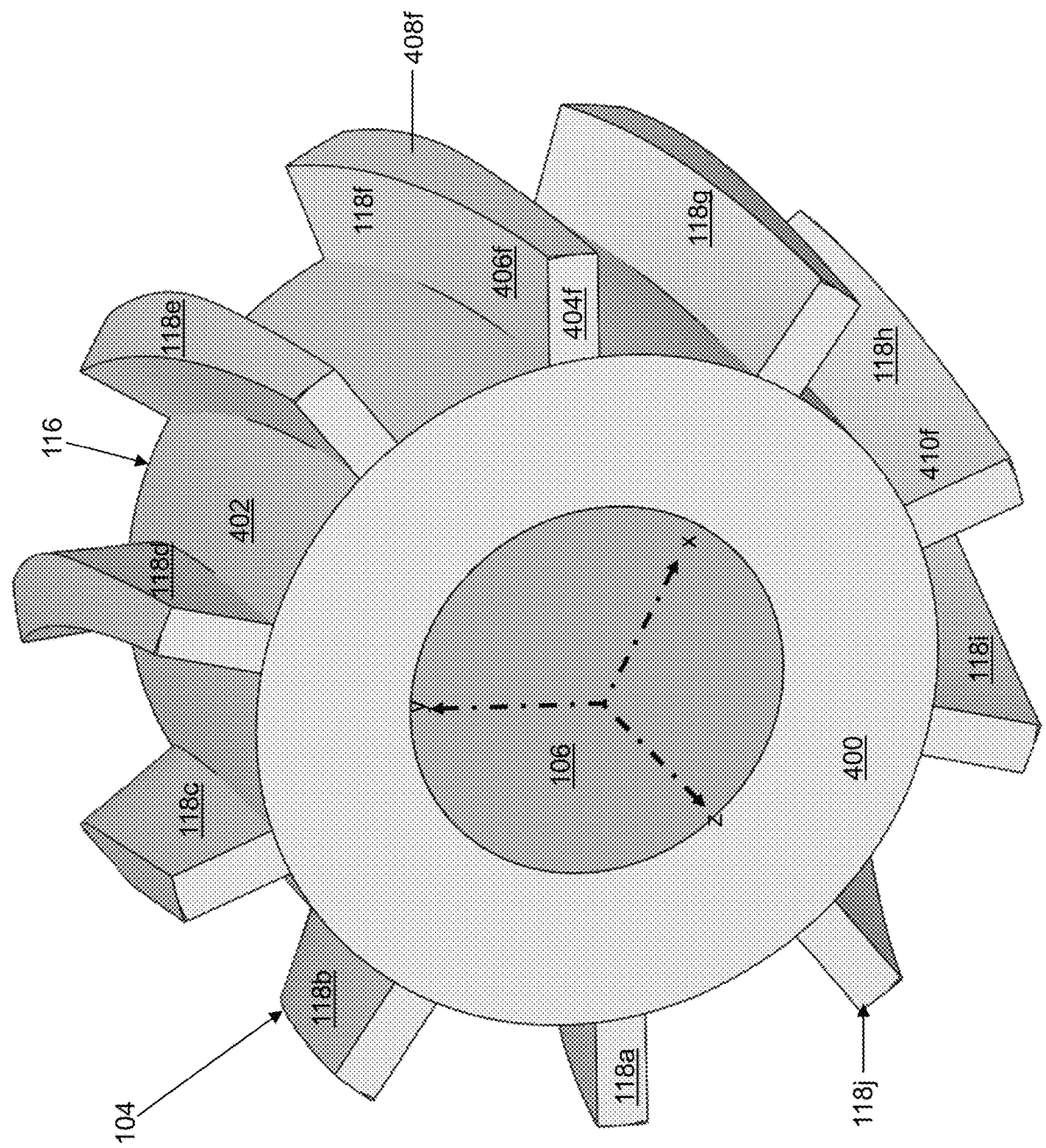
FIG. 4 depicts a perspective view of a first rotor of the electrical machine of FIG. 1 in accordance with an illustrative embodiment.

Referring to FIG. 4, a perspective view of rotor 104 is shown in accordance with an illustrative embodiment. Rotor core 116 has a hollow cylindrical shape with an aperture through a center of the cylinder. Rotor core 116 may include a rotor front face 400, a rotor back face (not shown), a rotor interior surface 1008 (shown with reference to FIG. 10), and a rotor exterior face 402. Rotor exterior face 402 and rotor interior surface 1008 extend between rotor front face 400 and the rotor back face. Rotor front face 400 and the rotor back face are in the x-y-plane. Rotor interior surface 1008 and rotor exterior face 402 extend parallel to the z-axis or in the axial direction. Shaft 106 mounts to rotor interior surface 1008. The plurality of blades 118 extend from rotor exterior face 402. Of course, if stator 102 is mounted interior of rotor 104 instead of exterior as in the illustrative embodiment, the plurality of blades 118 would extend from rotor interior surface 1008. The plurality of blades 118 extend from rotor exterior face 402 at a regular pitch circumferentially around rotor core 116.

The plurality of blades 118 includes a first blade 118a, a second blade 118b, a third blade 118c, a fourth blade 118d, a fifth blade 118e, a sixth blade 118f, a seventh blade 118g, an eighth blade 118h, a ninth blade 118i, and a tenth blade 118j that each has the same size and shape. In alternative embodiments, the plurality of blades 118 may have a different size or shape. For example, sixth blade 118f includes a front face 404f, a back face (not shown), a first side face 406f, a second side face (not shown), and an exterior face 408f. First side face 406f, the second side face, and exterior face 408f extend between front face 404f and the back face. Front face 404f extends from rotor exterior face 402, and the back face extends from the rotor back face. First side face 406f and the second side face extend from rotor exterior face 402. Exterior face 408f extends between first side face 406f and the second side face and defines an axial edge of sixth blade 118f. In the illustrative embodiment of FIG. 4, a rotor pole width of exterior face 408f changes in an axial direction with a curvature.

Air gap 120 is defined between exterior face 408f of sixth blade 118f and inner edges of each tooth of stator 102. Air gap 120 is similarly defined between an exterior face 408 of each of first blade 118a, second blade 118b, third blade 118c, fourth blade 118d, fifth blade 118e, seventh blade 118g, eighth blade 118h, ninth blade 118i, and tenth blade 118j and the inner edges of each tooth of stator 102.

Each blade of the plurality of blades 118 is shaped, sized, and/or positioned to carry a magnetic flux of electrical machine 100. Each blade of the plurality of blades 118 is simultaneously shaped, sized, and/or positioned to act as an airfoil that compresses a gas when rotor 104 is rotated. Rotor 104 may be used as part of a gas compressor stage. The gas flows axially between successive blades of the plurality of blades 118.

Figure 5:
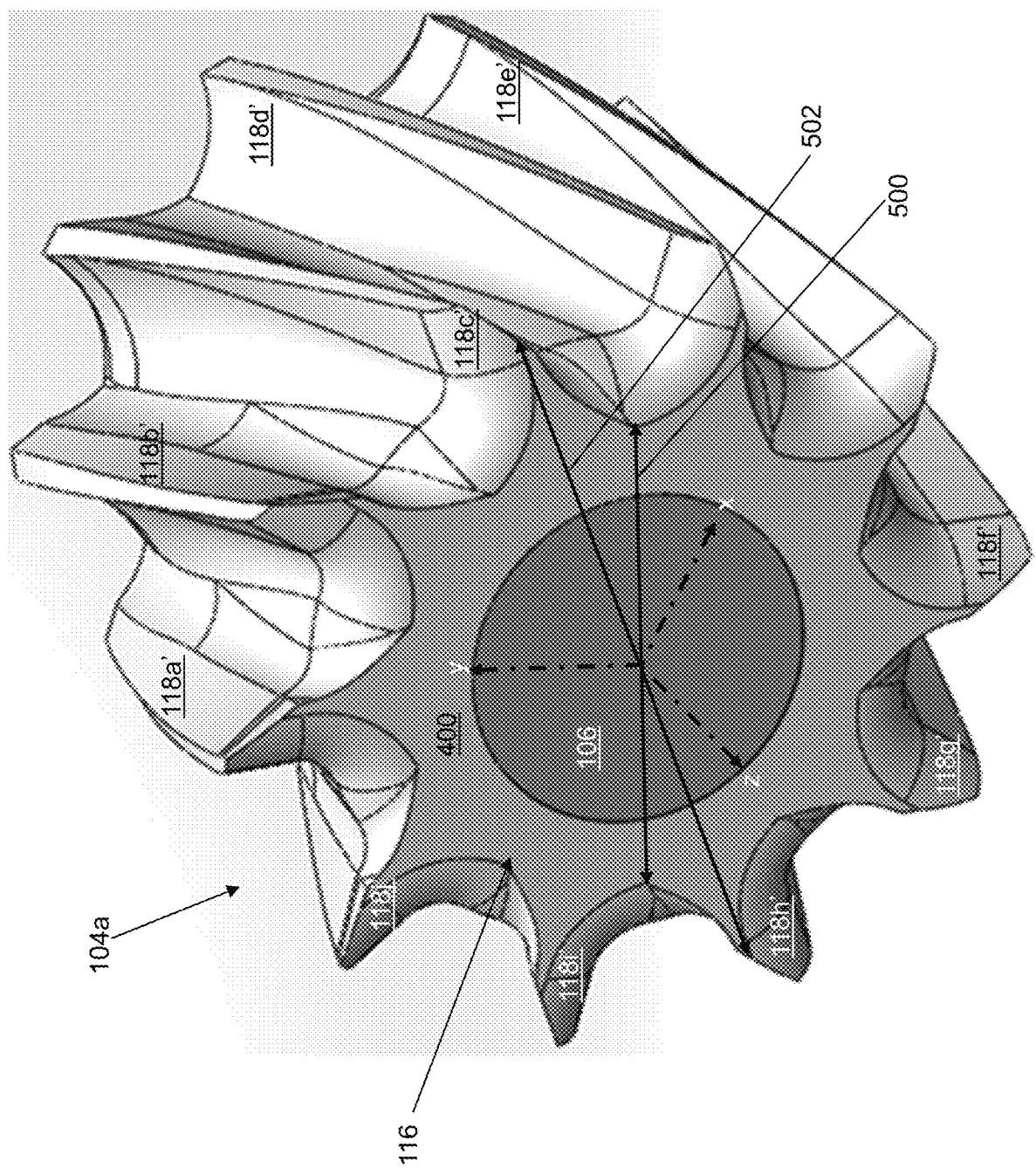
FIG. 5 depicts a perspective view of a second rotor of the electrical machine of FIG. 1 in accordance with an illustrative embodiment.

Referring to FIG. 5, a perspective view of a second rotor 104a of electrical machine 100 is shown in accordance with an illustrative embodiment. Rotor core 116 has a hollow cylindrical shape with an aperture through a center of the cylinder. Rotor core 116 may include a rotor front face 400, a rotor back face (not shown), and rotor interior surface 1008. The plurality of blades 118 include a first airfoil blade 118a', a second airfoil blade 118b', a third airfoil blade 118c', a fourth airfoil blade 118d', a fifth airfoil blade 118e', a sixth airfoil blade 118f', a seventh airfoil blade 118g', an eighth airfoil blade 118h', a ninth airfoil blade 118i', and a tenth airfoil blade 118j' that each has the same size and shape. First airfoil blade 118a', second airfoil blade 118b', third airfoil blade 118c', fourth airfoil blade 118d', fifth airfoil blade 118e', sixth airfoil blade 118f', seventh airfoil blade 118g', eighth airfoil blade 118h', ninth airfoil blade 118i', and tenth airfoil blade 118j' form fan-like airfoils to progressively compress the gas that flows between successive blades of the plurality of blades 118.

The plurality of blades 118 are designed such that there is simultaneous energy conversion in both the electromagnetic domain and the fluid dynamic domain. The electromagnetic part of the blade design creates efficient energy conversion between electric energy supplied/generated by currents applied to the plurality of windings 114 and mechanical energy generated/supplied by rotating shaft 106. The fluid dynamic design converts the kinetic energy from rotation of rotor 104 directly into a pressure rise in the gas that flows between successive blades of the plurality of blades 118. The synergized design approach uses electrical machine sizing equations and fluid dynamic equations to determine the power converted in each domain. The output power from electric energy is calculated based on the electrical machine sizing equation below:

$$P_{out} = \frac{\sqrt{2}}{2}\pi^3 K_{av}K_t K_{curve}\eta\left(\frac{f_e}{p_s}\right)B_{g,pk}A_{s,rms}D_{is}^2 L_e, \quad (1)$$

where $K_{av}$ is a coefficient to scale peak flux density to average flux density, $K_t$ is a stator tooth ratio number, $K_{curve}$ is a curve factor, $\eta$ is an efficiency value, $B_{g,pk}$ is a peak airgap flux density, $A_{s,rms}$ is an electric loading measured based on a root mean square (rms) current, $D_{is}$ is an inner diameter of stator 102, and $L_e$ is an effective length of electrical machine 100. A preliminary geometry of electrical machine 100 may be determined by choosing appropriate values of the key parameters, such as a diameter and a length of electrical machine 100, $A_{s,rms}$, and $B_{g,pk}$, once a power and a speed rating are provided for electrical machine 100. $B_{g,pk}$ may be limited by the saturation of steel, and $A_{s,rms}$ may be limited by the cooling of electrical machine 100.

Figure 6:
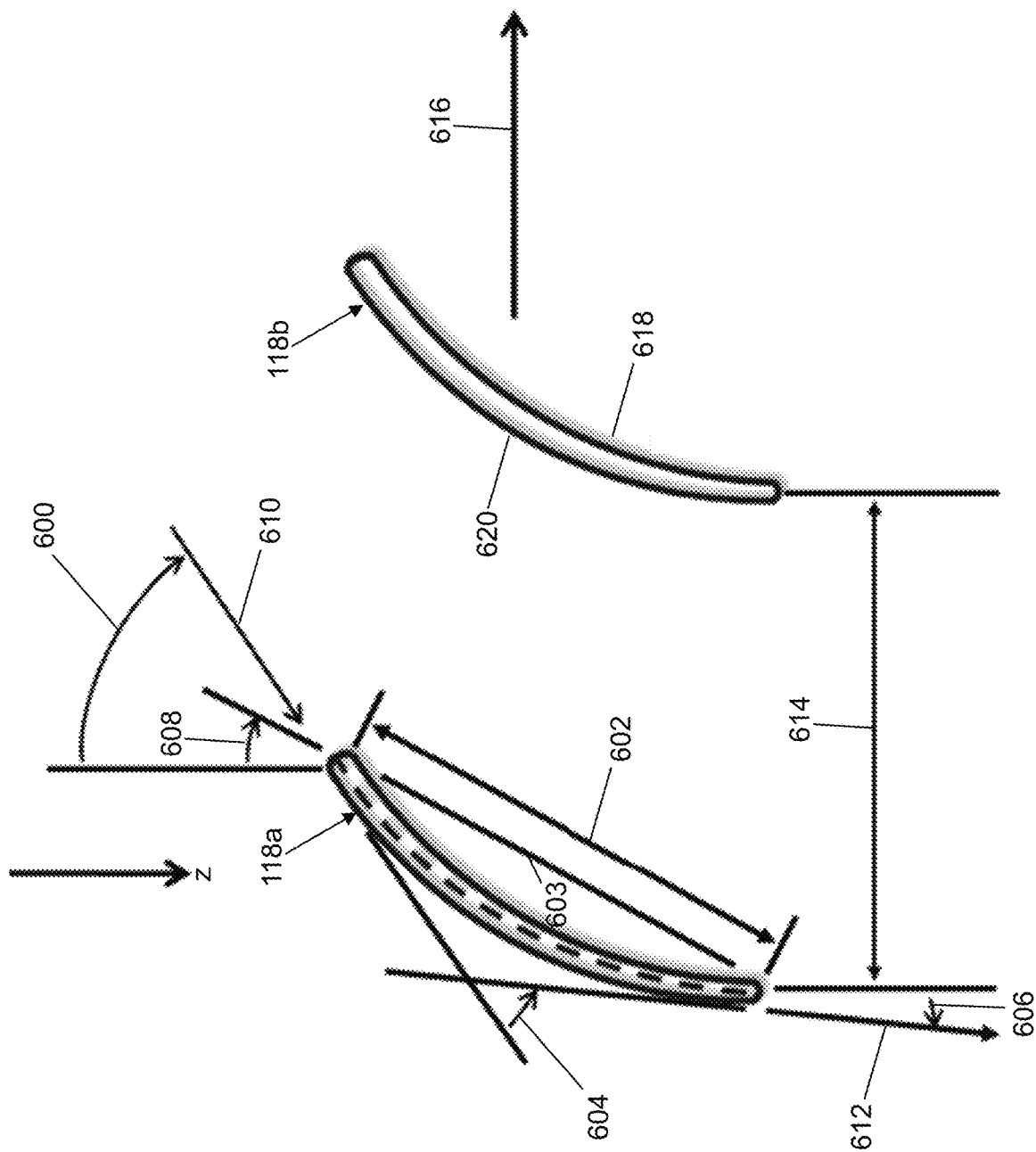
FIG. 6 depicts a rotor blade shape and nomenclature for a rotor of the electrical machine of FIG. 1 in accordance with an illustrative embodiment.

The plurality of blades 118 are shaped with a specific curvature with a specific input (angle of attack) and output angle. Referring to FIG. 6, a rotor blade shape (curvature) and nomenclature is shown for rotor 104 or second rotor 104a of electrical machine 100 in accordance with an illustrative embodiment. For illustration, first blade 118a or first airfoil blade 118a' of the plurality of blades 118 is curved with an inlet attacking angle 600, a chord length 602 of a chord line 603, a turn angle 604, an outlet attacking angle 606, and a stagger angle 608. Stagger angle 608 is an angle between chord line 603 and the z-axis (axial direction). Turn angle 604 of first blade 118a or first airfoil blade 118a' redirects an inlet flow velocity vector 610 to an outlet flow velocity vector 612. Inlet flow velocity vector 610 is an inlet flow velocity of the gas with respect to first blade 118a or first airfoil blade 118a'. Outlet flow velocity vector 612 is an outlet flow velocity of the gas with respect to first blade 118a or first airfoil blade 118a'. A blade pitch 614 is a distance between a center of successive blades of the plurality of blades 118. A rotation direction 616 defines a direction of rotation of the plurality of blades 118 resulting in a pressure side 618 and a suction side 620 for each blade of the plurality of blades 118.

Figure 7:
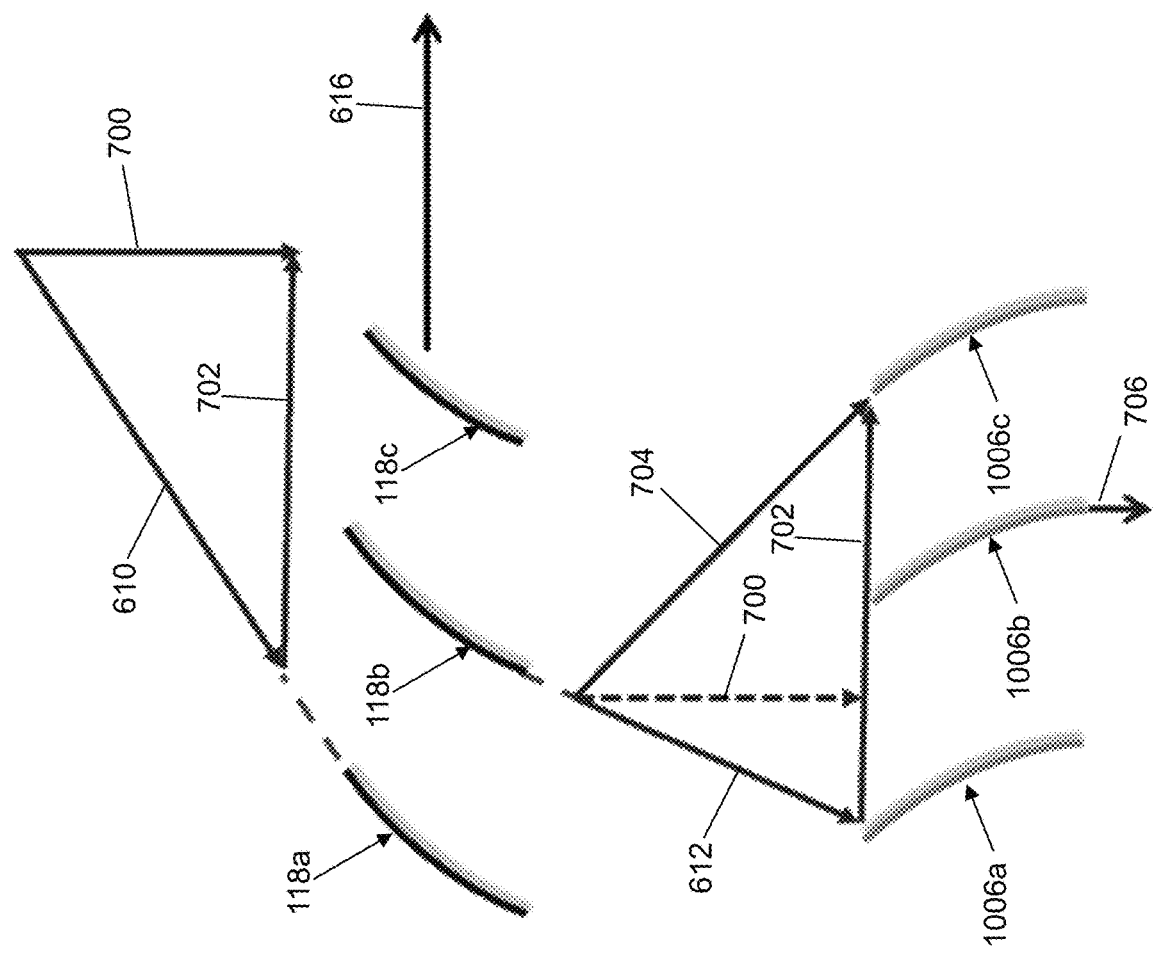
FIG. 7 depicts a velocity diagram of a flow through a rotor of the electrical machine of FIG. 1 in accordance with an illustrative embodiment.

Referring to FIG. 7, a velocity diagram of a gas flow through rotor 104 or second rotor 104a of electrical machine 100 is shown in accordance with an illustrative embodiment. A gas flow velocity vector 700 flowing into first blade 118a or first airfoil blade 118a' is assumed to have only an axial component. A blade speed vector 702 defines a blade speed at a middle blade diameter of each blade of the plurality of blades 118. A gas flow outlet velocity vector 704 is an actual velocity of the gas exiting rotor 104 or second rotor 104a. It may be assumed that the axial gas flow velocity vector 700 remains constant. The torque, $T_{shaft}$, required in shaft 106 to compress the gas is proportional to a difference between tangential blade velocity and mass flow rate as shown below $$T_{shaft}=r(V_{1.5}-V_1)m \quad (2)$$

where m is the mass flow rate, r is a mean radius of first blade 118a or first airfoil blade 118a', and $V_1$ is the tangential component of gas flow velocity vector 700, which is the tangential velocity of the mean blade for the rotor inlet, and $V_{1.5}$ is the tangential component of gas flow outlet velocity vector 704, which is the tangential velocity of the mean blade for the rotor outlet.

Figure 8:
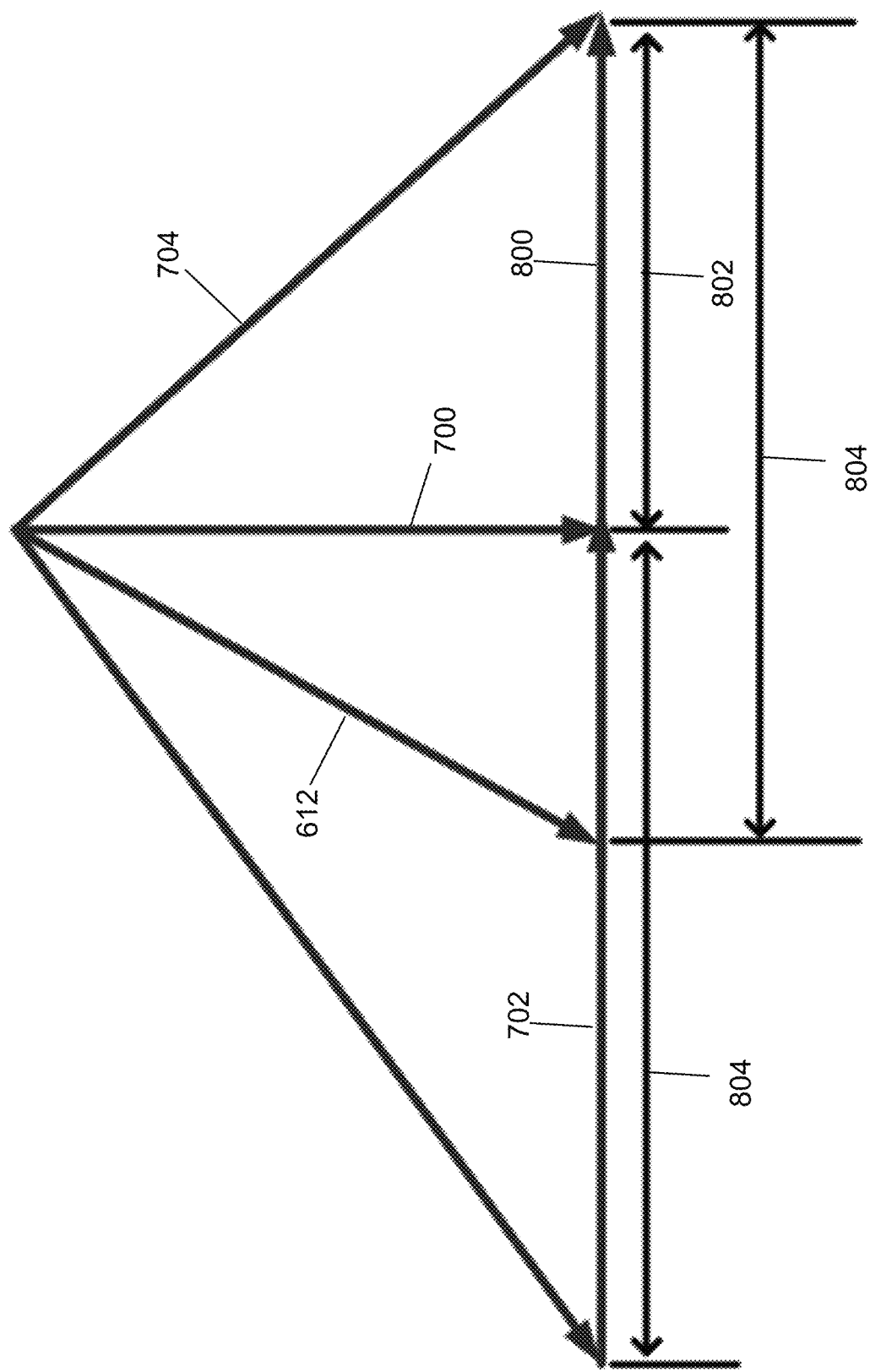
FIG. 8 depicts a combined velocity triangle for a rotor of the electrical machine of FIG. 1 showing a velocity increase in accordance with an illustrative embodiment.

Referring to FIG. 8, a combined velocity triangle showing the tangential component of velocity increase is shown for rotor 104 or second rotor 104a of electrical machine 100 in accordance with an illustrative embodiment. A delta vector 800 completes the velocity triangle between gas flow velocity vector 700 and gas flow outlet velocity vector 704. A magnitude 802 of delta vector 800 indicates a net increase of rotor tangential velocity provided by first blade 118a or first airfoil blade 118a'. Blade speed vector 702 has a blade speed magnitude 804. The outlet gas also has a higher stagnation temperature as compared to an inlet stagnation temperature.

Figure 9:
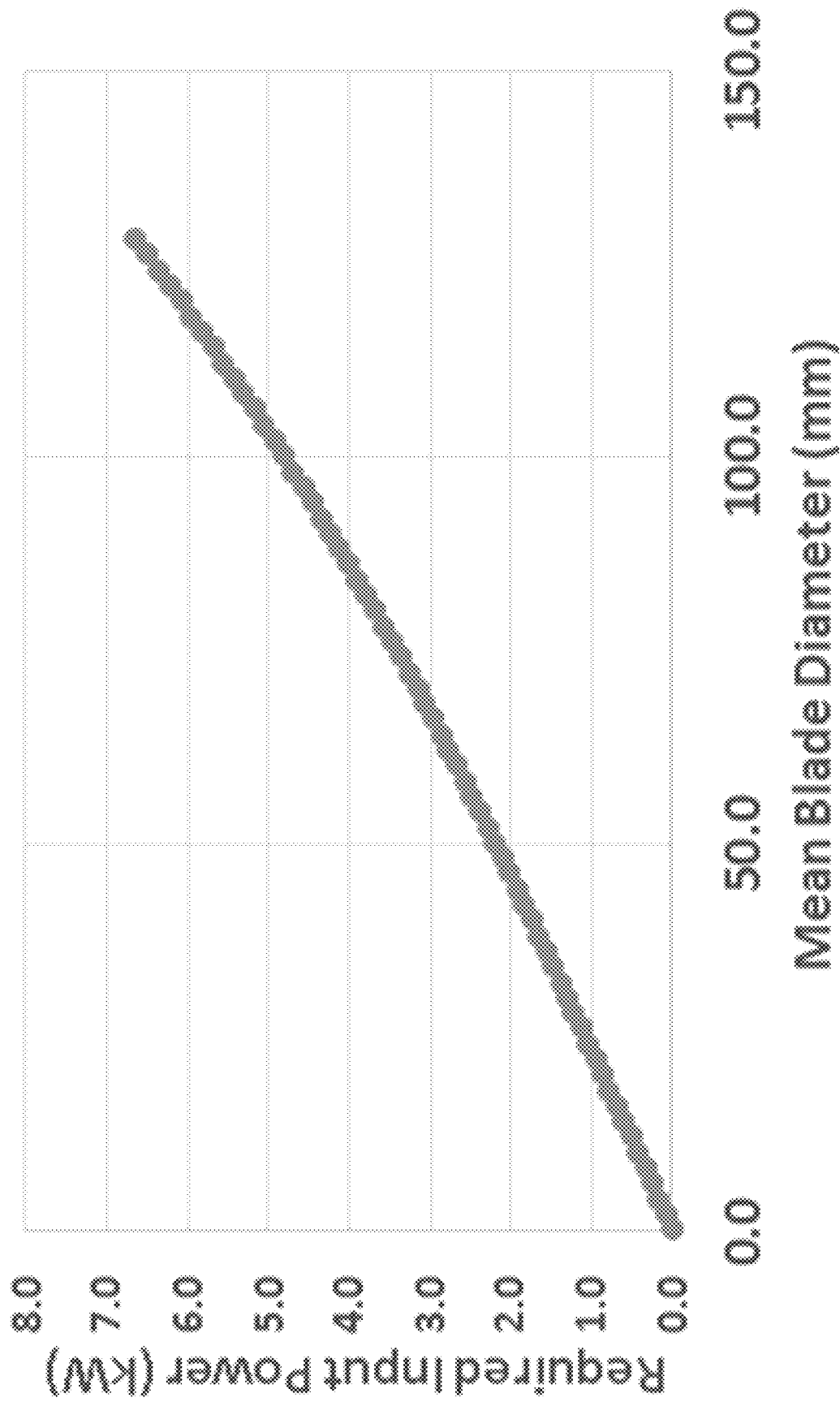
FIG. 9 depicts a required power for rotor compression work as a function of mean blade diameter for a rotor blade of a rotor of the electrical machine of FIG. 1 in accordance with an illustrative embodiment.

Referring to FIG. 9, a required power for rotor compression work is shown as a function of mean blade diameter for first blade 118a or first airfoil blade 118a' in accordance with an illustrative embodiment.

Figure 10:
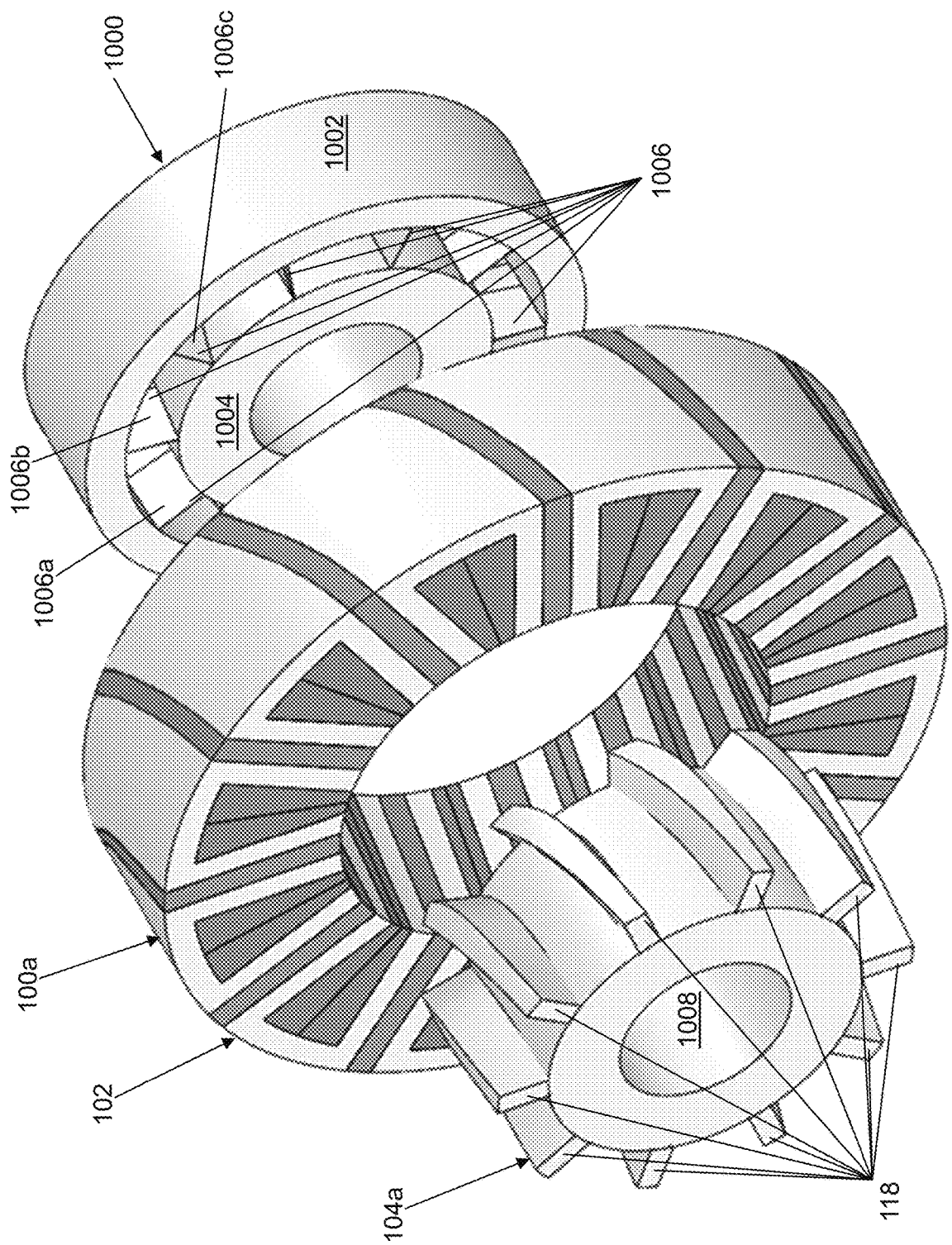
FIG. 10 depicts an exploded perspective view of an electrical machine in accordance with a second illustrative embodiment.

Referring to FIG. 10, an exploded perspective view of a second electrical machine 100a is shown in accordance with an illustrative embodiment. Second electrical machine 100a includes stator 102 and second rotor 104a. A diffuser 1000 is mounted to second electrical machine 100a to receive the gas compressed by the plurality of blades 118. Diffuser 1000 is a stationary diffuser that reduces the speed of the gas and increases the pressure on the gas to further compress the gas.

Diffuser 1000 may include an outer core 1002, an inner core 1004, and a plurality of diffuser blades 1006. For example, diffuser 1000 may include a first stator blade 1006a, a second stator blade 1006b, a third stator blade 1006c, etc. The plurality of diffuser blades 1006 are mounted between outer core 1002 and inner core 1004 to receive the gas output from second rotor 104a (or rotor 104), to reduces the speed of the gas, to further increase the pressure on the gas, and to output the further compressed gas. The gas from the output of the diffuser can be guided to another stage of compression such as another axial or centrifugal compressor.

Referring again to FIG. 8, the kinetic energy of the gas is converted into static pressure in diffuser 1000 where an outlet velocity 706 (shown referring to FIG. 7) of the gas from diffuser 1000 is slowed down while the pressure is increased. To evaluate how much the pressure is increased by second rotor 104a and diffuser 1000, a pressure ratio is calculated as $$\frac{p_{o1.5}}{p_{o1}} = \left(\frac{T_{o1.5}}{T_{o1}}\right)^{k/(k-1)} \quad (3)$$

where $P_{o1.5}$ is a total diffuser outlet pressure, $p_{o1}$ is a total rotor inlet pressure, $T_{o1}$ is a total rotor inlet temperature of the gas, $T_{o1.5}$ is a total diffuser outlet temperature of the gas, and k is a ratio of specific heat. The two temperatures can be calculated as $$T_{o1} = T_1 + \frac{V_1^2}{2c_p} \quad (4)$$

$$T_{o1.5} = T_{o2} = T_{o1} - \frac{1w_2}{2c_p} \quad (5)$$

where $c_p$ is a constant pressure specific heat of the gas, $T_1$ is an inlet gas temperature, $1w_2$ is a work per unit mass done by rotor 104 and diffuser 1000 from an inlet to second rotor 104a to an outlet from diffuser 1000.

Figure 11:
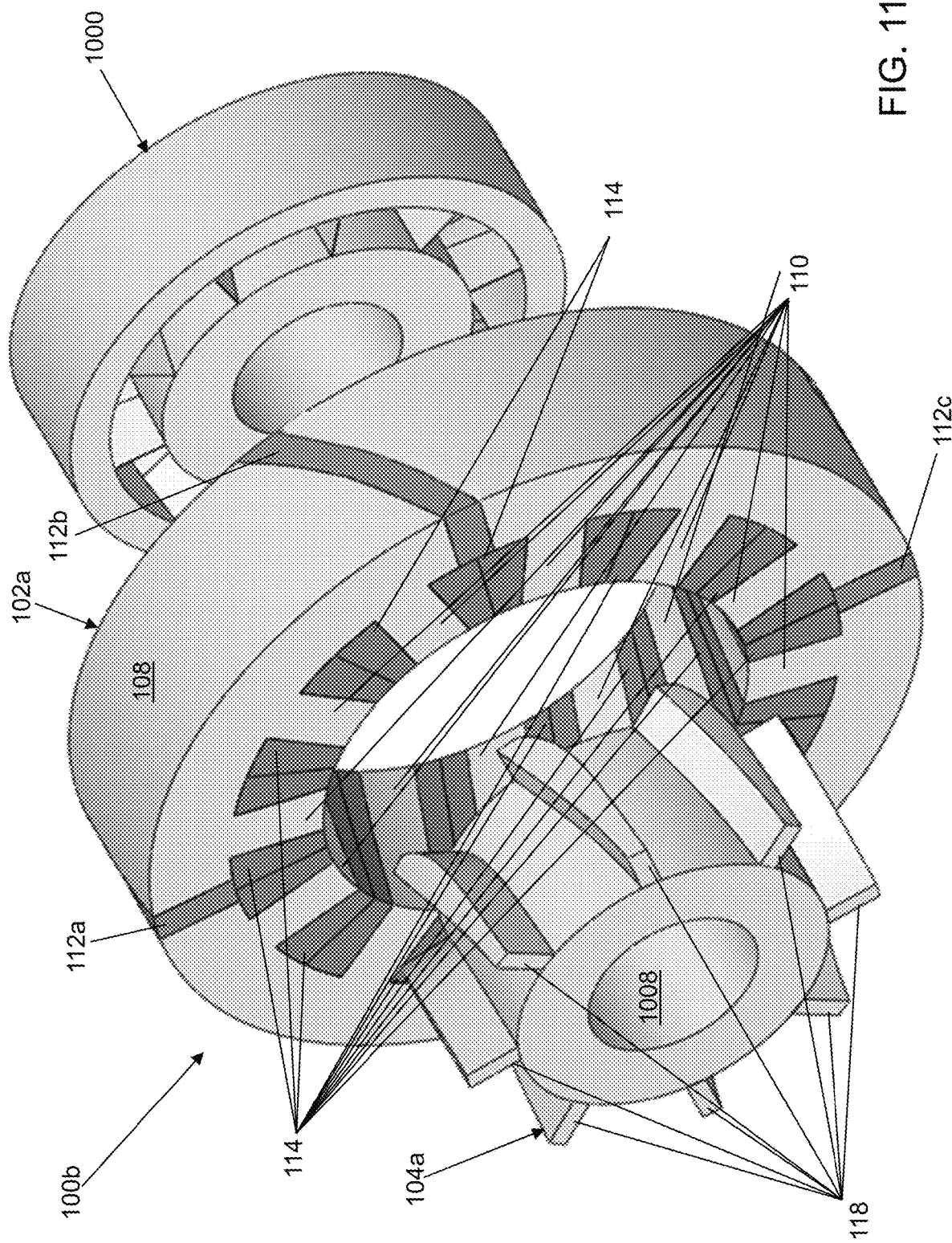
FIG. 11 depicts an exploded perspective view of the electrical machine in accordance with a third illustrative embodiment.

Referring to FIG. 11, an exploded perspective view of a third electrical machine 100b is shown in accordance with an illustrative embodiment. In the illustrative embodiment of FIG. 11, third electrical machine 100b is a doubly salient permanent magnet machine. Third electrical machine 100b may include a second stator 102a, second rotor 104a (or rotor 104), and the plurality of windings 114. In the illustrative embodiment, third electrical machine 100b is a three-phase machine that can be configured as a generator or as a motor as understood by a person of skill in the art. Diffuser 1000 is mounted to third electrical machine 100b to receive the gas compressed by the plurality of blades 118.

Second stator 102a may include stator core 108, the plurality of teeth 110, and the plurality of magnets 112 that form a plurality of stator poles. Second stator 102a has a generally circular cross section with a hollow core sized to accommodate shaft 106 and second rotor 104a (or rotor 104). The plurality of teeth 110 may have a different size and shape and number as compared to stator 102 as understood by a person of skill in the art. Unlike the plurality of magnets 112 of stator 102, the plurality of magnets 112 of second stator 102a are mounted to extend in a radial direction through stator core 108 in axial alignment with a slot of the plurality of slots instead of through the plurality of teeth 110. There also may be fewer or a greater number of magnets for the plurality of magnets 112 of second stator 102a. The plurality of windings 114 further may be wound through the plurality of slots of second stator 102a in a different manner than the plurality of windings 114 are wound through the plurality of slots of stator 102 as understood by a person of skill in the art.

Figure 12:
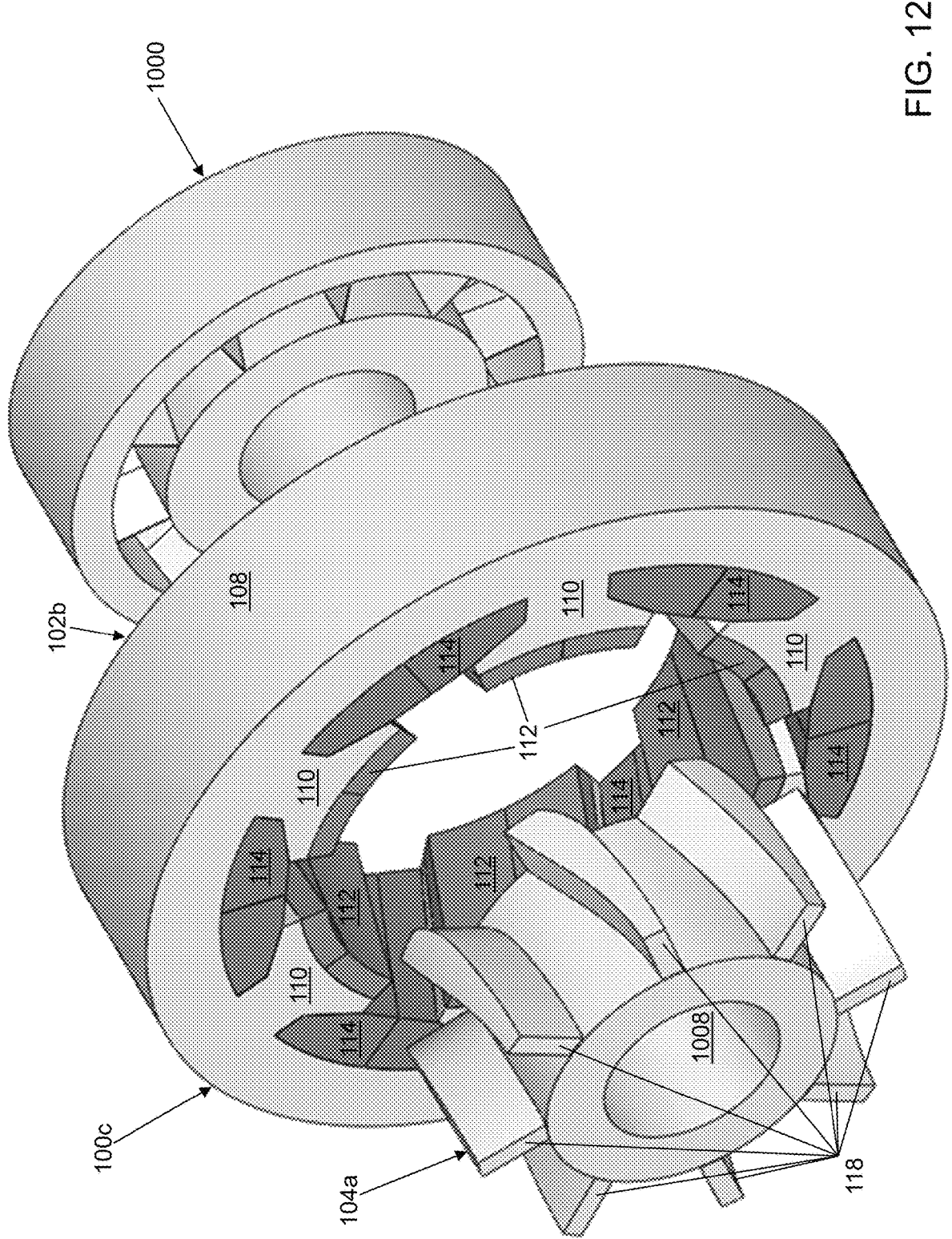
FIG. 12 depicts an exploded perspective view of the electrical machine in accordance with a fourth illustrative embodiment.

Referring to FIG. 12, an exploded perspective view of a fourth electrical machine 100c is shown in accordance with an illustrative embodiment. In the illustrative embodiment of FIG. 12, fourth electrical machine 100c is a flux reversal permanent magnet machine. Fourth electrical machine 100c may include a third stator 102b, second rotor 104a (or rotor 104), and the plurality of windings 114. In the illustrative embodiment, fourth electrical machine 100c is a three-phase machine that can be configured as a generator or as a motor as understood by a person of skill in the art. Diffuser 1000 is mounted to fourth electrical machine 100c to receive the gas compressed by the plurality of blades 118.

Third stator 102b may include stator core 108, the plurality of teeth 110, and the plurality of magnets 112 that form a plurality of stator poles. Third stator 102b has a generally circular cross section with a hollow core sized to accommodate shaft 106 and second rotor 104a (or rotor 104). The plurality of teeth 110 may have a different size and shape and number as compared to stator 102 as understood by a person of skill in the art. Unlike the plurality of magnets 112 of stator 102, the plurality of magnets 112 of second stator 102a are mounted to an exterior face of each tooth of the plurality of teeth 110 instead of through the plurality of teeth 110. The exterior face of each tooth of the plurality of teeth 110 faces second rotor 104a (or rotor 104). Air gap 120 separates the plurality of blades 118 from each magnet of the plurality of magnets 112. There also may be fewer or a greater number of magnets for the plurality of magnets 112 of third stator 102b. The plurality of windings 114 further may be wound through the plurality of slots of third stator 102b in a different manner than the plurality of windings 114 are wound through the plurality of slots of stator 102 as understood by a person of skill in the art.

Figure 13:
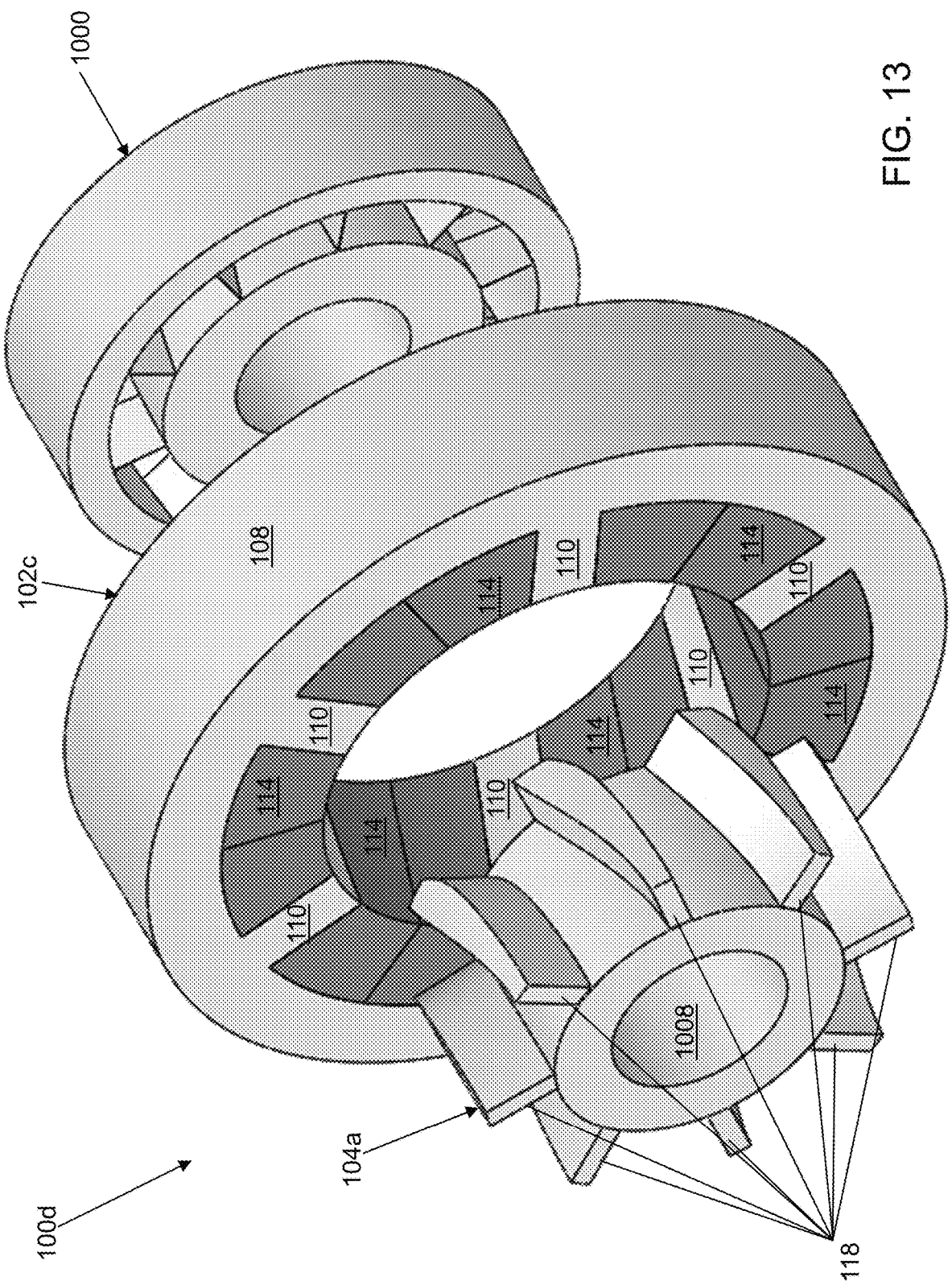
FIG. 13 depicts an exploded perspective view of the electrical machine in accordance with a fifth illustrative embodiment.

Referring to FIG. 13, an exploded perspective view of a fifth electrical machine 100d is shown in accordance with an illustrative embodiment. In the illustrative embodiment of FIG. 13, fifth electrical machine 100d is a switched reluctance machine. Fifth electrical machine 100d may include a fourth stator 102c, second rotor 104a (or rotor 104), and the plurality of windings 114. In the illustrative embodiment, fifth electrical machine 100d is a three-phase machine that can be configured as a generator or as a motor as understood by a person of skill in the art. Diffuser 1000 is mounted to fifth electrical machine 100c to receive the gas compressed by the plurality of blades 118.

Fourth stator 102c may include stator core 108 and the plurality of teeth 110 that form a plurality of stator poles. Fourth stator 102c has a generally circular cross section with a hollow core sized to accommodate shaft 106 and second rotor 104a (or rotor 104). The plurality of teeth 110 may have a different size and shape and number as compared to stator 102 as understood by a person of skill in the art. The plurality of windings 114 further may be wound through the plurality of slots of fourth stator 102c in a different manner than the plurality of windings 114 are wound through the plurality of slots of stator 102 as understood by a person of skill in the art.

Figure 14:
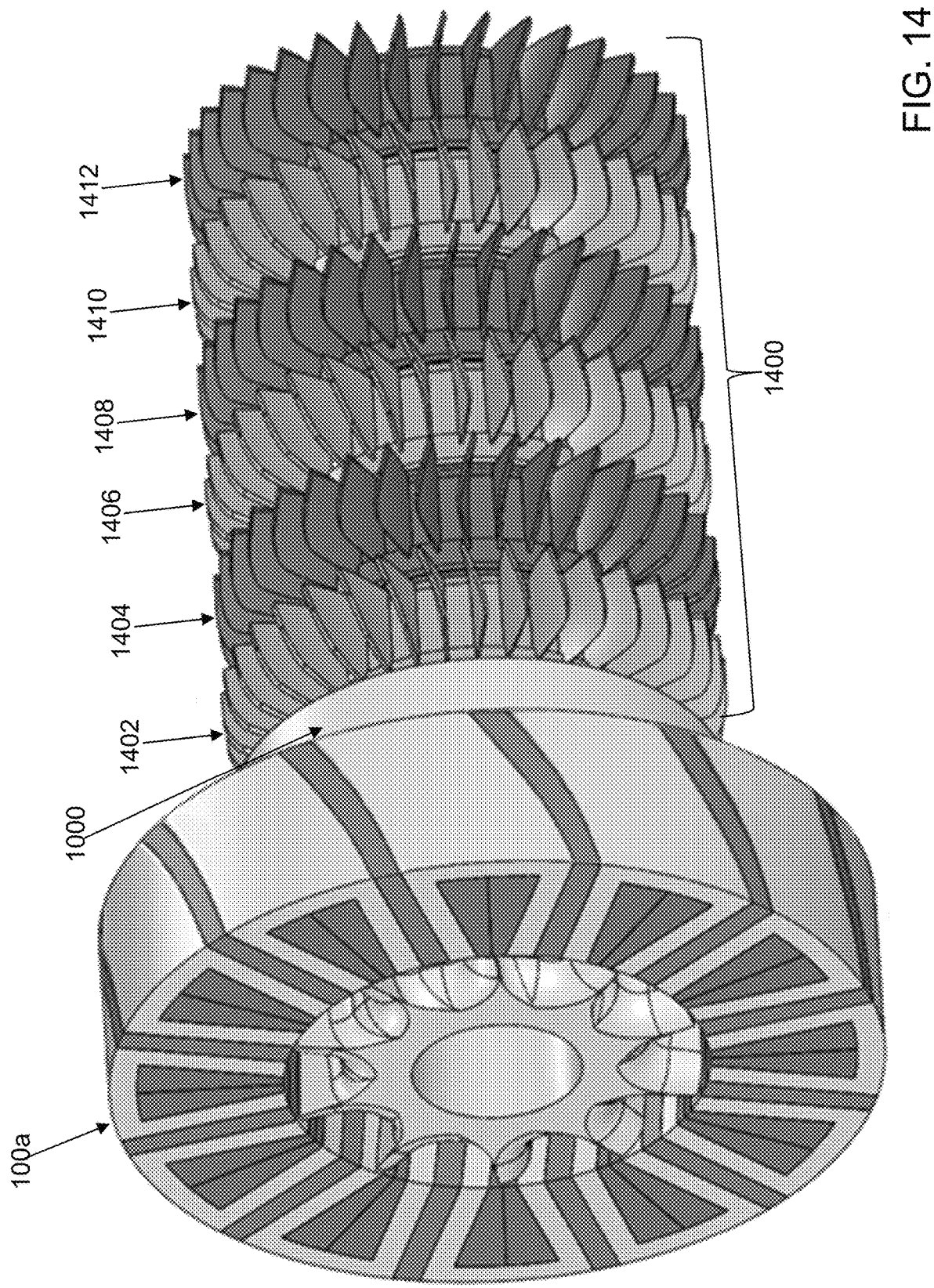
FIG. 14 depicts a perspective view of the electrical machine of FIG. 10 with a cascaded connection of multi-stage compressors in accordance with an illustrative embodiment.

Referring to FIG. 14, a perspective view of second electrical machine 100a and diffuser 1000 is shown with a connection to a multi-stage compressor 1400 in accordance with an illustrative embodiment. Diffuser 1000 may not be included in an alternative embodiment. Multi-stage compressor 1400 is mounted to receive compressed gas from diffuser 1000. Arrays of airfoils of multi-stage compressor 1400 may be set in rows, usually as pairs. For example, in each pair of compressors, one compressor of the pair may be rotating and the other compressor of the pair may be stationary. In the illustrative embodiment of FIG. 14, multi-stage compressor 1400 includes a first rotating compressor 1402 paired with a first stationary compressor 1404, a second rotating compressor 1406 paired with a second stationary compressor 1408, and a third rotating compressor 1410 paired with a third stationary compressor 1412. Multi-stage compressor 1400 may include a fewer or a greater number of arrays of airfoils.

The rotating airfoils or rotor blades of first rotating compressor 1402, second rotating compressor 1406, and third rotating compressor 1410 accelerate the gas received from a previous stage such as diffuser 1000, first stationary compressor 1404, and second stationary compressor 1408, respectively. The stationary airfoils, also known as stators or vanes, of first stationary compressor 1404, second stationary compressor 1408, and third stationary compressor 1412 decelerate and redirect the flow direction of the gas, preparing it for the rotor blades of the next stage such as second rotating compressor 1406 and third rotating compressor 1410. A cross-sectional area of a gas passage may diminish along multi-stage compressor 1400 to maintain an optimum axial Mach number. Beyond about five stages or a 4:1 design pressure ratio, a variable geometry may be used to further improve a compression of the gas.

The design for multi-stage compressor 1400 follows the same rules as outlined above for rotor 104 and second rotor 104a such that if the mean blade diameter stays constant, the power required for each successive stage is the same as the first stage assuming turn angle 604 and inlet flow velocity vector 610 remain the same. The pressure rise ratio normally decreases slightly for the later stages while the temperature increases from stage to stage. If the blade mean diameter is allowed to change, the required power at each stage is calculated as:

$$P_{stage} = mr\omega\left[r\omega - V_1\tan\left(\arctan\left(\frac{d\omega}{2V_1}\right) - \theta\right)\right] \quad (6)$$

where θ is turn angle 604, and ω is an angular speed of rotor 104. The required power at a second stage as a function of rotor mean blade diameter is shown in FIG. 9.

Figure 15:
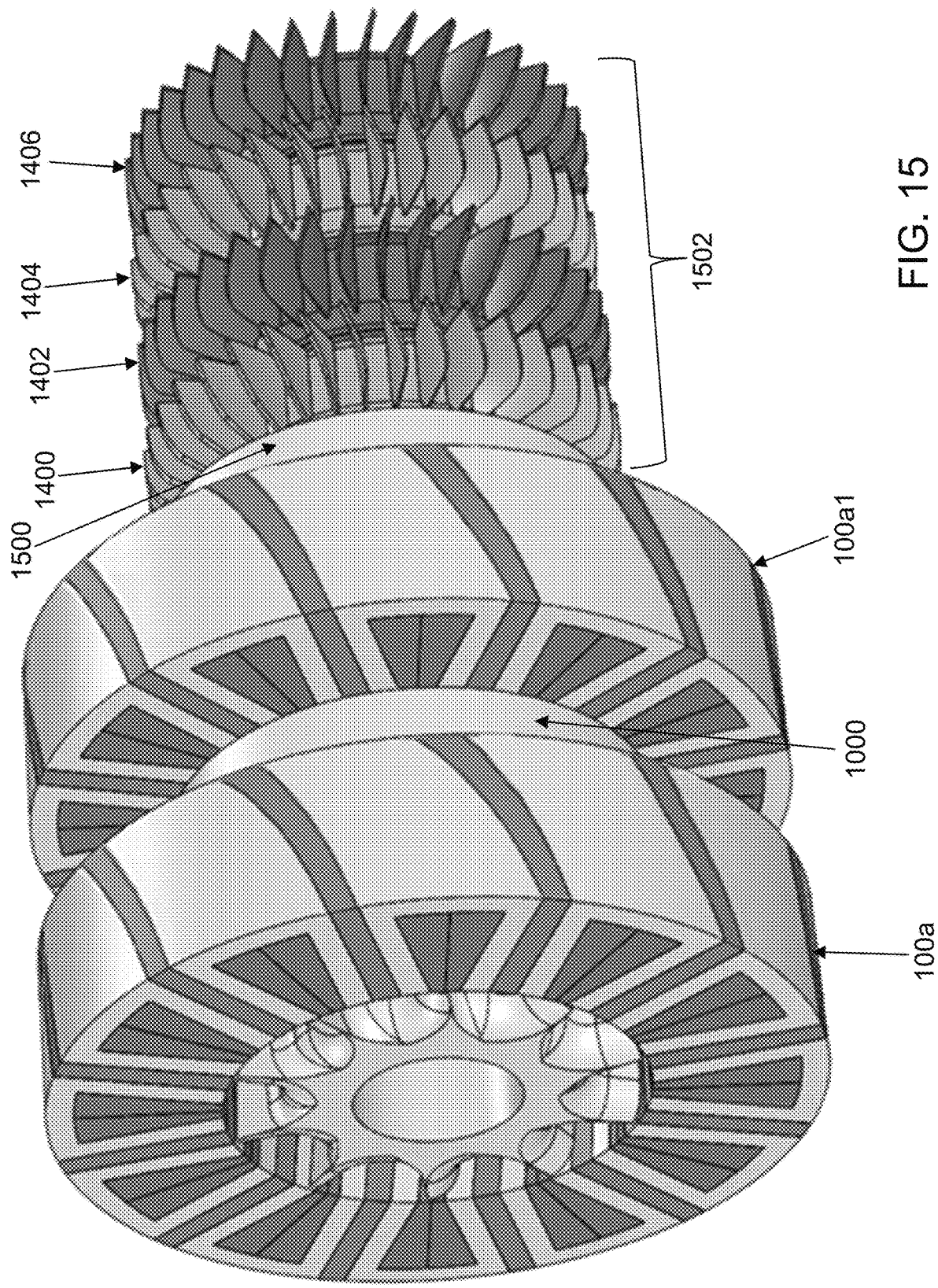
FIG. 15 depicts a perspective view of a cascaded connection of two electrical machines of FIG. 10 with a cascaded connection of multi-stage compressors in accordance with an illustrative embodiment.

Referring to FIG. 15, a perspective view of second electrical machine 100a, diffuser 1000, a second instance 100a1 of second electrical machine 100a, and a second diffuser 1500 is shown with a connection to a second multi-stage compressor 1502 in accordance with an illustrative embodiment. Diffuser 1000 is mounted to receive compressed gas from second electrical machine 100a. Second instance 100a1 of second electrical machine 100a is mounted to receive compressed gas from diffuser 1000. Second diffuser 1500 is mounted to receive compressed gas from second instance 100a1 of second electrical machine 100a. Second multi-stage compressor 1502 is mounted to receive compressed gas from second diffuser 1500. In the illustrative embodiment of FIG. 15, second multi-stage compressor 1502 includes first rotating compressor 1402 paired with first stationary compressor 1404 and second rotating compressor 1406 paired with a second stationary compressor 1408. Second multi-stage compressor 1502 may include a fewer or a greater number of arrays of airfoils. Diffuser 1000 and/or second diffuser 1500 may not be included in alternative embodiments. A greater number of electrical machines 100 of the same or different type may be included in alternative embodiments.

Figure 16:
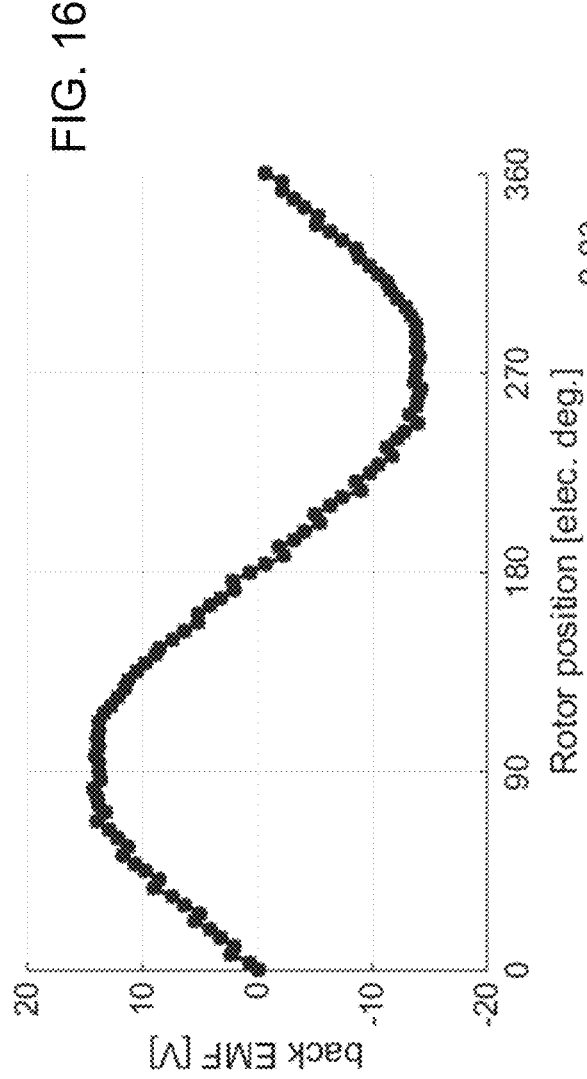
FIG. 16 depicts a back-electromotive force generated by the electrical machine of FIG. 1 as a function of the rotor position in accordance with an illustrative embodiment.
Figure 17:
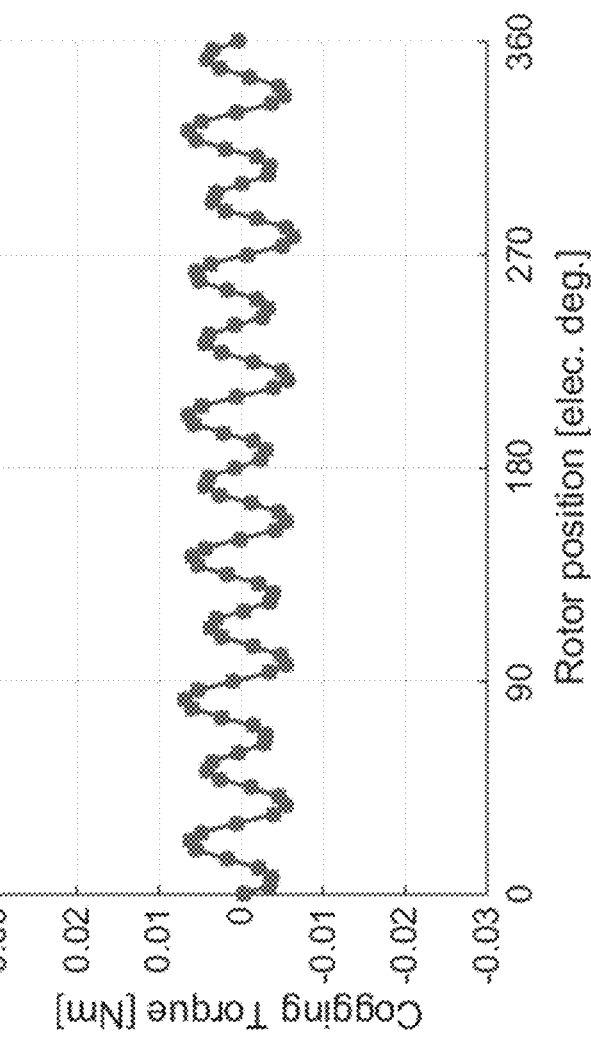
FIG. 17 depicts a cogging torque generated by the electrical machine of FIG. 1 as a function of a rotor position in accordance with an illustrative embodiment.
Figure 18:
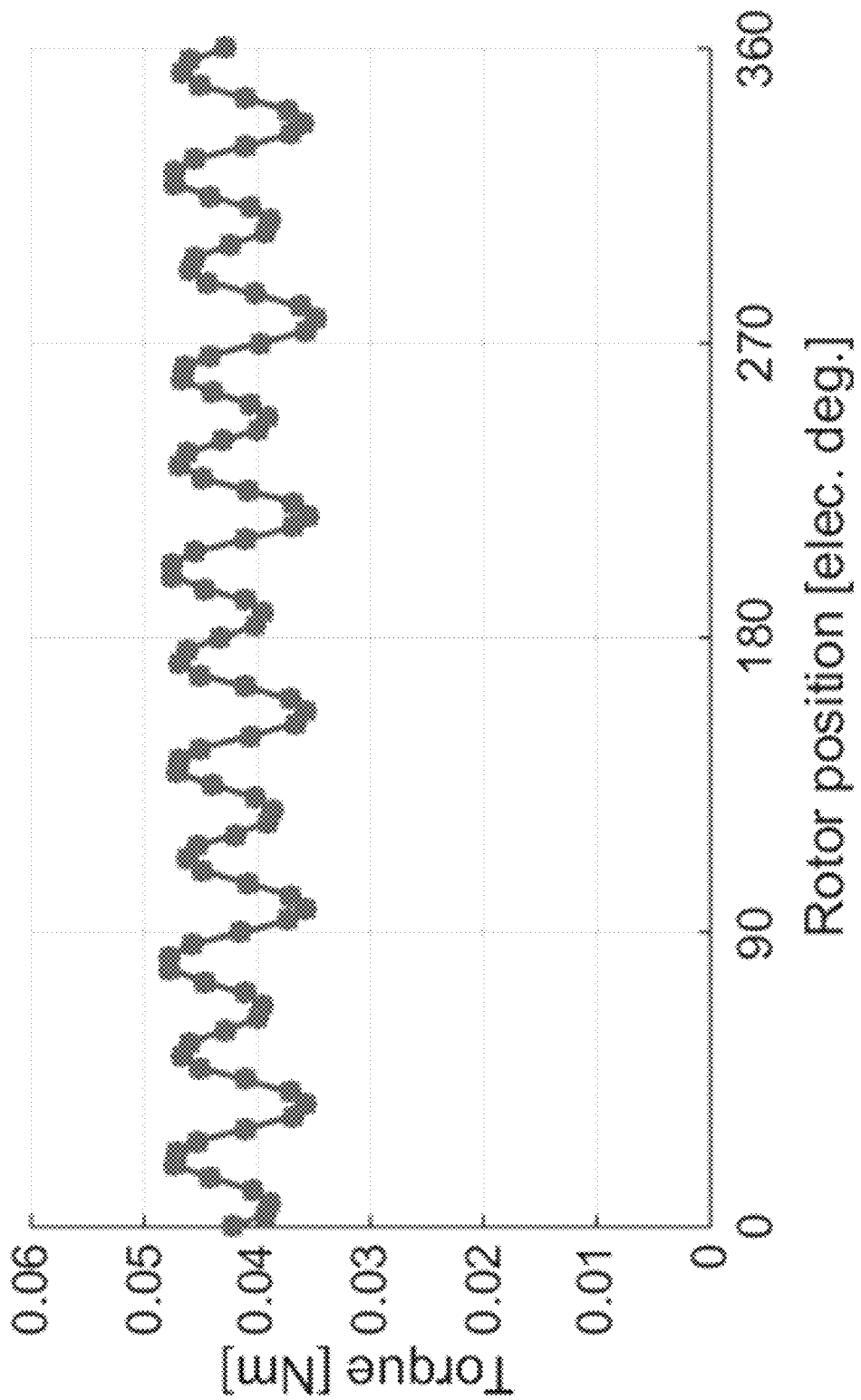
FIG. 18 depicts a torque generated by the electrical machine of FIG. 1 as a function of the rotor position in accordance with an illustrative embodiment.

The various dimensions of the elements of the electrical machines described herein may be determined based on desired rated performance characteristics using analytical sizing equations and finite element analysis using an electromechanical design tool. For example, referring to FIG. 16, a back-electromotive force (back-EMF) generated by electrical machine 100 as a function of a rotor position is shown in accordance with an illustrative embodiment. Referring to FIG. 17, a cogging torque generated by electrical machine 100 is shown in accordance with an illustrative embodiment. Referring to FIG. 18, a torque generated by electrical machine 100 as a function of the rotor position is shown in accordance with an illustrative embodiment. The cogging torque, the back-EMF, and the torque were determined using finite element analysis and the parameter values listed in Table 1 below.

TABLE 1

| Parameters | Values |
| --- | --- |
| Electrical machine power, $P_{out}$ [kW] | 40 |
| Rotor speed n [krpm] | 15 |
| Hub diameter $D_{hub}$ [mm] | 103.2 |
| Blade tip diameter $D_{tip}$ [mm] | 136.4 |
| Stator curve slot pitch | 1 |
| Blade turn angle, θ [deg.] | 30 |
| Axial air velocity, $V_1$ [m/s] | 170 |
| Specific gas constant, $R_{specific}$ [J/(kg*K)] | 287.1 |
| Air pressure $p_{o1}$ [kPa] | 101.3 |
| Air temperature, $T_1$ [K] | 300 |
| Mass rate of flow, ṁ [kg/s] | 1.249 |
| Torque required, T [Nm] | 7.524 |
| Power required, P [kW] | 11.82 |
| Inlet stagnation temperature, $T_{o1}$ [K] | 314.4 |

TABLE 1-continued

| Parameters | Values |
| --- | --- |
| Rotor outlet stagnation temperature, $T_{o1.5}$ [K] | 323.8 |
| Ideal pressure rise | 10.88% |

Hub diameter $D_{hub}$ is a diameter 500 (shown referring to FIG. 5) of a yoke of rotor 104. Blade tip diameter $D_{tip}$ is an outer diameter 502 (shown referring to FIG. 5) of rotor 104. Axial air flux velocity $V_1$ is a magnitude of gas flow velocity vector 700 at an input to diffuser 1000. Air pressure $p_{o1}$ is a pressure at an inlet of diffuser 1000. Air temperature $T_1$ is an input air temperature. Torque required, T, and power required, P, is a torque and a power, respectively, required to compress the gas. Ideal pressure rise is a percentage pressure increase at an output with respect to an inlet pressure. The airflow compression pressure rise of rotor 104 was calculated as 10.88%, which is in a typical range of 5% to 20% for a single stage compression using subsonic tip speed blades. The power required to compress the air is calculated to be 11.82 kW, so the remaining power supplied by the electrical machine can be used for additional rotating compressor stages. The proposed machine has a sinusoidal back-EMF and a small cogging torque, which is beneficial to improving efficiency.

To further refine the parameters of the electrical machines describe herein including a determination of an optimum curve angle for stator 102 and rotor 104 as well as the airfoil shape of the plurality of blades to achieve maximum pressure ratios without sacrificing the electromagnetic performance, multi-physics simulations that integrate the analysis of electromagnetic, thermal, and fluid dynamic aspects are performed for various operating stages using advanced co-simulation and analysis tools.

Figure 19:
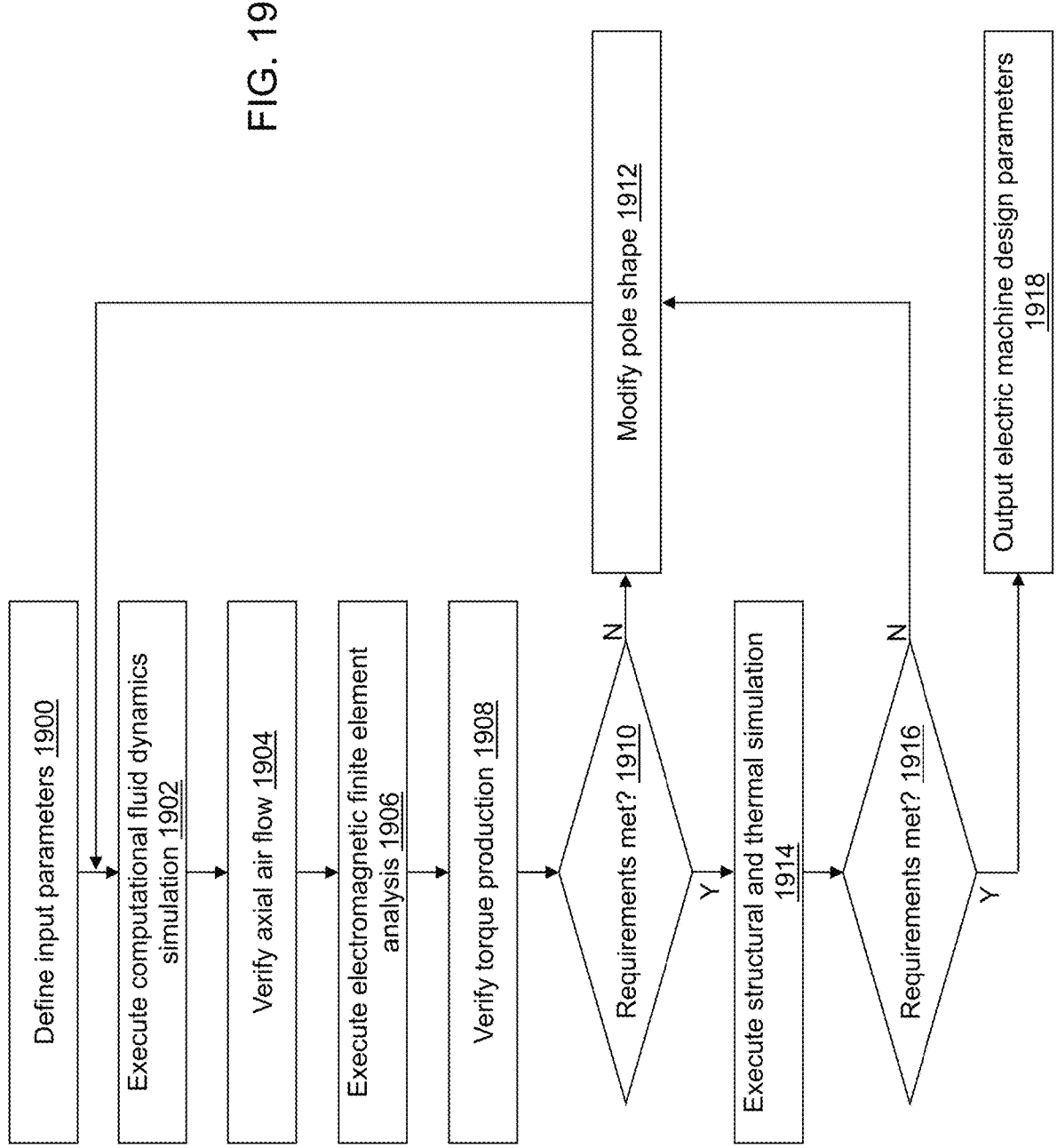
FIG. 19 depicts a flow diagram illustrating examples of operations performed to determine parameters for the electrical machines of FIGS. 1 and 10-13 in accordance with an illustrative embodiment.

A flowchart for the multi-physics design is provided in FIG. 19. In an operation, input parameters are defined. For example, in an operation 1900, initial dimensions of electrical machine 100 design requirements are defined for electrical machine 100 in terms of axial air flow, electromagnetic torque, structure, and thermal properties.

In an operation 1902, a computational fluid dynamics simulation of the defined electrical machine 100 is executed to determine axial airflow. In an operation 1904, the determined axial air flow is verified against the design requirements. At this stage, fluid dynamic properties of the designed machine are validated.

In an operation 1906, a finite element analysis simulation of the defined electrical machine 100 is executed to determine a torque production. In an operation 1908, the determined torque production is verified against the design requirements. At this stage, the electromagnetic properties of the designed machine are validated.

In an operation 1910, a determination is made concerning both fluid dynamics and electromagnetics to validate whether or not the determined axial air flow, compression ratio, and the determined torque production satisfy the design requirements. If the determined axial air flow, compression ratio, and the determined torque production satisfy the design requirements, processing continues in an operation 1914. If the determined axial air flow, compression ratio, and the determined torque production do not satisfy the design requirements, processing continues in an operation 1912.

In operation 1912, dimensions of the plurality of blades 118 that form the plurality of rotor poles are modified, and processing continues in operation 1902 with the modified dimensions. The curvature along with input (angle of attack) angle and output angle of the plurality of blades 118 are modified. The plurality of stator poles are also modified to have the average trajectory of the rotor curvature.

In operation 1914, structural and thermal simulation of the defined electrical machine 100 is executed to determine that the structure of the machine meets various mechanical requirements such as vibration, stress, and reliability. Similarly, thermal design of electrical machine 100 should be such that the machine receives adequate cooling, and the materials used in the machine do not exceed its temperature rating.

In an operation 1916, a determination is made concerning whether or not the determined torque, air flow, compression, thermal, vibration, stress, and reliability measures satisfy the design requirements. If the determined measures satisfy the design requirements, processing continues in an operation 1918. If the determined measures do not satisfy the design requirements, processing continues in operation 1912.

In operation 1918, the design parameters for electrical machine 100 that satisfy the design requirements are output, for example, to a computer-readable medium or a computer display.

In conventional compressors, a drive motor is mounted separately from a compressor assembly often with additional gears or outlet casing since the motor is mounted so that the axial flow of the gas is not compromised. The drive motor along with its independent cooling mechanism adds additional losses in addition to weight and volume. The electrical machines described herein provide a reduced volume and utilize the pressure and temperature difference.

By incorporating electrical machine 100, 100a, 100b, 100c, 100d at a low-pressure stage of a compressor, a natural cooling mechanism is provided for electrical machine 100, 100a, 100b, 100c, 100d keeping the internal temperature and losses at a minimum. Because axial-flow compression is particularly advantageous for higher pressure ratios, multiple stages of compression can be achieved by cascading electrical machine 100, 100a, 100b, 100c, 100d with one or more diffuser 1000. To further increase a discharge pressure, an axial flow compressor can be combined with a radial flow stage at the axial stage outlet.

Figure 20:
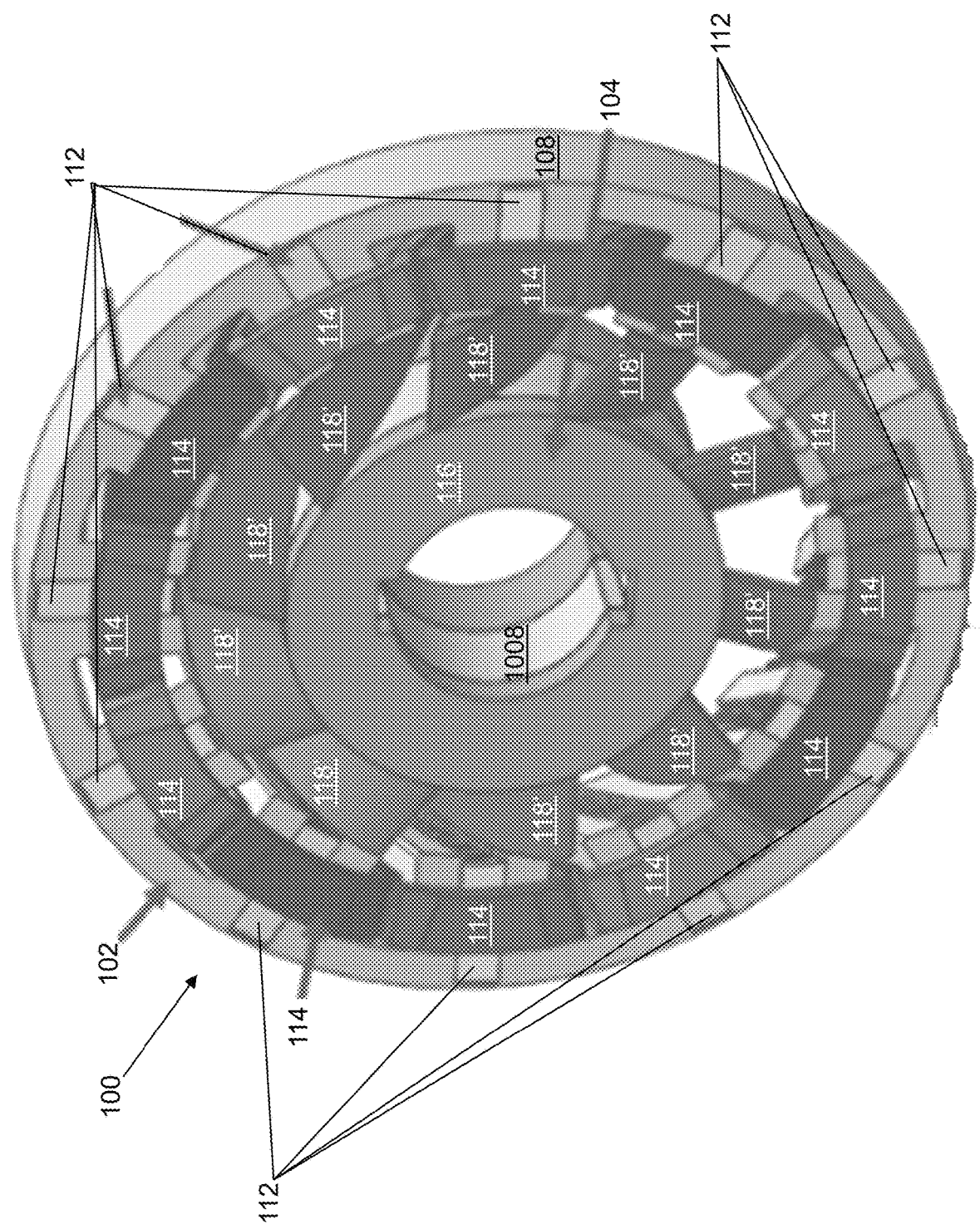
FIG. 20 depicts a perspective view of the electrical machine of FIG. 1 with different blade profiles in accordance with an illustrative embodiment.
Figure 21:
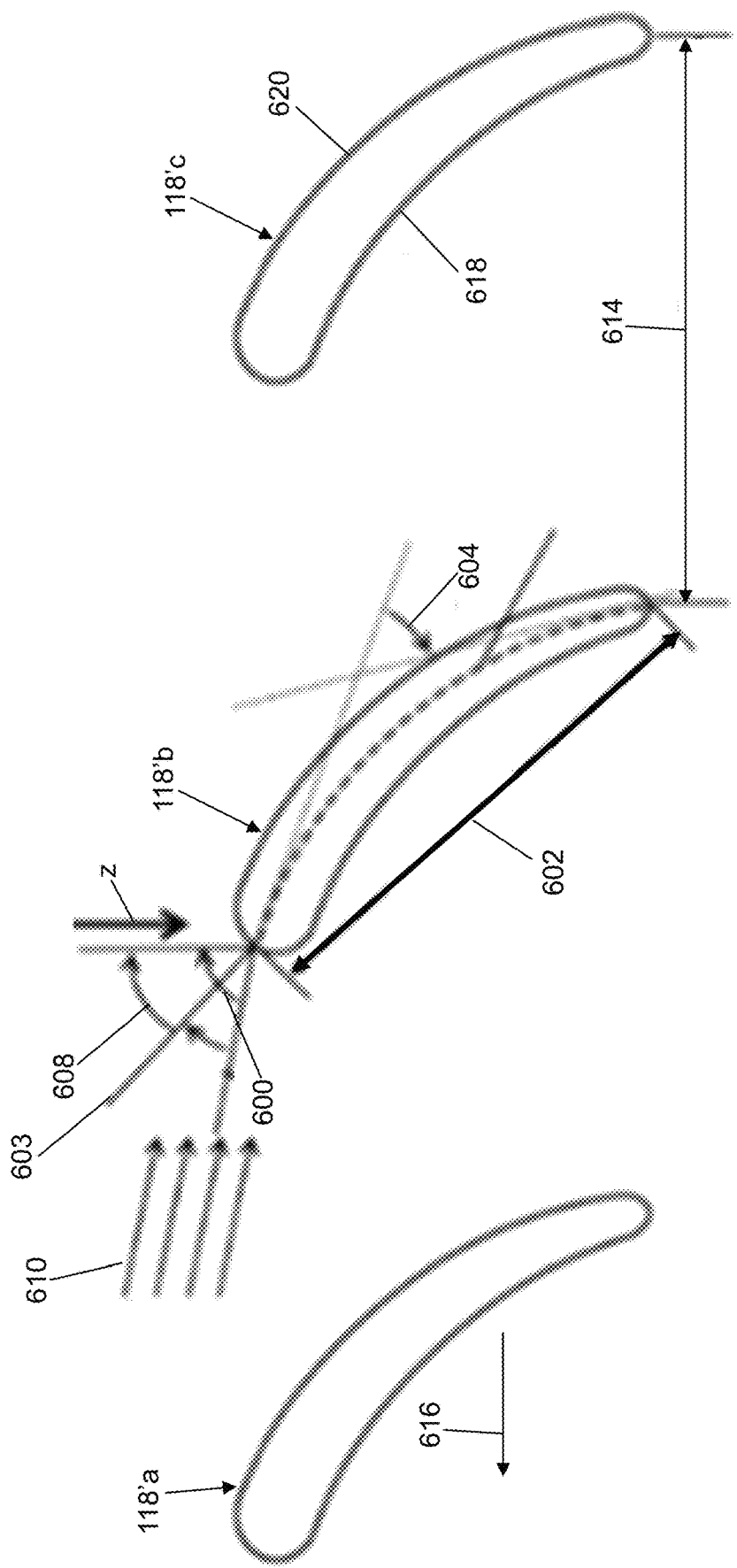
FIG. 21 depicts a rotor blade shape and nomenclature for a rotor of the electrical machine of FIG. 20 in accordance with an illustrative embodiment.
Figure 22:
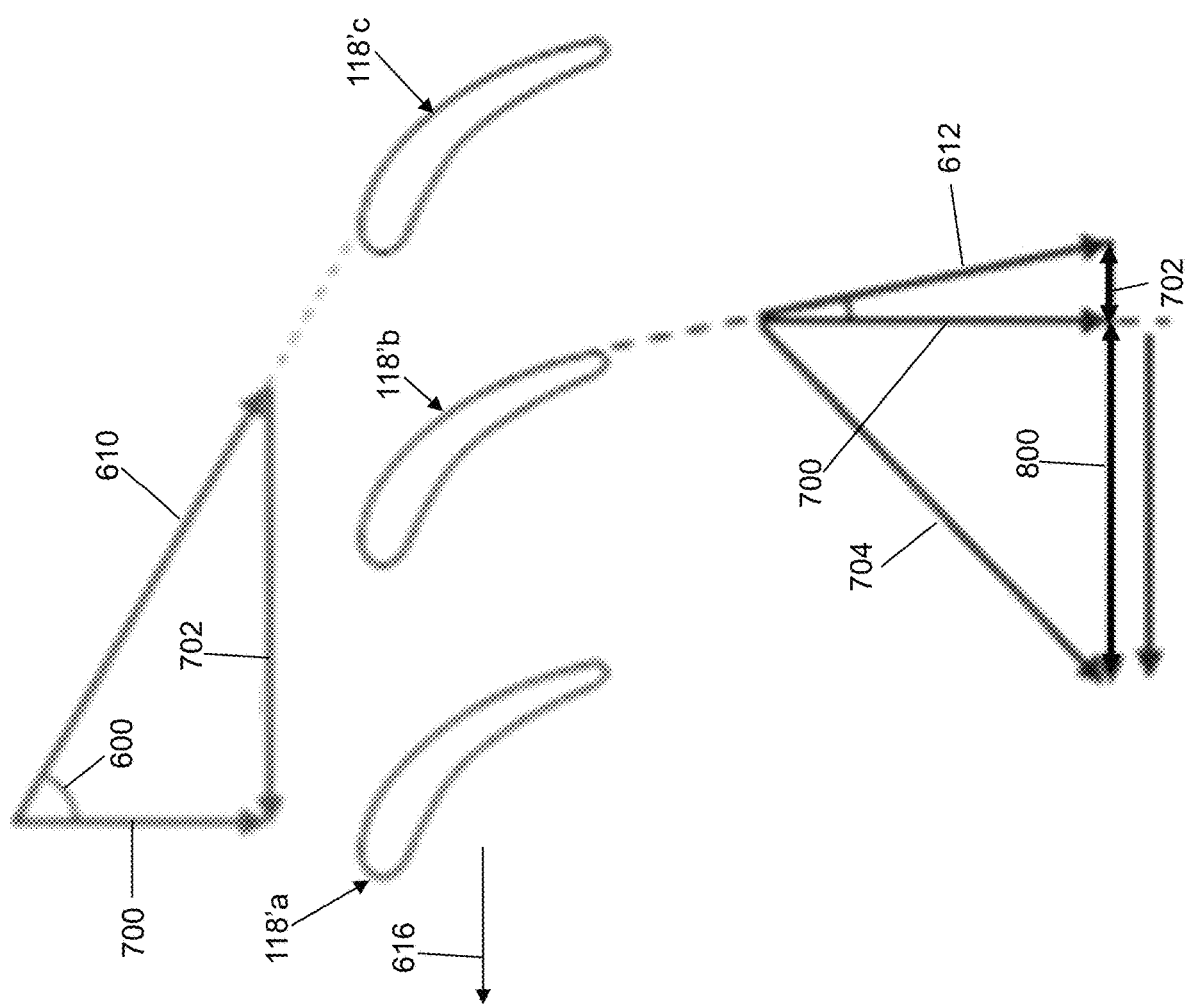
FIG. 22 depicts a velocity diagram of a flow through the rotor of the electrical machine of FIG. 20 in accordance with an illustrative embodiment.

Referring to FIG. 20, a perspective view is shown of electrical machine 100 with a second plurality of blades 118' that have a different blade profile than those shown in FIG. 1 in accordance with an illustrative embodiment. Similar to FIGS. 6 and 7, the blade nomenclature and related angles of the second plurality of blades 118' are shown in FIGS. 21 and 22. The second plurality of blades 118' includes a first blade 1181a, a second blade 1181b, a third blade 1181c, etc. that each have the same size and shape. The thermodynamic performance can be evaluated using analytical calculations based on vector diagrams as well as three-dimensional (3-D) computational fluid dynamics (CFD) simulation. The velocity triangle shown in FIG. 22 is used to calculate a flow inlet velocity, a flow outlet velocity, and a total pressure ratio of a rotor stage. The subscripts 1 and 1.5 refer to the inlet and outlet of the rotor stage, respectively. A power required for flow compression is given by $P_{comp} = \omega \dot{m} r (V_{u1.5} - V_{u1})$, where ω is a rotor rotational speed, ṁ is a mass flow rate, r is a rotor mid-radius, and $V_{u1}$, $V_{u1.5}$ are tangential components of $V_1$ and $V_{1.5}$, respectively, in the velocity triangle shown in FIG. 22, where $V_1$ is indicated by gas flow velocity vector 700, $V_{1.5}$ is indicated by gas flow outlet velocity vector 704, $V_{u1}$ is indicated by blade speed vector 702, and $V_{u1.5}$ is indicated by delta vector 800. The pressure ratio from the inlet to the outlet of the rotor stage can be calculated using $$\frac{P_{o1.5}}{P_{o1}} = \left(\frac{T_{o1.5}}{T_{o1}}\right)^{\frac{k}{k-1}},$$

where $P_o$ is a stagnation pressure in Pascals (Pa), $T_o$ is a stagnation temperature in Kelvin (K), and k is the specific heat ratio of air. The stagnation temperature at the inlet is computed using $$T_{o1} = T_1 + \frac{V_1^2}{2c_p},$$

and the stagnation temperature at the outlet is computed using $$T_{o1} = T_2 = T_{o1} - \frac{w_{12}}{c_p},$$

where $T_1$ is an inlet flow temperature, $c_p$ is a constant-pressure specific heat of gas, and $w_{12}$ is a work done to a flow from the blade which is computed using $$w_{12} = \frac{P_{comp}}{\dot{m}}.$$

To achieve a symmetric back-EMF waveform, a balanced force on rotor 104, and to limit the fundamental frequency, a 12/10 stator slot and rotor pole combination FSPM topology may be used. A sizing equation for torque calculation is determined using $$T_{out} = \frac{\sqrt{2}}{4} \pi^2 K_m K_t K_{curve} \eta \left(\frac{N_r}{N_s}\right) B_{g,pk} A_{s,rms} D_{is}^2 L_e,$$

where $K_m$ is a linkage flux factor, $K_t$ is a stator tooth width ratio, $K_{curve}$ is a curvature factor, η is a machine electrical efficiency, $N_s$ and $N_r$ are a number of stator slot and rotor poles, respectively, $B_{g,pk}$ is a peak airgap flux density in Tesla, $A_{s,rms}$ is an electric loading in $A_{rms}$/meter, $D_{is}$ is a stator inner diameter in meters (m), and $L_e$ is an effective length in meters. From the perspective of electrical machine 100, stagger angle 608 is equivalent to skewing rotor 104. Stator 102 and the plurality of magnets 112 may also be skewed to maximize torque production capability. A circumferential skew angle of stator 102, $\alpha_s$, may be computed using $$\alpha_s = 2\arcsin\left(\frac{0.5 l_e \tan\gamma}{r}\right),$$

where $l_e$ is a stator stack length and r is a stator inner radius. Ten segmentations may be applied to the plurality of magnets 112 to reduce magnet losses.

The design parameters and performance of electrical machine 100 with the second plurality of blades 118' are listed in Table 2.

TABLE 2

| Parameters and Performance | Value |
| --- | --- |
| Stator outer diameter [mm] | 300 |
| Stator stack length [mm] | 30 |
| Airgap length [mm] | 1 |
| Rotor tip diameter [mm] | 200 |
| Machine speed [rpm] | 10,000 |
| Fundamental frequency [Hz] | 1666.7 |
| Current density [$A_{rms}/mm^2$] | 5 |
| Winding turns per coil | 5 |
| Blade chord length [mm] | 76 |
| Stagger angle [deg] | 38 |
| Total pressure ratio calculated by velocity triangle | 1.029 |
| Compression power [kW] | 2.66 |
| Peak flux linkage [mWb] | 10.2 |
| Back-EMF [$V_{rms}$] | 76.2 |
| Average loaded torque [Nm] | 28.7 |
| Output power [kW] | 30 |
| Magnet loss [W] | 359 |
| Copper loss [W] | 190 |
| Stator iron loss [W] | 356 |
| Rotor iron loss [W] | 150 |
| Motor efficiency [%] | 96.6 |

Figure 23:
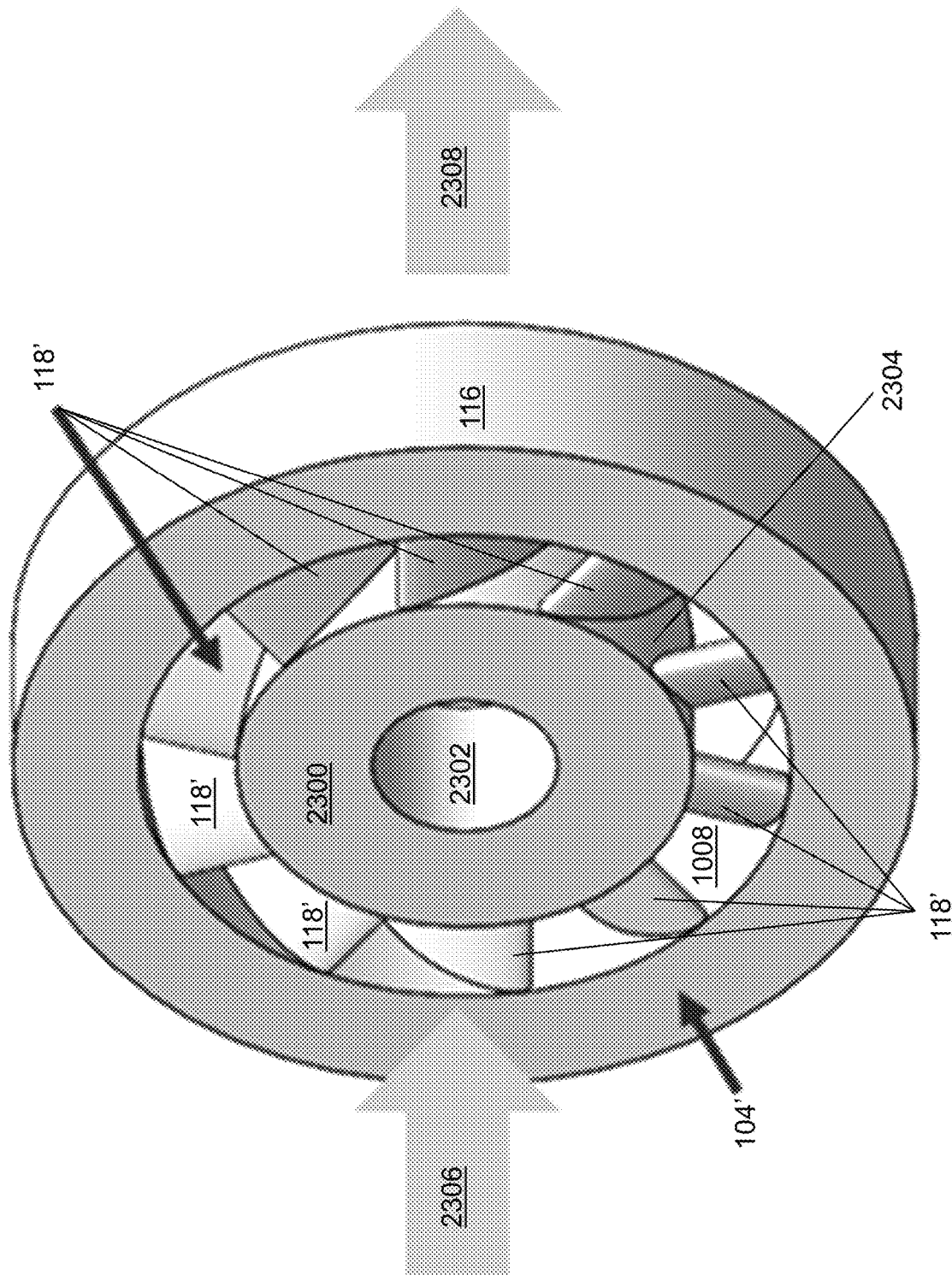
FIG. 23 depicts air flow through a hub with blades mounted interior of a rotor in accordance with an illustrative embodiment.

Referring to FIG. 23, an air intake flow 2306 and an air outtake flow 2308 are shown entering and exiting a hub 2300 with the second plurality of blades 118' mounted to rotor interior surface 1008 of rotor core 116 in accordance with an illustrative embodiment. Instead of extending radially outward from rotor core 116 of rotor 104, the second plurality of blades 118' extend radially outward from a hub exterior radial surface 2304 of hub 2300 and radially inward from rotor interior surface 1008 of rotor core 116. As a result, the second plurality of blades 118' are positioned between hub 2300 and rotor core 116. Shaft 106 may mount to a hub interior radial surface 2302 of hub 2300. The second plurality of blades 118' are mounted to rotor core 116 so that rotor 104' rotates with shaft 106 and hub 2300 when hub 2300 is mounted to shaft 106. As shaft 106 rotates hub 2300 and rotor core 116, the second plurality of blades 118' produce airflow around hub 2300 by pulling air as indicated by air intake flow 2306 toward hub 2300 and expelling air as indicated by air outtake flow 2308.

Figure 24:
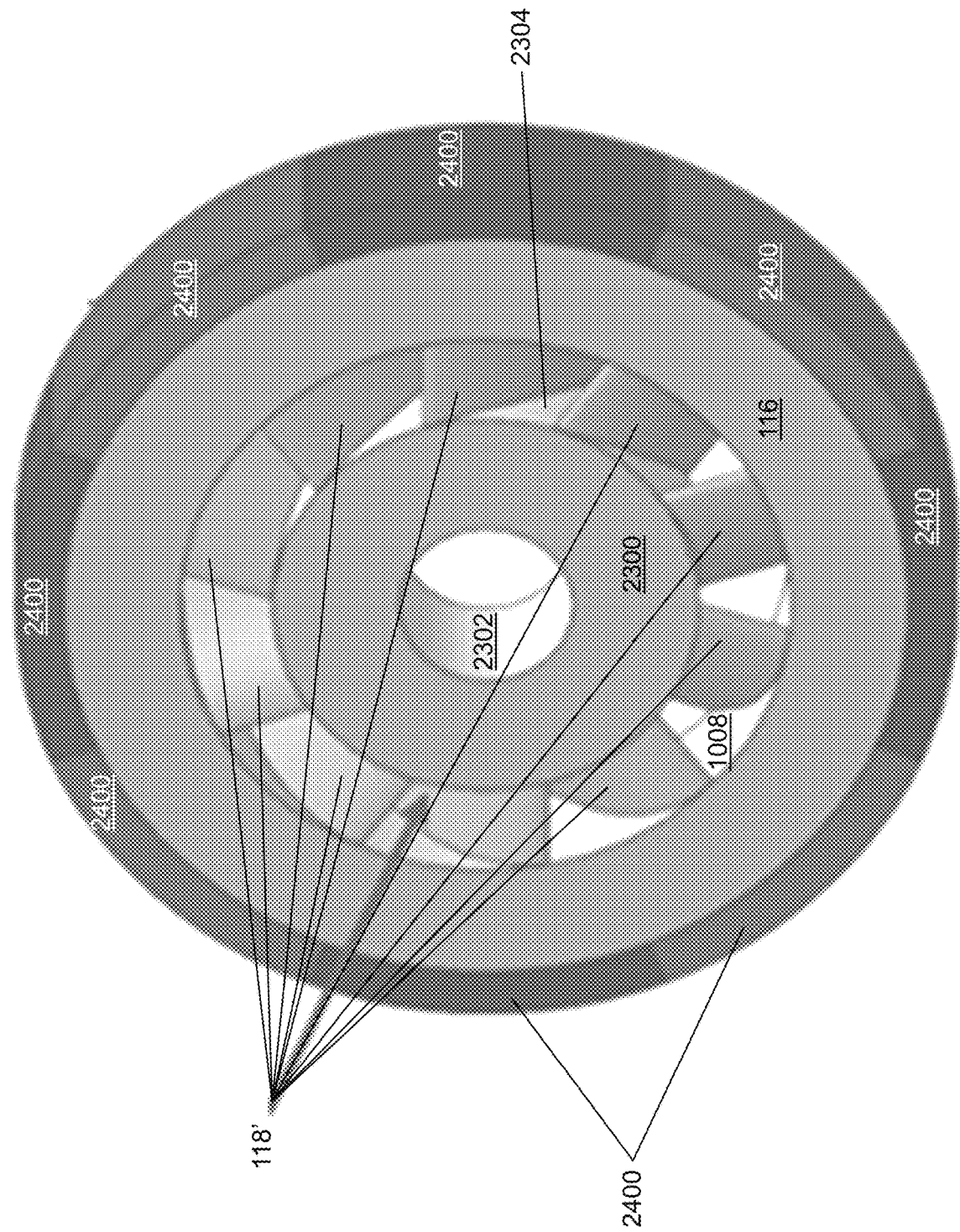
FIG. 24 depicts permanent magnets mounted to an exterior surface of the rotor of FIG. 23 in accordance with an illustrative embodiment.
Figure 25:
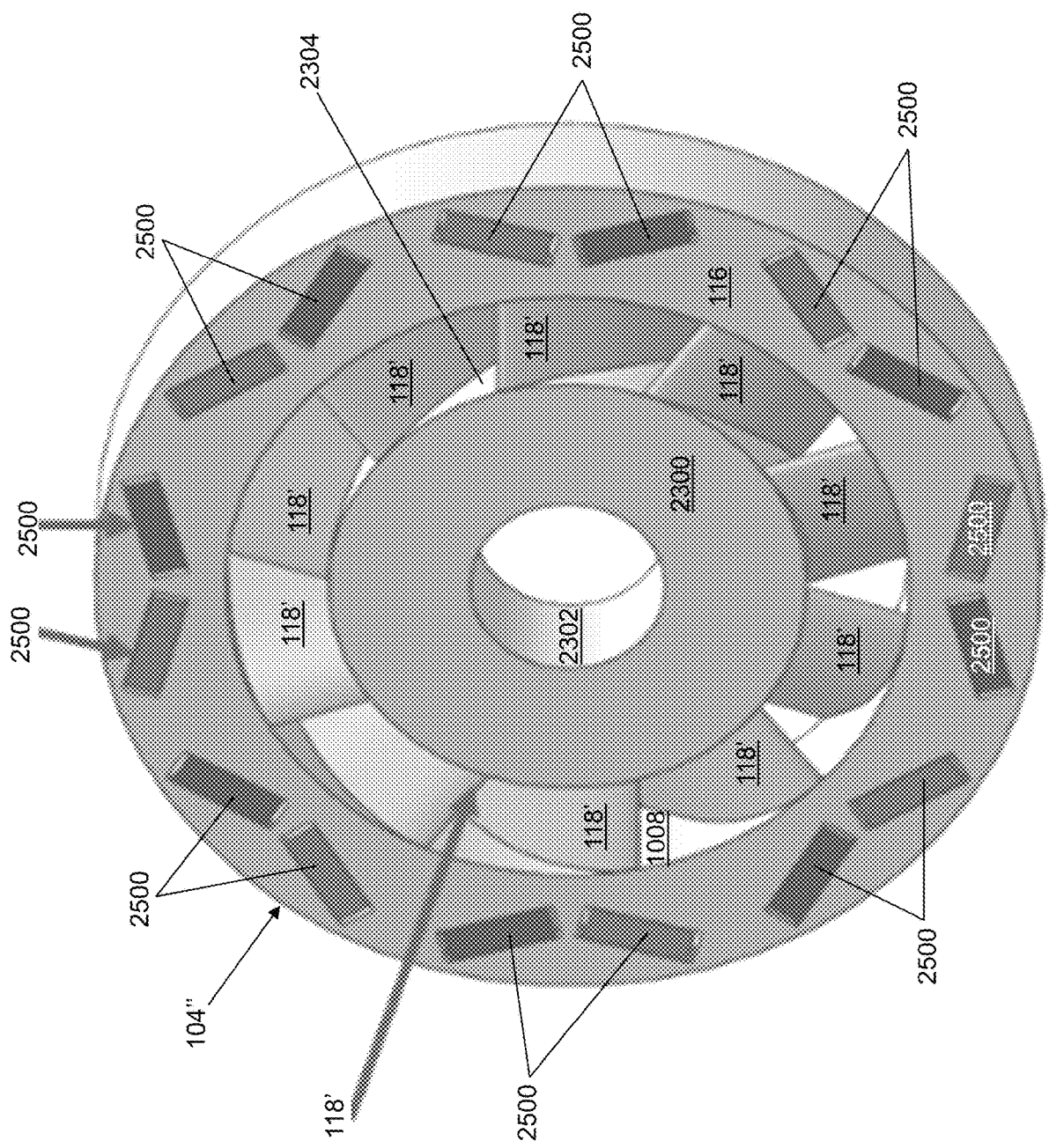
FIG. 25 depicts permanent magnets mounted to an interior of a core of the rotor of FIG. 23 in accordance with an illustrative embodiment.

Adding hub 2300 does not change how the plurality of magnets 112 are mounted to rotor core 116. For example, referring to FIG. 24, a second plurality of magnets 2400 are mounted to an exterior surface of rotor core 116 in accordance with an illustrative embodiment. As another example, referring to FIG. 25, a third plurality of magnets 2500 are mounted to interior apertures formed in rotor core 116 in accordance with an illustrative embodiment. A similar arrangement can be applied to induction machines and synchronous reluctance machines.

Rotor core 116 often rotates at high speed. When the plurality of blades 118 or the second plurality of blades 118' that form the rotor poles are shaped into airfoils, or the second plurality of blades 118' are mounted to hub 2300 and mounted within rotor core 116, rotor core 116 can function as a fan that draws air from a front part of electrical machine 100 and pushes the air to a rear part of electrical machine 100. In this process, an interior portion of the rotor iron, the second plurality of magnets 2400, and the third plurality of magnets 2500 can be cooled. Since for many types of PM machines, the permanent magnets are located on rotor 104, cooling the rotor iron also facilitates the cooling of the magnets. A number of blades and the airfoil shape can be adjusted to achieve an optimal cooling effect.

In addition to cooling the rotor iron, rotor core 116 also has the potential to facilitate end winding cooling as well as cooling the stator surface facing the end windings. When inlets and outlets are designed in a housing within which electrical machine 100 is mounted, the plurality of blades 118 or the second plurality of blades 118' draw the ambient air into the housing and push the air out through the outlet. The position of inlets and outlets can be designed strategically so that the flow is forced past the end winding areas which need the most cooling. For example, when radial inlets are placed above the end windings, the air is pulled across the stator steel and around end windings as well as end winding surfaces (typically copper) before entering the rotor stage and cooling the inner part of the rotor surface.

Figure 26:
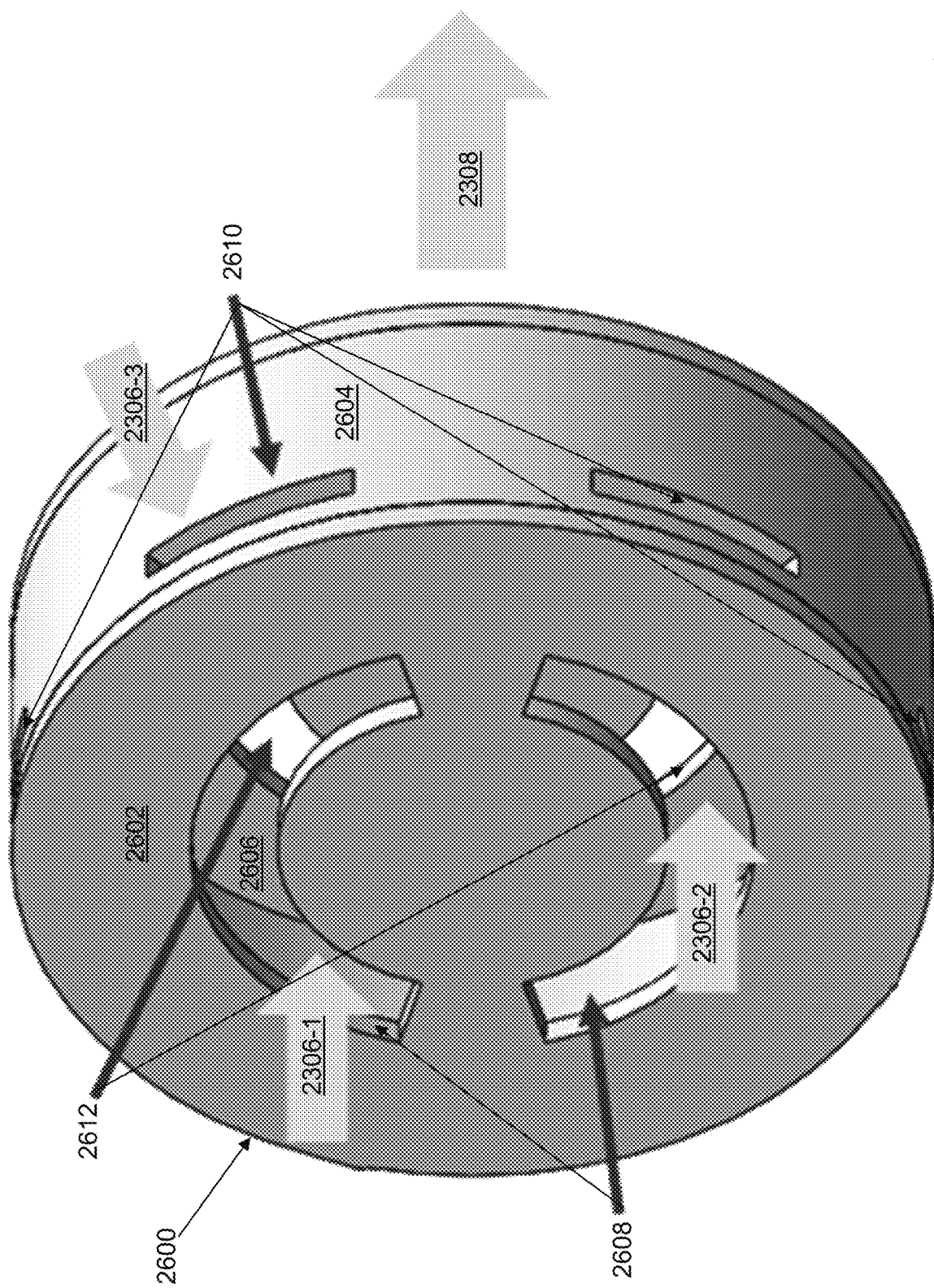
FIG. 26 depicts a perspective view of a housing for an electrical machine in accordance with an illustrative embodiment.

For example, referring to FIG. 26, a perspective view is shown of a housing 2600 in accordance with an illustrative embodiment. Housing 2600 may include a front wall 2602, a radial sidewall 2604, and a back wall 2606 that form an enclosure. Typically, front wall 2602 and back wall 2606 are circular in cross-section axially, and radial sidewall 2604 has a hollow circular shape though other shapes including elliptical and polygonal shapes may be used in alternative embodiments. Axial inlet aperture walls 2608 are formed in front wall 2602. In the illustrative embodiment, the axial inlet aperture walls 2608 form arcs relative to a center of front wall 2602 that extend axially through front wall 2602. Radial inlet aperture walls 2610 are formed in radial sidewall 2604 and also form arcs relative to a center of radial sidewall 2604 and extend circumferentially around radial sidewall 2604. Axial outlet aperture walls 2612 are formed in back wall 2606. In the illustrative embodiment, the axial outlet aperture walls 2612 form arcs relative to a center of back wall 2606 that extend axially through back wall 2606. Air is pulled into the axial inlet aperture walls 2608 as indicated by a first air intake flow 2306-1 and a second air intake flow 2306-2 and into the radial inlet aperture walls 2610 as indicated by a third air intake flow 2306-3 toward hub 2300 and expelled as indicated by air outtake flow 2308.

Figure 27:
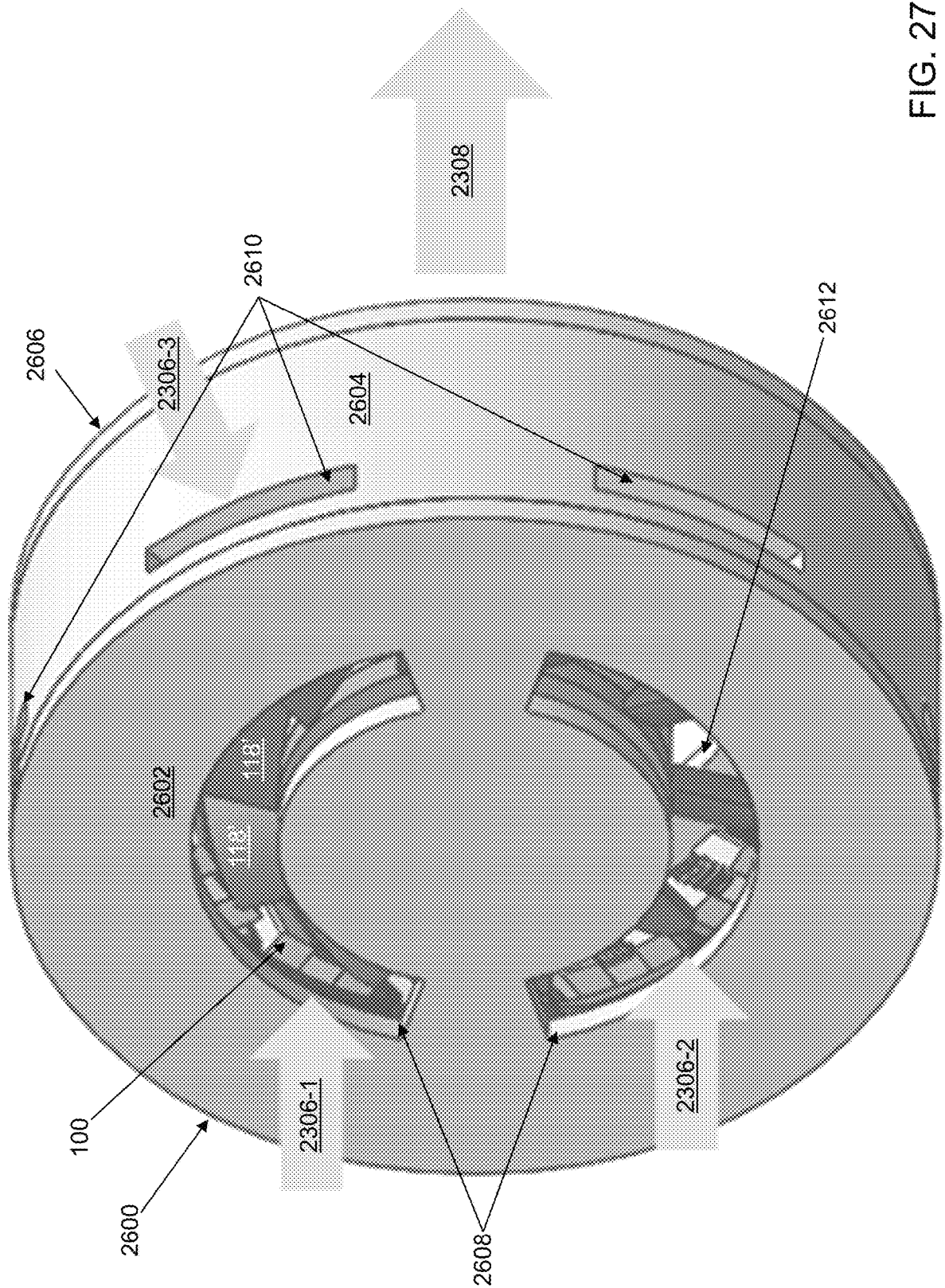
FIG. 27 depicts a perspective view of the housing of FIG. 26 with the electrical machine of FIG. 20 mounted within the housing in accordance with an illustrative embodiment.
Figure 28A:
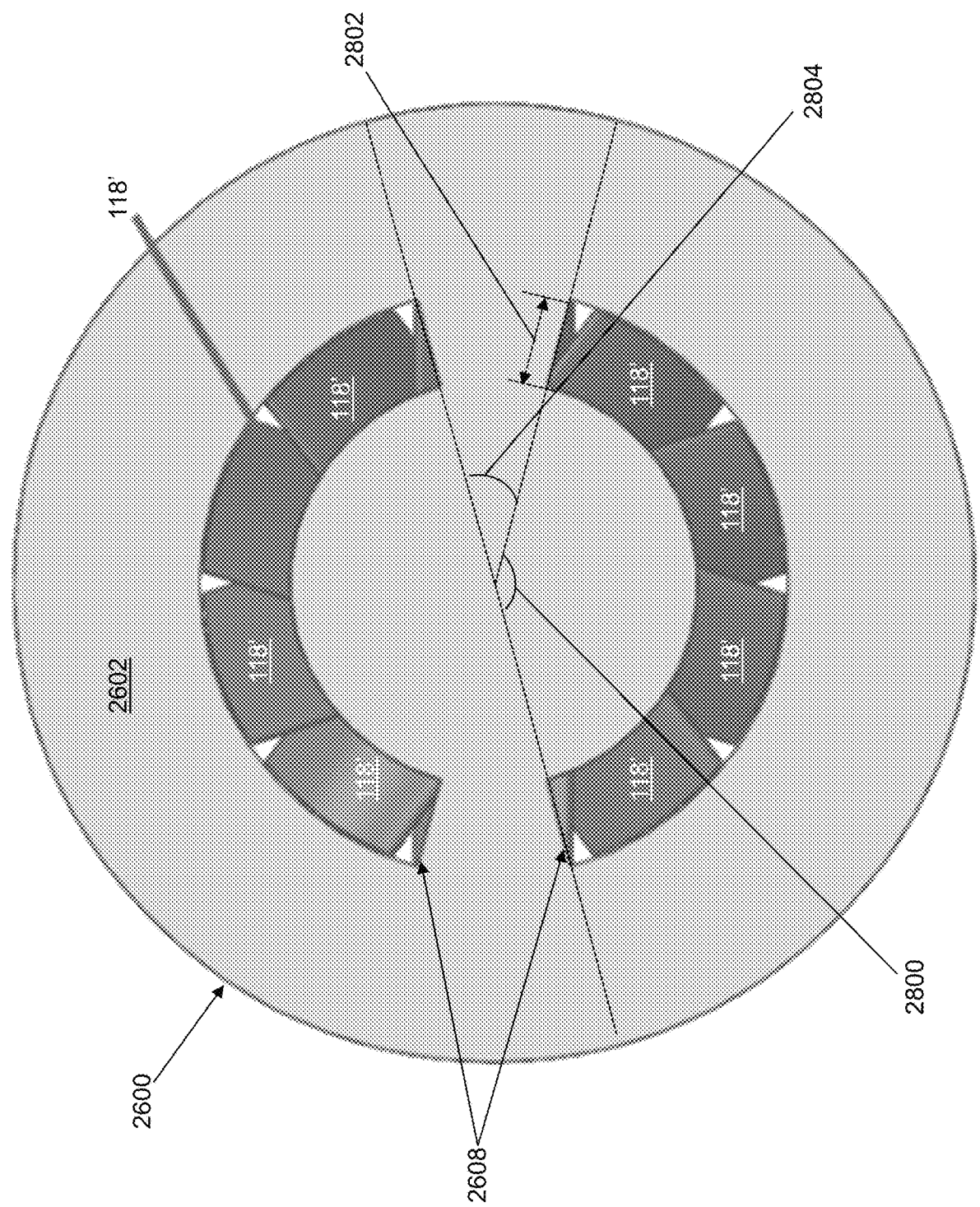
FIG. 28A depicts a front view of the housing of FIG. 26 with the electrical machine of FIG. 20 mounted within the housing in accordance with an illustrative embodiment.
Figure 28B:
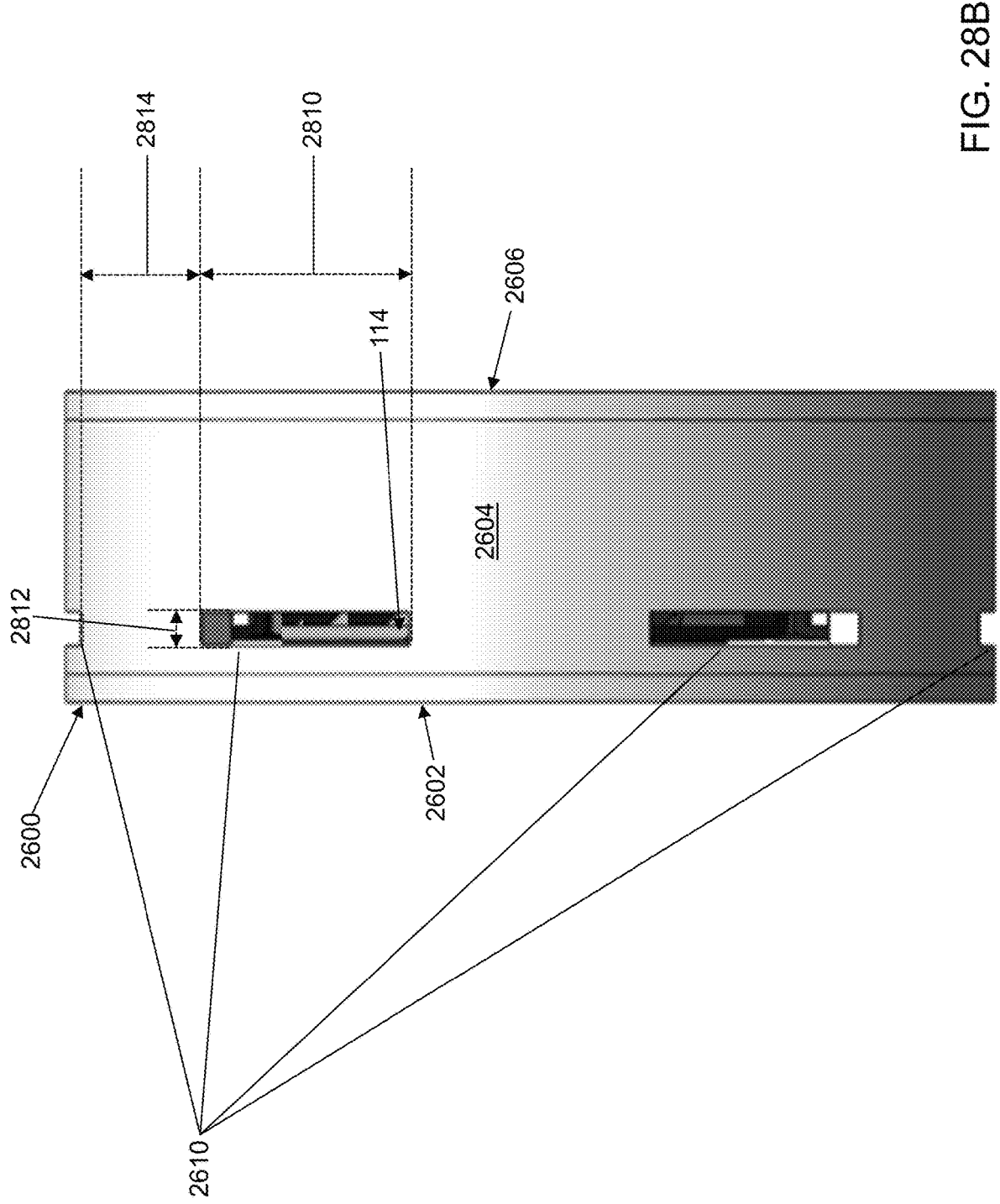
FIG. 28B depicts a side view of the housing of FIG. 26 with the electrical machine of FIG. 20 mounted within the housing in accordance with an illustrative embodiment.

Referring to FIG. 27, a perspective view is shown of housing 2600 with electrical machine 100 mounted therein in accordance with an illustrative embodiment. Referring to FIG. 28A, a front view is shown of housing 2600 with electrical machine 100 mounted therein in accordance with an illustrative embodiment. Referring to FIG. 28B, a side view is shown of housing 2600 with electrical machine 100 mounted therein in accordance with an illustrative embodiment. Referring to FIG. 29, a side cross-sectional view is shown of the 3-D CFD model of housing 2600 with electrical machine 100 mounted therein in accordance with an illustrative embodiment.

Referring to FIG. 28A, a radial angle 2800 defines an angle spanned by the axial inlet aperture walls 2608 that have a radial width 2802. A radial separation angle 2804 separates adjacent axial inlet apertures. In alternative embodiments, the axial inlet aperture walls 2608 can have alternative shapes. A fewer or a greater number of axial inlet apertures may be formed by the axial inlet aperture walls 2608. For example, in the illustrative embodiment, the axial inlet aperture walls 2608 define two axial apertures. Preferably, the axial inlet aperture walls 2608 are positioned in front of the plurality of blades 118 or the second plurality of blades 118'. In an illustrative embodiment, the axial outlet aperture walls 2612 are sized, shaped, and positioned in and through back wall 2606 similar to the axial inlet aperture walls 2608 relative to front wall 2602 though this is not required.

Referring to FIG. 28B, a radial arclength 2810 defines an arclength of each radial inlet aperture of the radial inlet aperture walls 2610. An axial width 2812 defines a width of each radial inlet aperture of the radial inlet aperture walls 2610 in the axial direction. A radial separation arclength 2814 separates adjacent radial inlet apertures. In alternative embodiments, the radial inlet aperture walls 2610 can have alternative shapes. A fewer or a greater number of radial inlet apertures may be formed by the radial inlet aperture walls 2610. For example, in the illustrative embodiment, the radial inlet aperture walls 2610 define six radial apertures evenly distributed circumferentially around radial sidewall 2604. Preferably, the radial inlet aperture walls 2610 are positioned above a front portion of the end windings of the plurality of windings 114. Though not shown in the illustrative embodiment of housing 2600, radial outlet aperture walls may be formed in radial sidewall 2604.

Rotation of the plurality of blades 118 or the second plurality of blades 118' draws ambient air from an exterior of housing 2600 into electrical machine 100 through the radial and/or axial inlets. Then, air passes over the front end winding and stator surface and is accelerated by the rotating blades towards the rotor stage. Finally, air exits housing 2600 through radial and/or axial outlets and cools the rear end winding and stator surface. In this process, self-cooling can be achieved from forced convection provided by the high-speed flow. It is desirable to have a small pressure drop associated with the air flow through housing 2600 so that the delivered pressure rise is close to the pressure rise produced at rotor 104. The light shaded arrows show the air flow direction.

3-D CFD simulations were performed to evaluate the convective heat transfer coefficient at different surfaces for electrical machine 100. To simplify the model and improve accuracy, the axial and radial inlets and the axial outlets were analyzed in separate models.

Figure 31:
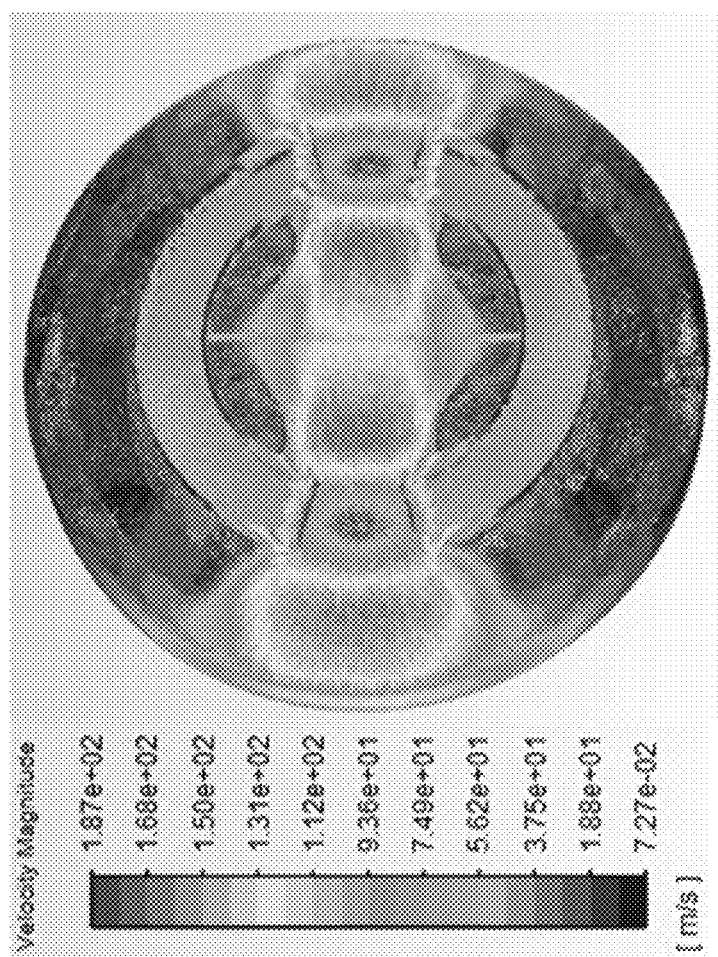
FIG. 31 shows an outlet air flow velocity pattern within the housing of FIG. 26 with the electrical machine of FIG. 20 mounted within the housing in accordance with an illustrative embodiment.
Figure 30:
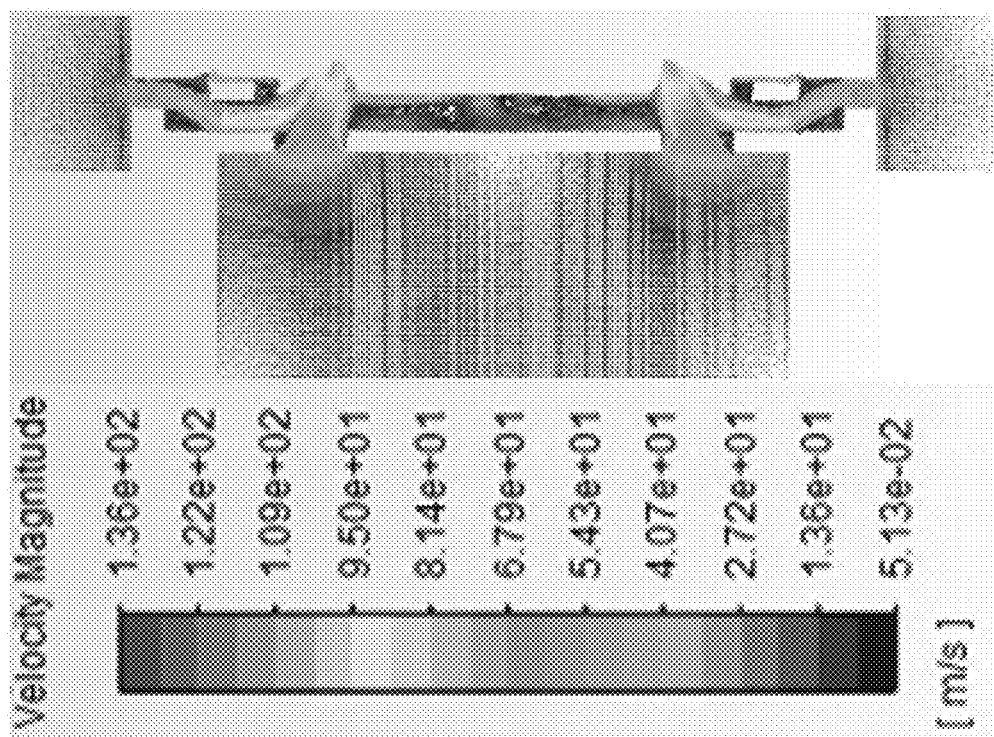
FIG. 30 shows an inlet air flow velocity pattern within the housing of FIG. 26 with the electrical machine of FIG. 20 mounted within the housing in accordance with an illustrative embodiment.

Referring to FIG. 30, an inlet air flow velocity pattern is shown relative to housing 2600 with electrical machine 100 mounted therein in accordance with an illustrative embodiment. Referring to FIG. 31, an outlet air flow velocity pattern is shown relative to housing 2600 with electrical machine 100 mounted therein in accordance with an illustrative embodiment. In FIG. 30, it can be observed that the air drawn into the radial inlet aperture walls 2610 and the axial inlet aperture walls 2608 has a large velocity that passes over the end winding and stator surfaces. In the outlet model shown in FIG. 31, the flow leaving the fan zone has a high velocity and directly exits housing 260 through the axial outlet aperture walls 2612. In those regions without an adjacent outlet, airflow is blocked and flows to the region above the rear end winding and stator surface, cooling these surfaces.

Figure 32:
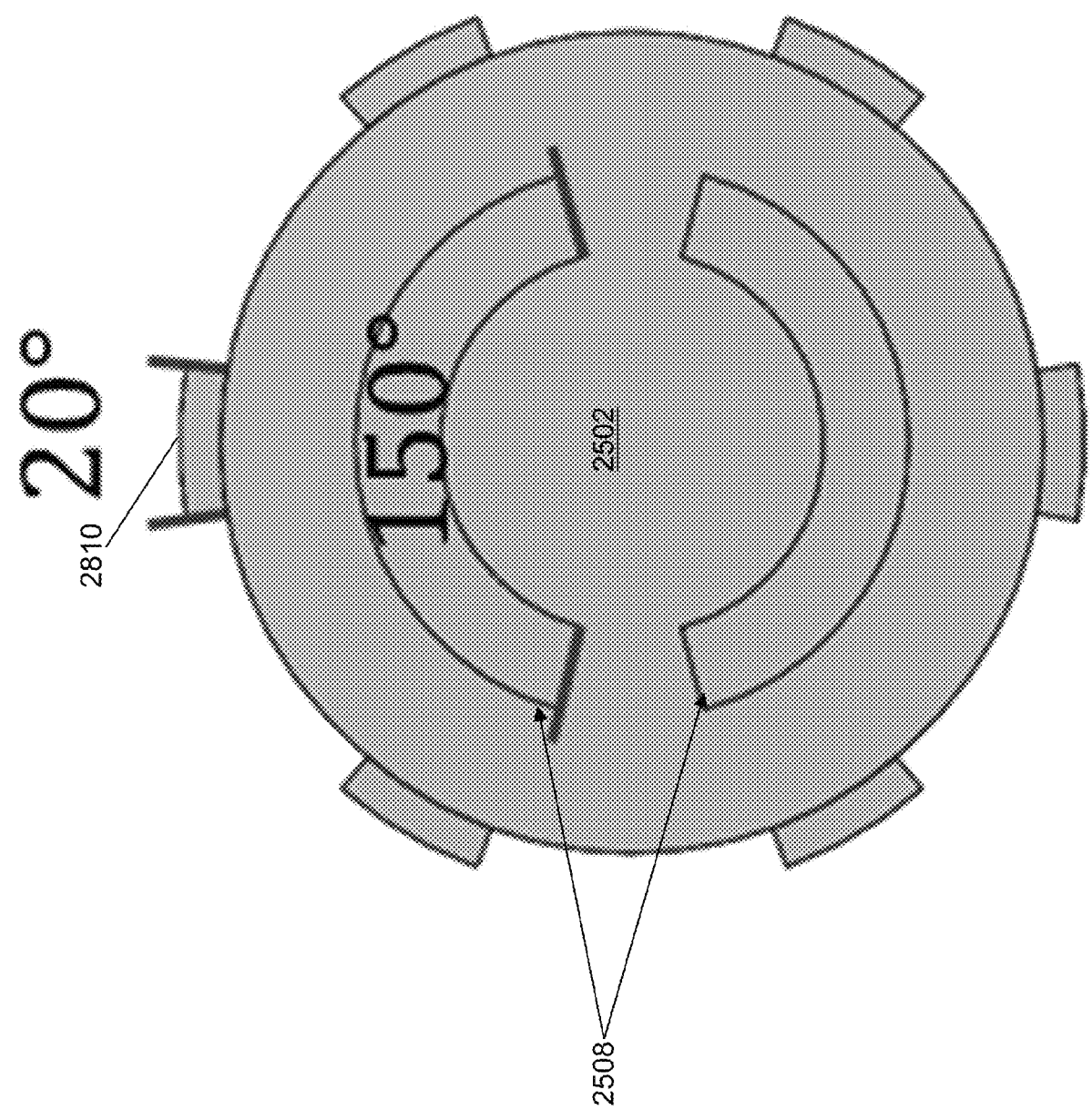
FIG. 32 shows a front view of a housing to illustrate angle variations in alternative housing designs in accordance with an illustrative embodiment.

The area, location, and the number of the axial inlet aperture walls 2608 and of the axial outlet aperture walls 2612 can be adjusted to guide flow direction and achieve a desired cooling effect. For example, referring to FIG. 32, an illustrative housing includes two axial inlet apertures each with a radial angle 2800 of 150-degrees and six radial inlet apertures with a radial arclength 2810 of 20-degrees. Four inlet models were simulated. Each inlet model included the two axial inlet apertures each with a radial angle 2800 of 150-degrees. A first inlet model included the six radial inlet apertures with a radial arclength 2810 of 10-degrees. A second inlet model included the six radial inlet apertures with a radial arclength 2810 of 20-degrees. A third inlet model included the six radial inlet apertures with a radial arclength 2810 of 30-degrees. A fourth inlet model included the six radial inlet apertures with a radial arclength 2810 of 40-degrees.

Figure 33A:
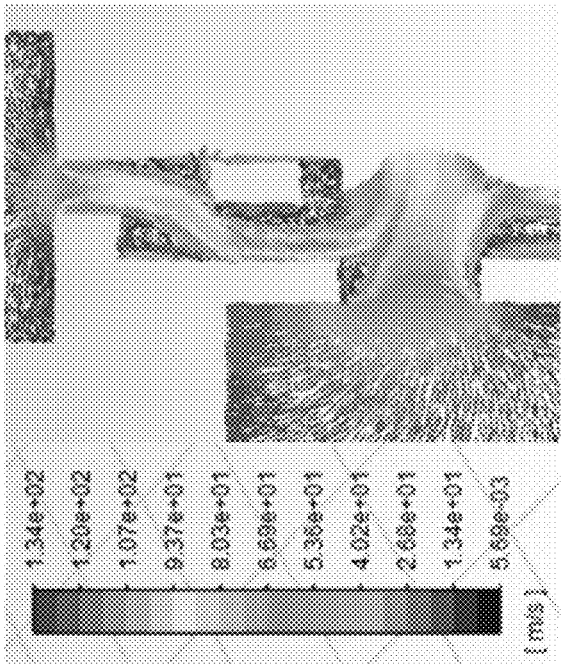
FIG. 33A shows a side view of an inlet air flow velocity pattern within the housing of FIG. 26 with the electrical machine of FIG. 20 mounted within the housing with a 10-degrees radial inlet size in accordance with an illustrative embodiment.
Figure 33B:
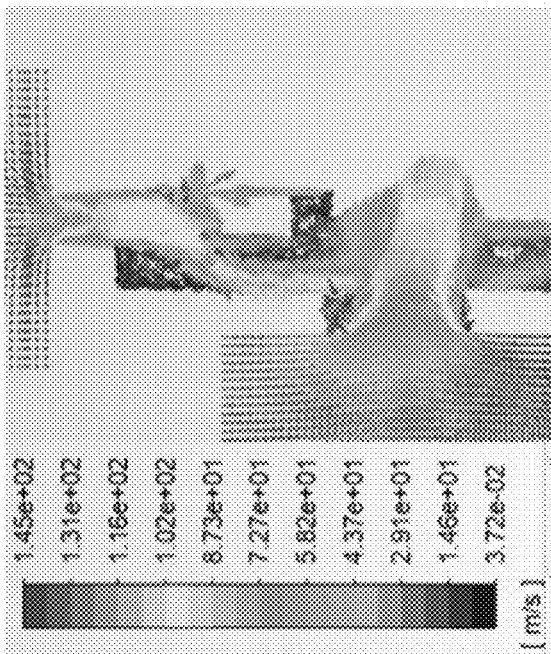
FIG. 33B shows a side view of an inlet air flow velocity pattern within the housing of FIG. 26 with the electrical machine of FIG. 20 mounted within the housing with a 20-degrees radial inlet size in accordance with an illustrative embodiment.
Figure 33C:
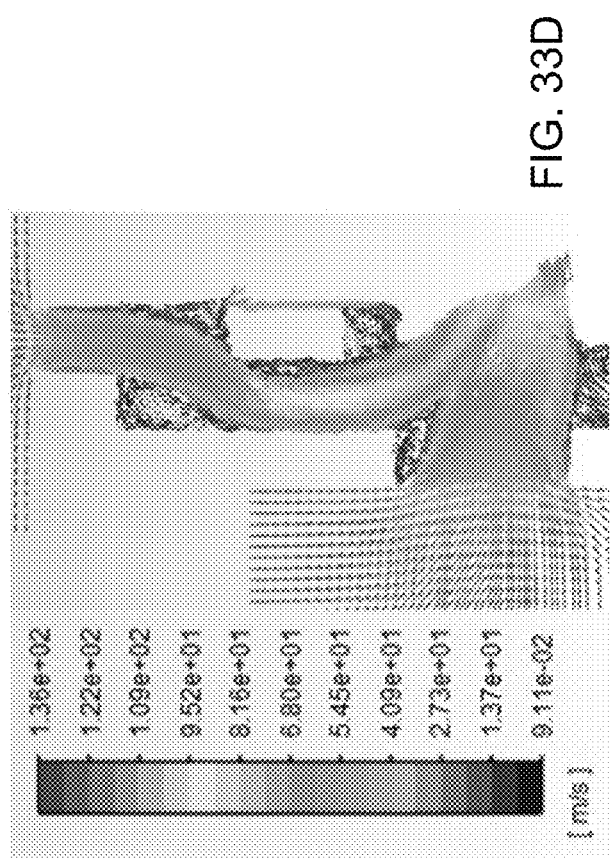
FIG. 33C shows a side view of an inlet air flow velocity pattern within the housing of FIG. 26 with the electrical machine of FIG. 20 mounted within the housing with a 30-degrees radial inlet size in accordance with an illustrative embodiment.
Figure 33D:
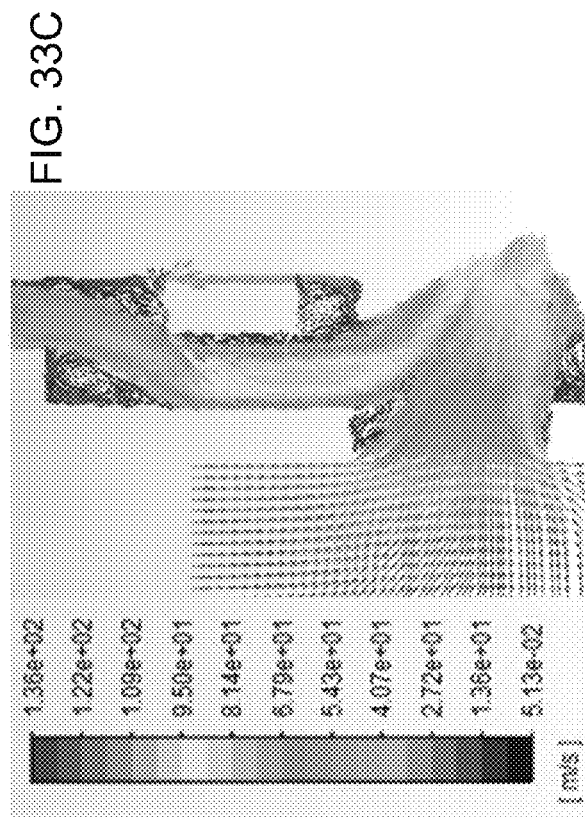
FIG. 33D shows a side view of an inlet air flow velocity pattern within the housing of FIG. 26 with the electrical machine of FIG. 20 mounted within the housing with a 40-degrees radial inlet size in accordance with an illustrative embodiment.

Referring to FIG. 33A, a side view of an inlet air flow velocity pattern using the first inlet model is shown in accordance with an illustrative embodiment. Referring to FIG. 33B, a side view is shown of an inlet air flow velocity pattern using the second inlet model is shown in accordance with an illustrative embodiment. Referring to FIG. 33C, a side view is shown of an inlet air flow velocity pattern using the third inlet model is shown in accordance with an illustrative embodiment. Referring to FIG. 33D, a side view is shown of an inlet air flow velocity pattern using the fourth inlet model is shown in accordance with an illustrative embodiment.

It can be observed that the flow velocity above the end winding surface varies for different radial inlet areas. The heat transfer boundary conditions are calculated based on the CFD simulation using a heat transfer coefficient $$h = \frac{q}{T_{wall} - T_{ref}},$$

where q is the heat flux on the surface, $T_{wall}$ is the wall temperature, and $T_{ref}$ is the bulk temperature of the surrounding fluid. The maximum wall temperature is used in the calculation of the heat transfer coefficient since the hot spot temperature is most crucial in the design, which results in a minimum heat transfer coefficient. The local bulk temperature is used as the reference temperature, which has a value close to the inlet flow temperature for most flow rates of interest.

Figure 34:
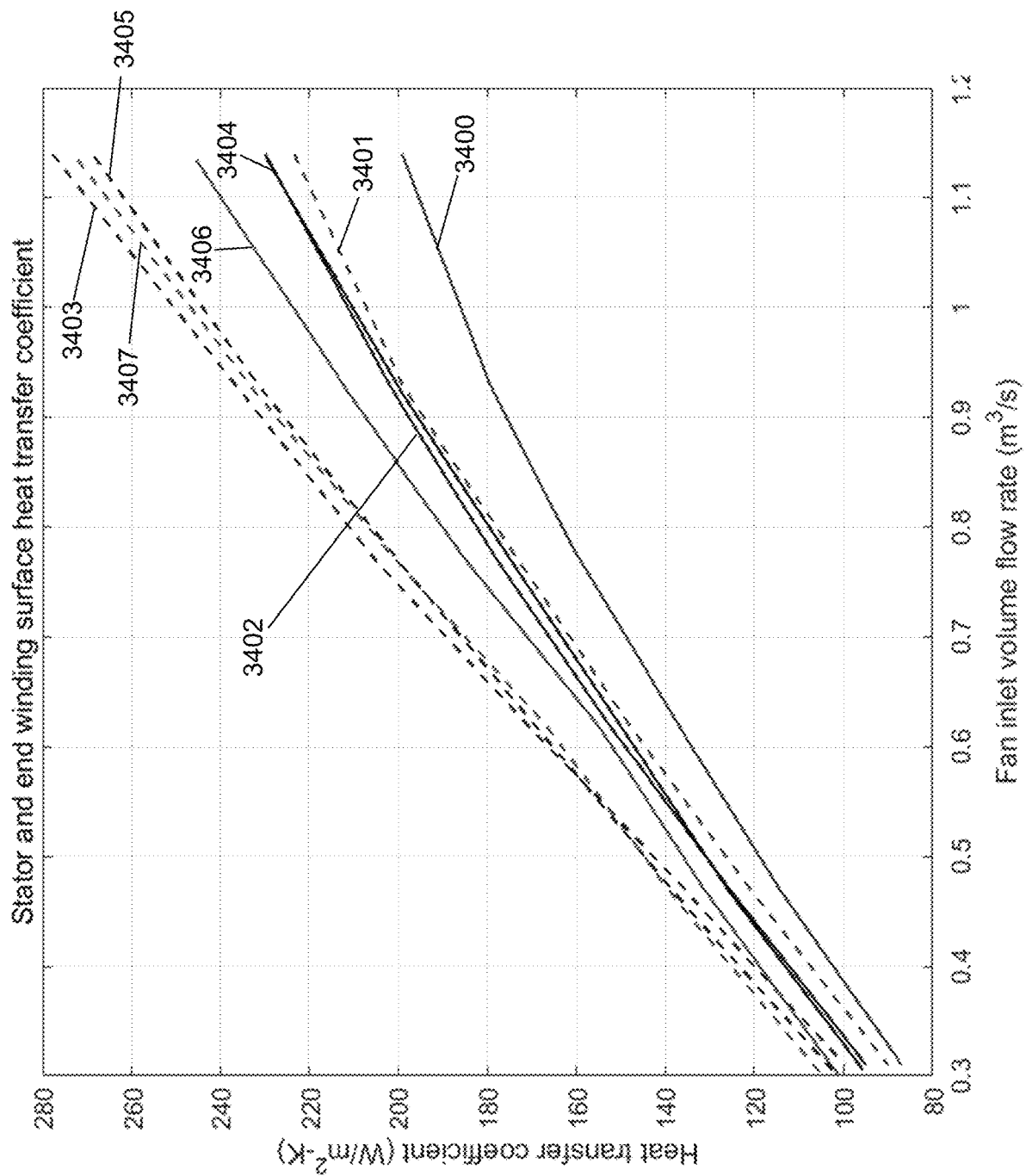
FIG. 34 shows a heat transfer coefficient comparison for the stator surface and the end winding surface that results from the inlet models with 10-degrees, 20-degrees, 30-degrees, and 40-degrees radial inlet sizes in accordance with an illustrative embodiment.

The heat transfer coefficient associated with the four inlet models as a function of fan volume flow rate is shown in FIG. 34. A first curve 3400 shows the heat transfer coefficient on the stator surface using the first inlet model. A second curve 3401 shows the heat transfer coefficient on the end windings using the first inlet model. A third curve 3402 shows the heat transfer coefficient on the stator surface using the second inlet model. A fourth curve 3403 shows the heat transfer coefficient on the end windings using the second inlet model. A fifth curve 3404 shows the heat transfer coefficient on the stator surface using the third inlet model. A sixth curve 3405 shows the heat transfer coefficient on the end windings using the third inlet model. A seventh curve 3406 shows the heat transfer coefficient on the stator surface using the fourth inlet model. An eighth curve 3407 shows the heat transfer coefficient on the end windings using the fourth inlet model.

The end winding surface has a larger heat transfer coefficient than the stator surface. The second inlet model has the largest end winding heat transfer coefficient; whereas, the fourth inlet model has the largest stator surface heat transfer coefficient. The same analysis can be conducted for different axial inlet areas. Through the combination of radial inlet and axial inlet areas, a desired heat transfer coefficient for the end winding and stator surfaces can be achieved.

A pressure drop was calculated based on a difference between a pressure at the housing inlet and the blade inlet. In the CFD simulation, the boundary condition at the housing inlet is set as the inlet pressure, and the fan zone inlet is set as a mass flow rate at the outlet. The mass flow rate is based on the inlet volume flow rate to the rotor which is varied. An inlet design 1 was based on the first inlet model; an inlet design 2 was based on the second inlet model; an inlet design 3 was based on the third inlet model; and an inlet design 4 included the six radial inlet apertures with a radial arclength 2810 of 30-degrees and the two axial inlet apertures each with a radial angle 2800 of 130-degrees.

Figure 35A:
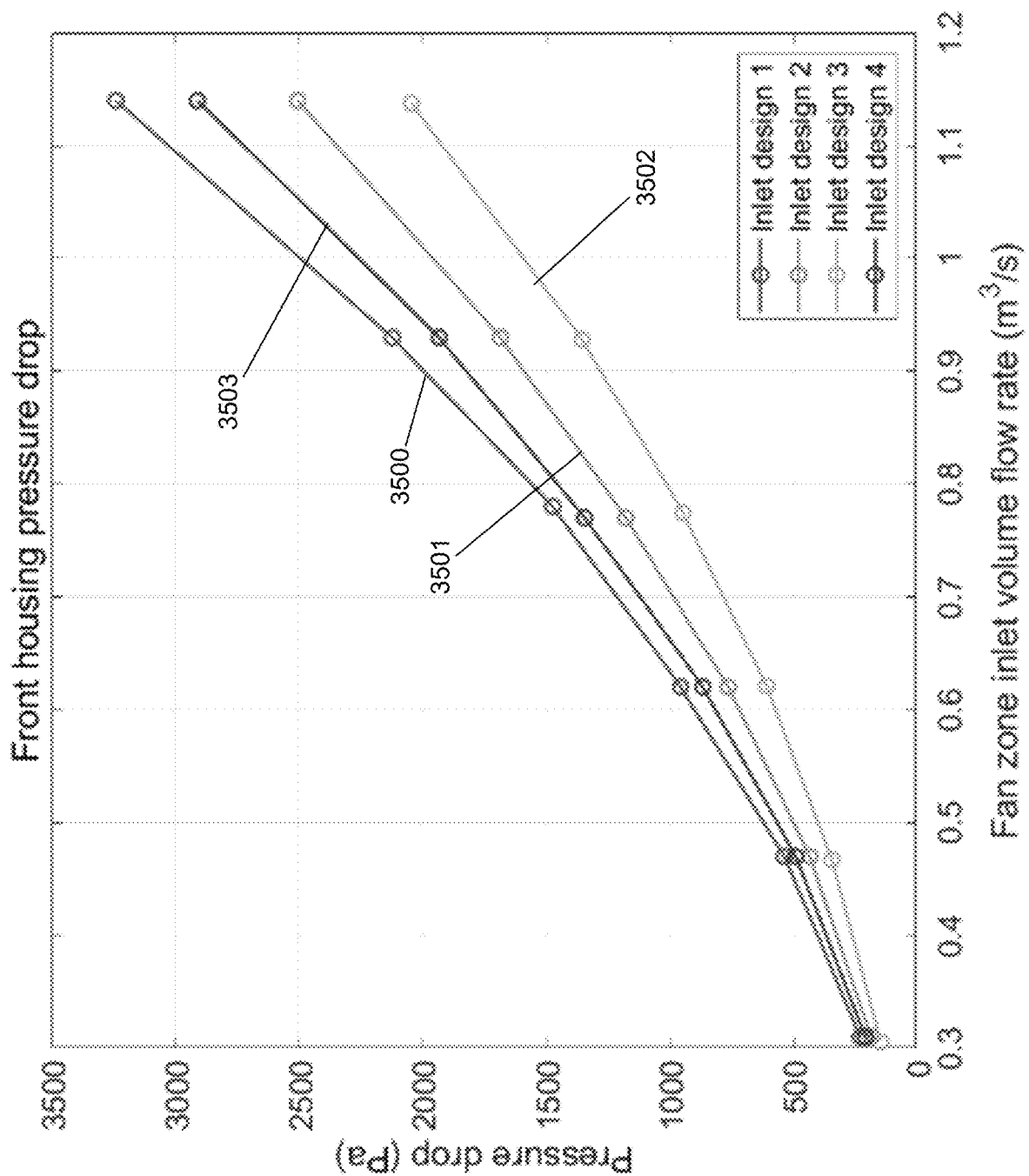
FIG. 35A shows a pressure drop comparison through a front of the housing that results with six radial inlets of 10-degrees, 20-degrees, and 30-degrees and two axial inlets of 150-degrees, and six radial inlets of 30-degrees and two axial inlets of 130-degrees in accordance with an illustrative embodiment.
Figure 35B:
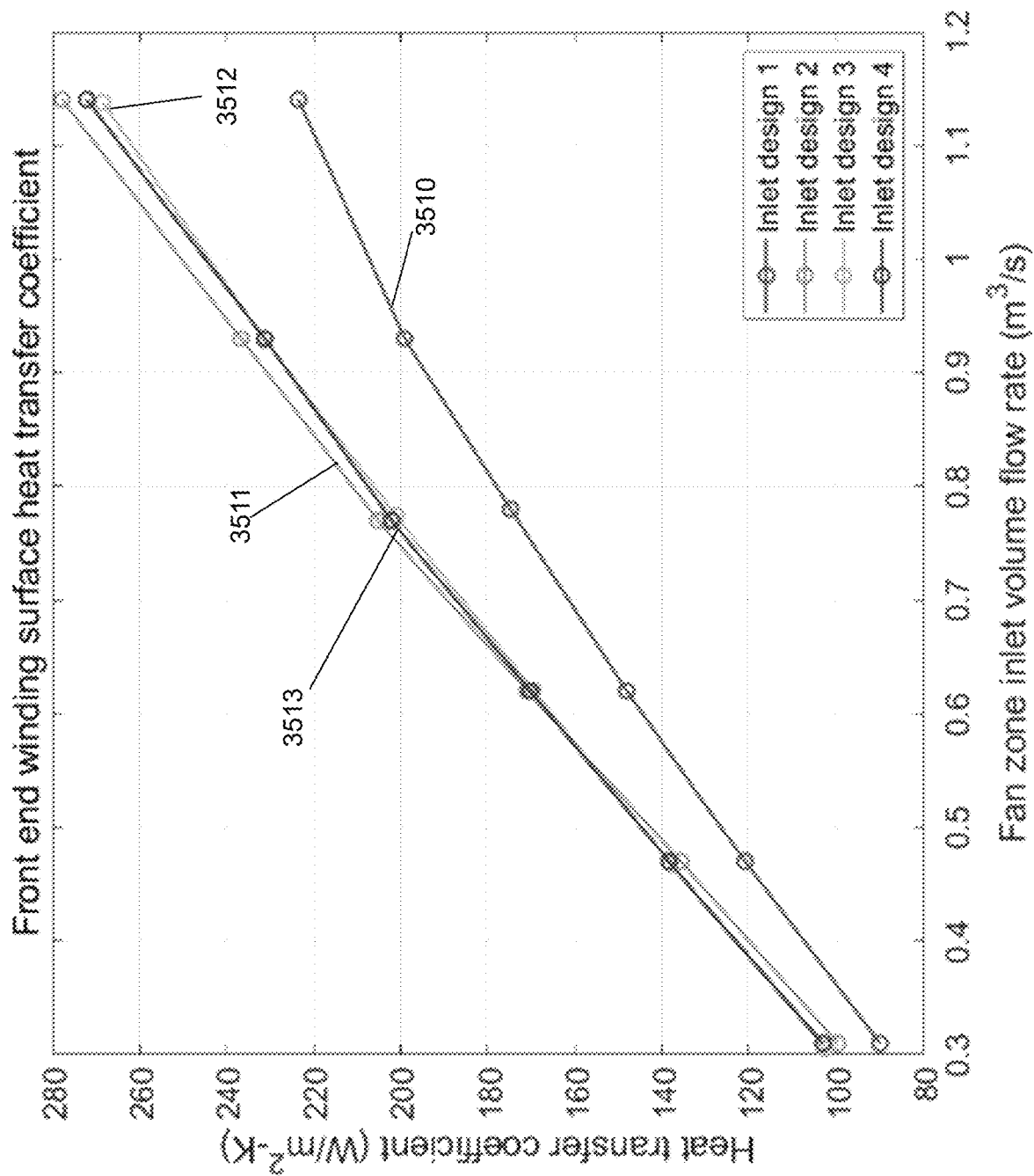
FIG. 35B shows an end winding heat transfer coefficient comparison for the end winding front surface that results with six radial inlets of 10-degrees, 20-degrees, and 30-degrees and two axial inlets of 150-degrees, and six radial inlets of 30-degrees and two axial inlets of 130-degrees in accordance with an illustrative embodiment.

Referring to FIG. 35A, a pressure drop comparison is shown at a front of housing 260 for each inlet design. A first curve 3500 shows the front housing pressure drop using inlet design 1. A second curve 3501 shows the front housing pressure drop using inlet design 2. A third curve 3502 shows the front housing pressure drop using inlet design 3. A fourth curve 3503 shows the front housing pressure drop using inlet design 4. It can be observed that inlet design 1 has the largest pressure drop and inlet design 3 has the smallest. For the same axial inlet area, the pressure drop in the housing decreases with an increase in the radial inlet area. Comparing the housing pressure drops associated with inlet design 3 and design 4, the trend is the same for different axial inlet areas Referring to FIG. 35B, an end winding heat transfer coefficient comparison is shown in accordance with an illustrative embodiment. A first curve 3510 shows the heat transfer coefficient on the end winding surface using the inlet design 1. A second curve 3511 shows the heat transfer coefficient on the end winding surface using the inlet design 2. A third curve 3512 shows the heat transfer coefficient on the end winding surface using the inlet design 3. A fourth curve 3513 shows the heat transfer coefficient on the end winding surface using the inlet design 4.

Figure 35C:
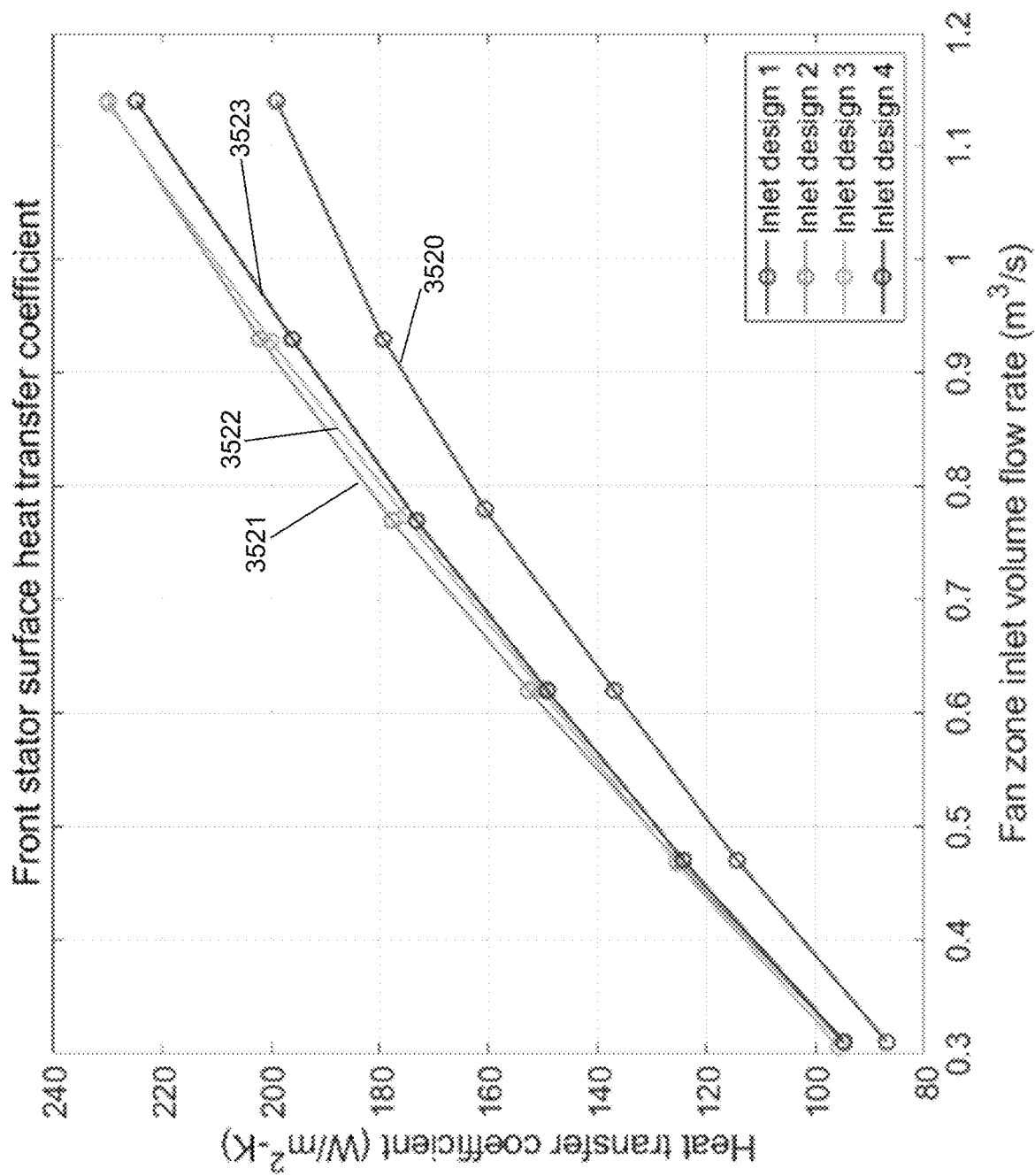
FIG. 35C shows the front stator surface heat transfer coefficient comparison that results with six radial inlets of 10-degrees, 20-degrees, and 30-degrees and two axial inlets of 150-degrees, and six radial inlets of 30-degrees and two axial inlets of 130-degrees in accordance with an illustrative embodiment.

Referring to FIG. 35C, a stator surface heat transfer coefficient comparison is shown in accordance with an illustrative embodiment. A first curve 3520 shows the heat transfer coefficient on the stator surface using the inlet design 1. A second curve 3521 shows the heat transfer coefficient on the stator surface using the inlet design 2. A third curve 3522 shows the heat transfer coefficient on the stator surface using the inlet design 3. A fourth curve 3523 shows the heat transfer coefficient on the stator surface using the inlet design 4.

Figure 36B:
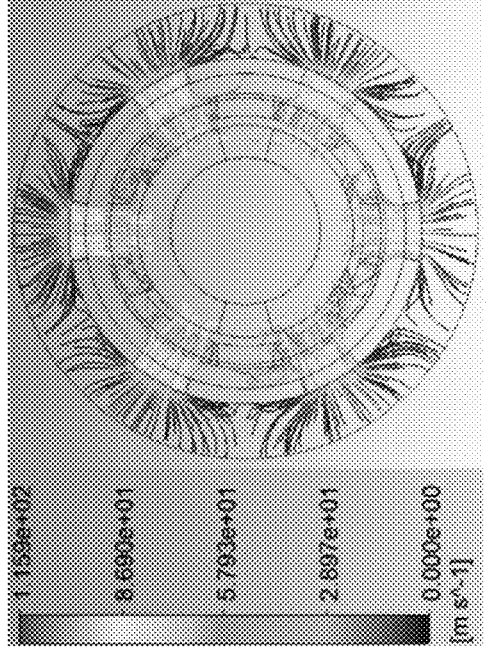
FIG. 36B shows a front view of an inlet air flow velocity pattern within the housing of FIG. 26 with the electrical machine of FIG. 20 mounted inside the housing with six radial inlets of 20-degrees and two axial inlets of 150-degrees in accordance with an illustrative embodiment.
Figure 36D:
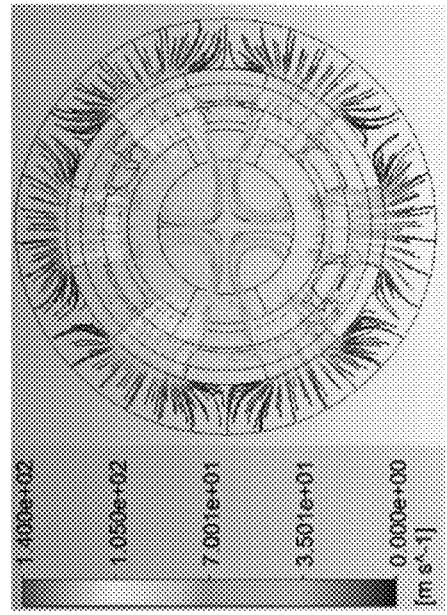
FIG. 36D shows a front view of an inlet air flow velocity pattern within the housing of FIG. 26 with the electrical machine of FIG. 20 mounted inside the housing with six radial inlets of 30-degrees and two axial inlets of 130-degrees in accordance with an illustrative embodiment.
Figure 36A:
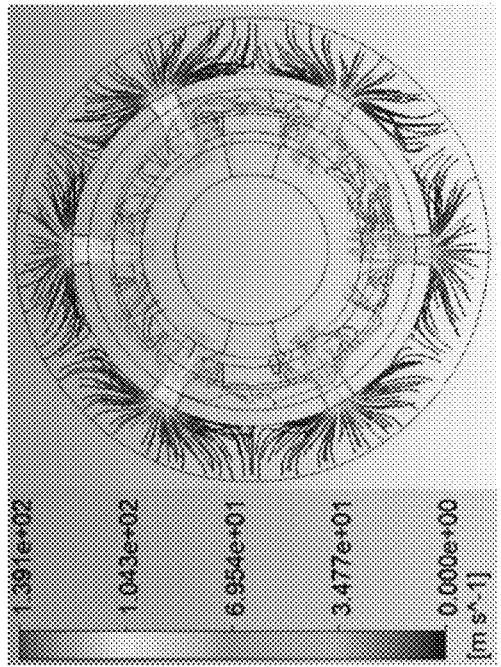
FIG. 36A shows a front view of an inlet air flow velocity pattern within the housing of FIG. 26 with the electrical machine of FIG. 20 mounted inside the housing with six radial inlets of 10-degrees and two axial inlets of 150-degrees in accordance with an illustrative embodiment.
Figure 36C:
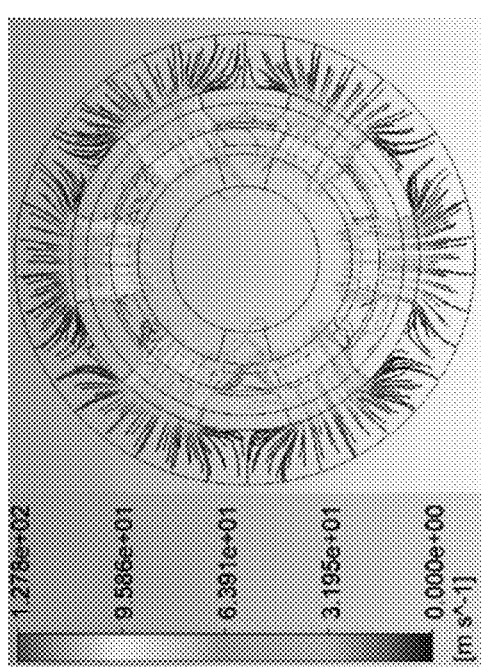
FIG. 36C shows a front view of an inlet air flow velocity pattern within the housing of FIG. 26 with the electrical machine of FIG. 20 mounted inside the housing with six radial inlets of 30-degrees and two axial inlets of 150-degrees in accordance with an illustrative embodiment.

Referring to FIG. 36A, a front view is shown of an inlet air flow velocity pattern using inlet design 1 in accordance with an illustrative embodiment. Referring to FIG. 36B, a front view is shown of an inlet air flow velocity pattern using inlet design 2 in accordance with an illustrative embodiment. Referring to FIG. 36C, a front view is shown of an inlet air flow velocity pattern using inlet design 3 in accordance with an illustrative embodiment. Referring to FIG. 36D, a front view is shown of an inlet air flow velocity pattern using inlet design 4 in accordance with an illustrative embodiment. FIGS. 36A-36D show the radial inlet flow streamlines at volume flow rate of 1.14 m$^3$/s.

Most of the flow entering the radial inlets directly enters the fan zone after passing the stator and end winding surfaces. There is a small amount of flow swirling in the regions not directly adjacent to the inlets. The inlet design 1 has the smallest heat transfer coefficients due to the small radial inlet area and associated reduction in the flow in the housing. The heat transfer coefficients of inlet design 2 are slightly larger than those of design 3 and 4. It is found that larger radial inlets do not necessarily lead to larger heat transfer coefficients. The smaller flow area can result in higher flow velocity. As shown in FIG. 36B, the flow velocity above the end windings is approximately 110 m/s; whereas in FIG. 36C, the flow velocity is around 96 m/s. Inlet designs 3 and 4 have the same radial inlet area, but design 4 has smaller axial inlets. At the same fan zone volume flow rate, the axial inlet volume flow rate reduces with the decrease of axial inlet area. Therefore, the radial inlet volume flow rate will increase. With constant radial inlet area, larger volume flow rate means higher flow velocity. As shown in FIG. 36D, the flow velocity above the end winding surface is about 105 m/s in inlet design 4, which is higher than 96 m/s in design 3.

Figure 37:
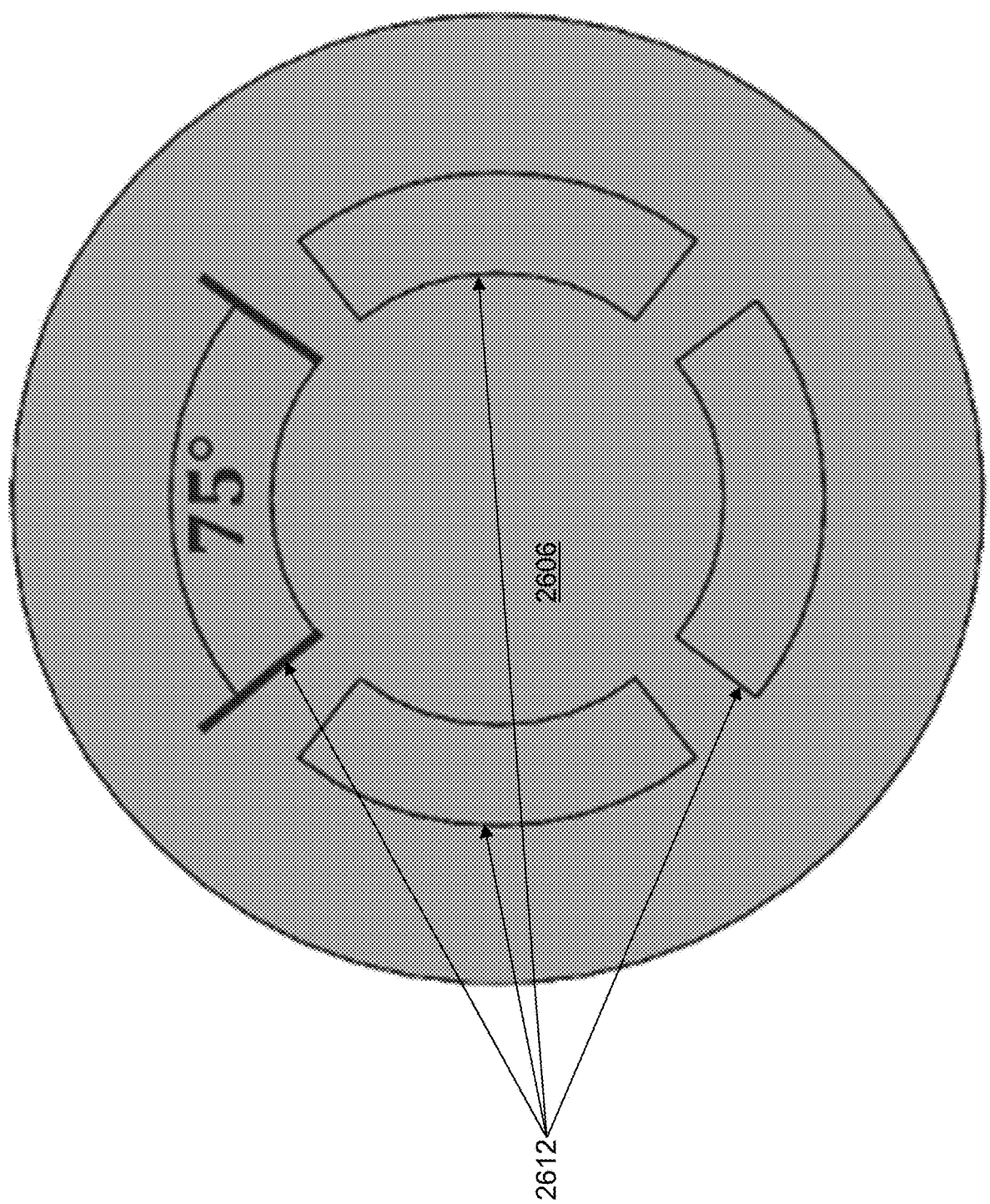
FIG. 37 shows a back view of a second housing with four axial outlets of 75-degrees in accordance with an illustrative embodiment.
Figure 38A:
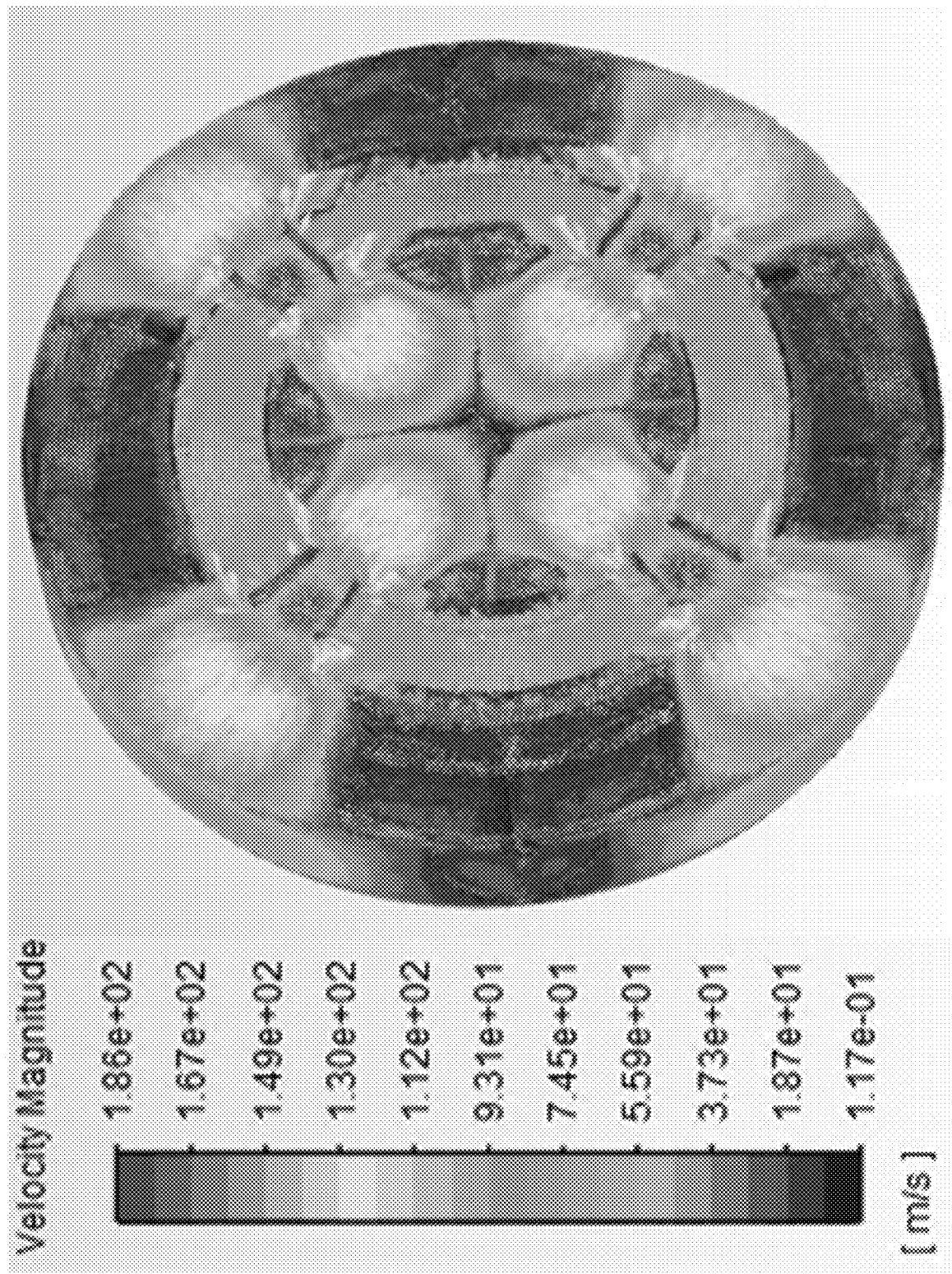
FIG. 38A shows an outlet air flow velocity pattern within the second housing of FIG. 37 with the electrical machine of FIG. 20 mounted inside the housing in accordance with an illustrative embodiment.
Figure 38C:
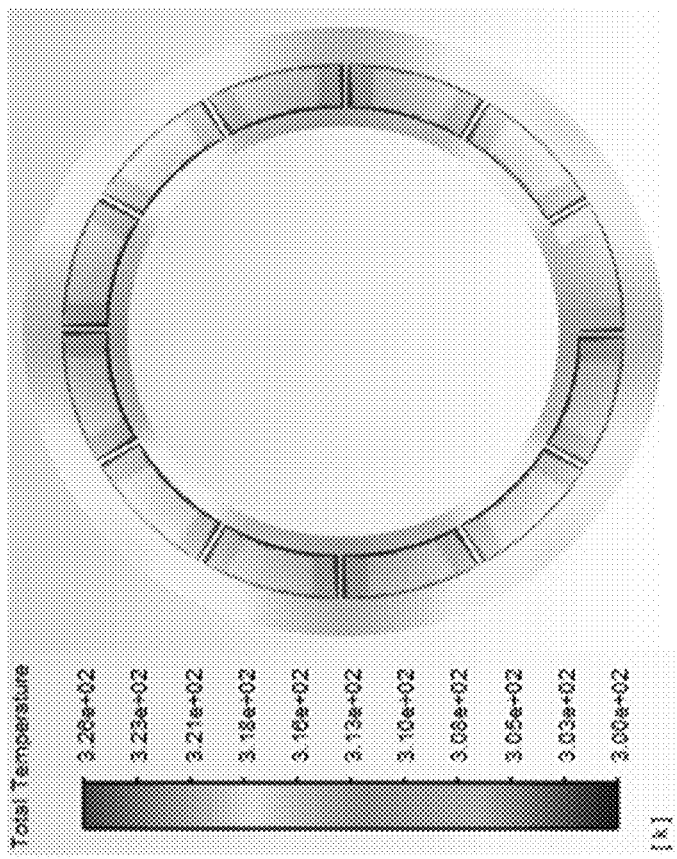
FIG. 38C shows an end winding and stator total temperature distribution within the second housing of FIG. 37 with the electrical machine of FIG. 20 mounted inside the housing with four axial outlets of 75-degrees in accordance with an illustrative embodiment.
Figure 38B:
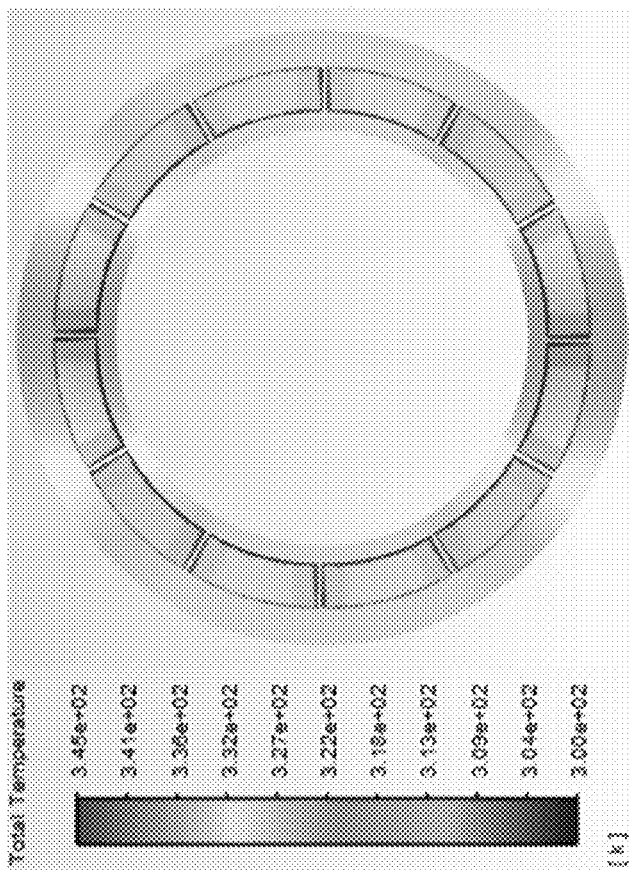
FIG. 38B shows an end winding and stator total temperature distribution within the housing of FIG. 26 with the electrical machine of FIG. 20 mounted inside the housing with two axial outlets of 150-degrees in accordance with an illustrative embodiment.
Figure 38E:
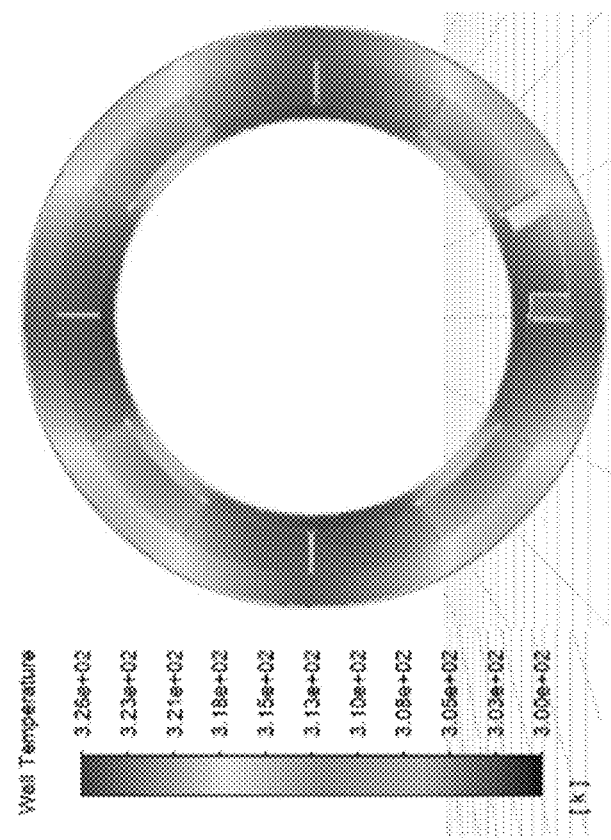
FIG. 38E shows a rear end winding and stator wall temperature distribution within the second housing of FIG. 37 with the electrical machine of FIG. 20 mounted inside the housing with four axial outlets of 75-degrees in accordance with an illustrative embodiment.
Figure 38D:
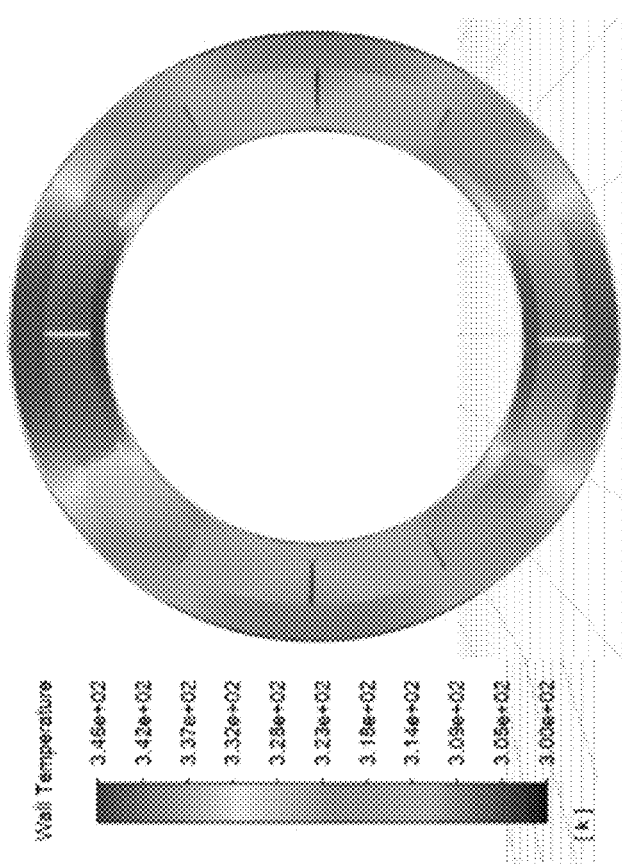
FIG. 38D shows a rear end winding and stator wall temperature distribution within the housing of FIG. 26 with the electrical machine of FIG. 20 mounted inside the housing with two axial outlets of 150-degrees in accordance with an illustrative embodiment.

Similar to housing inlets, the housing outlet can be designed into axial and radial outlets, and the area and structure of the outlets can be adjusted. Referring to FIG. 37, a back view is shown of housing 2600 with the axial outlet aperture walls 2612 defining four axial apertures with radial angle 2800 equal to 75-degrees in accordance with an illustrative embodiment. The total radial angle is the same as the axial outlet aperture walls 2612 defining two axial apertures with radial angle 2800 equal to 150-degrees. FIG. 38A shows the outlet air flow velocity pattern relative to housing 2600 with electrical machine 100 mounted therein for housing 2600 with the axial outlet aperture walls 2612 defining four axial apertures with radial angle 2800 equal to 75-degrees as compared to FIG. 31 that shows the outlet air flow velocity pattern relative to housing 2600 with electrical machine 100 mounted therein for housing 2600 with the axial outlet aperture walls 2612 defining two axial apertures with radial angle 2800 equal to 150-degrees. Due to the different outlet structures, the rear end winding and stator surface have an uneven temperature distribution, which is shown referring to FIGS. 38B and 38C that show the total temperature and FIGS. 38D and 38E that show the wall temperature. The flow leaving the fan zone has a high velocity and directly exits housing 2600 through the outlet apertures. In those regions without an adjacent outlet, airflow is blocked and flows to the region above the rear end winding and stator surface, cooling these surfaces. The area away from the outlets has a lower temperature than the area close to the outlet apertures due to the increased cooling on these surfaces. In the two axial outlets model, the flow entering the end winding and stator region has a higher velocity, which can lead to a larger heat transfer coefficient. However, with the same amount of heat flux on stator and end winding surfaces, in the four axial outlet apertures model, the highest temperature is 326 K which is lower than 345 K in the two axial outlet apertures model.

Figure 38F:
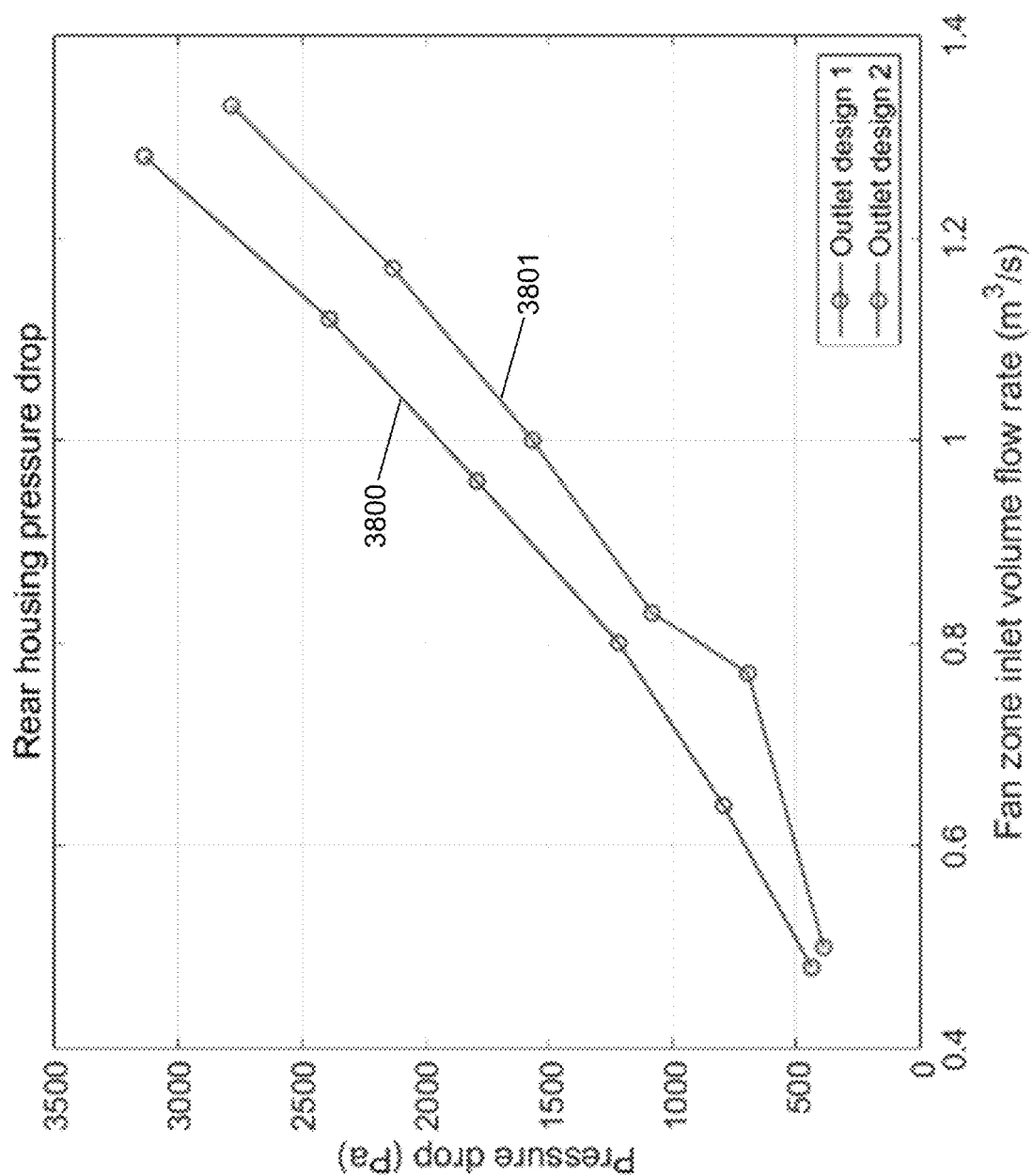
FIG. 38F shows a pressure drop comparison across an exit of the housing with two axial outlets of 150-degrees and a rear of the housing with four axial outlets of 75-degrees in accordance with an illustrative embodiment.

Referring to FIG. 38F, a pressure drop comparison is shown at a rear of the housing that results from outlet design 1 that is housing 2600 with the axial outlet aperture walls 2612 defining two axial apertures with radial angle 2800 equal to 150-degrees and outlet design 2 that is housing 2600 with the axial outlet aperture walls 2612 defining four axial apertures with radial angle 2800 equal to 75-degrees in accordance with an illustrative embodiment. A first curve 3800 shows the front housing pressure drop using outlet design 1. A second curve 3801 shows the front housing pressure drop using outlet design 2. The housing design with two axial apertures has approximately 20% larger pressure drop in the housing than the design with four axial apertures.

Figure 38G:
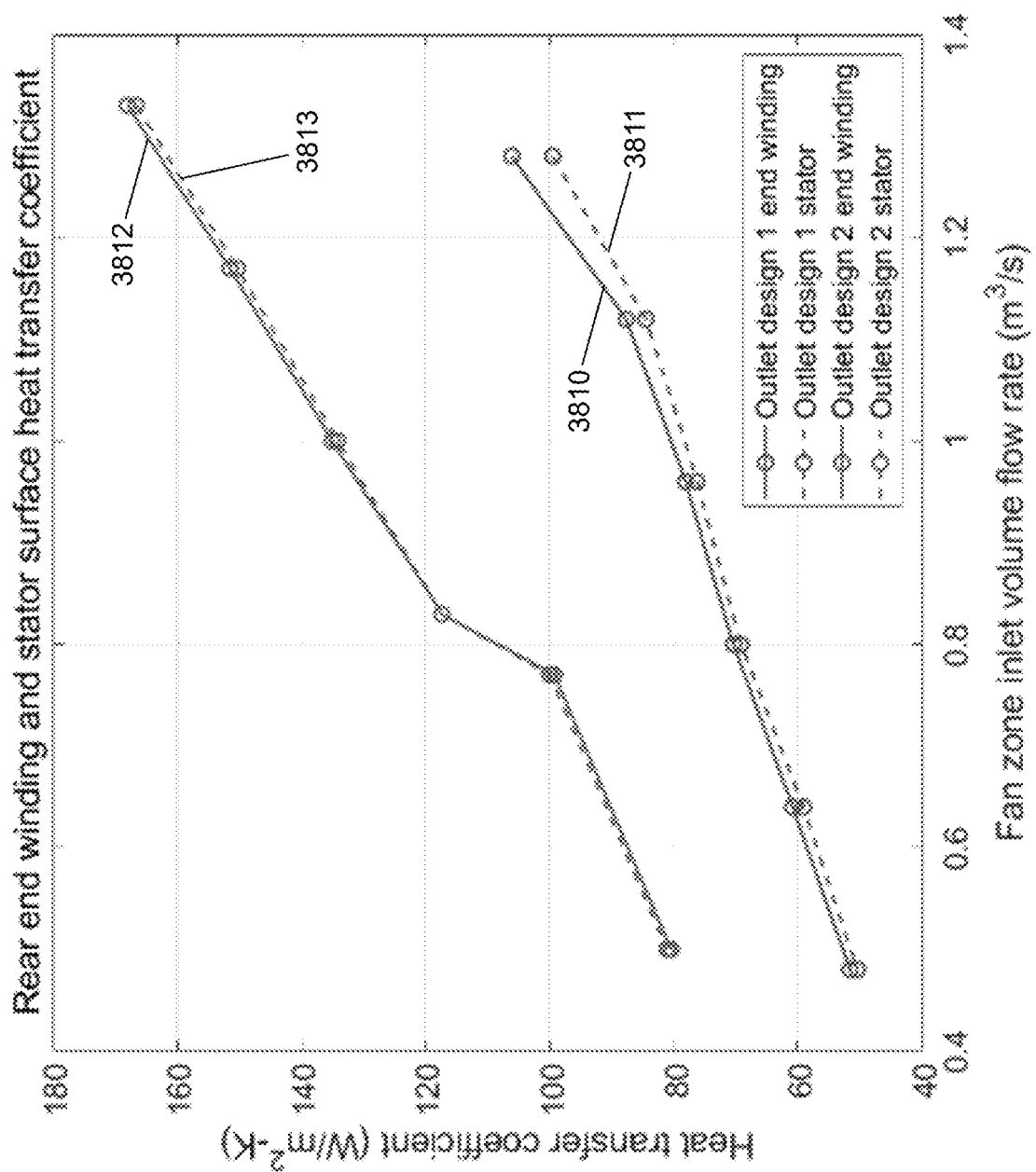
FIG. 38G shows a rear end winding surface and stator surface heat transfer coefficient comparison that results with two axial outlets of 150-degrees and with four axial outlets of 75-degrees in accordance with an illustrative embodiment.

Referring to FIG. 38G, a heat transfer coefficient comparison is shown between outlet design 1 and outlet design 2 in accordance with an illustrative embodiment. A first curve 3810 shows the end winding heat transfer coefficient using outlet design 1. A second curve 3811 shows the stator surface heat transfer coefficient using outlet design 1. A third curve 3812 shows the end winding heat transfer coefficient using outlet design 2. A fourth curve 3813 shows the stator surface heat transfer coefficient using outlet design 2. Since the heat transfer coefficients are calculated using the maximum wall temperature, outlet design 2 has a larger end winding and stator surface heat transfer coefficient than design 1.

Figure 39:
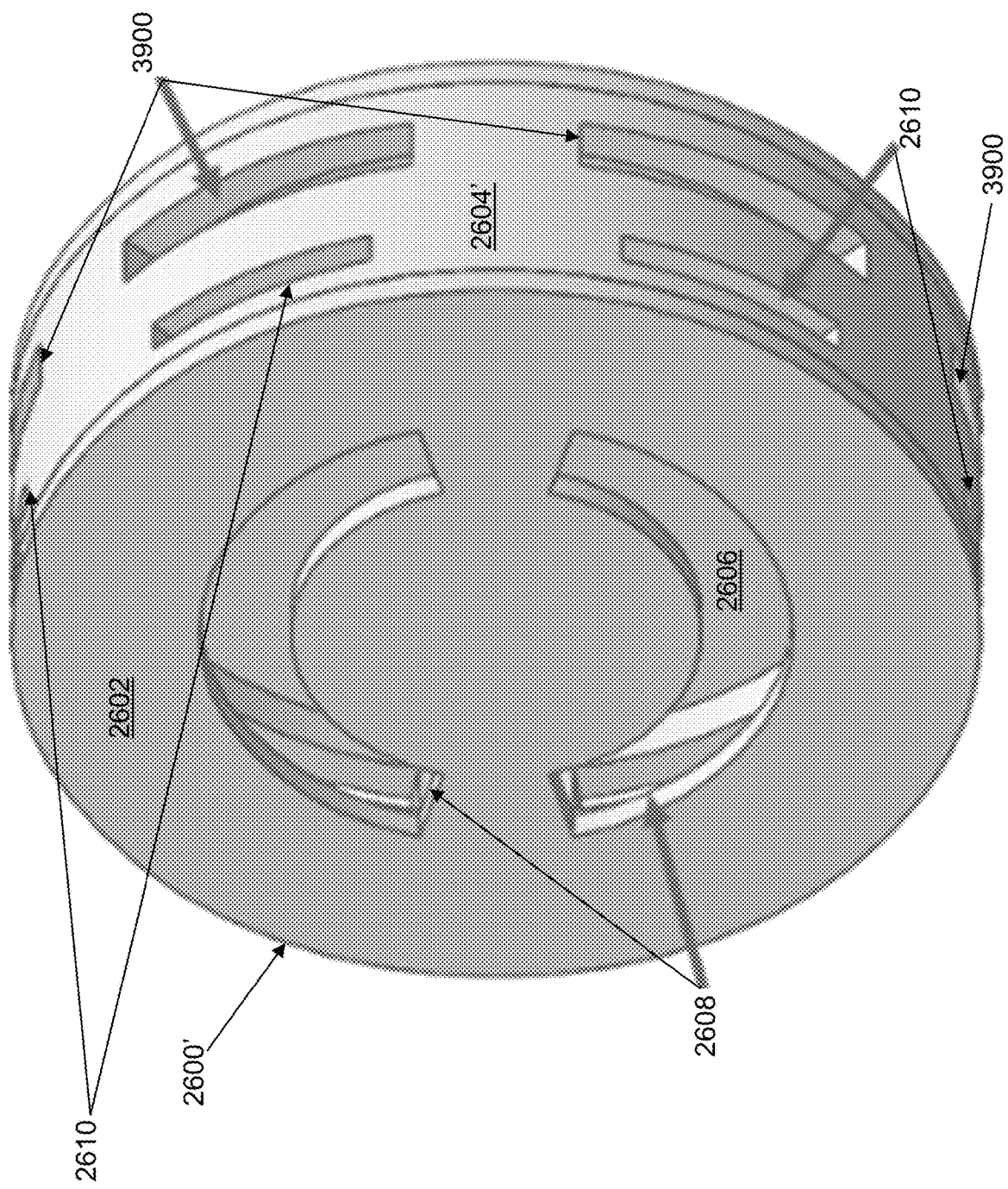
FIG. 39 shows a perspective view of a third housing with axial inlets, radial inlets, axial outlets, and radial outlets in accordance with an illustrative embodiment.

Referring to FIG. 39, a perspective view is shown of a second housing 2600' in accordance with an illustrative embodiment. Second housing 2600' may include front wall 2602, a second radial sidewall 2604', and back wall 2606 that form an enclosure. The radial inlet aperture walls 2610 are formed in second radial sidewall 2604' and form arcs relative to a center of second radial sidewall 2604' and extend circumferentially around second radial sidewall 2604'. Radial outlet aperture walls 3900 are also formed in second radial sidewall 2604' and form arcs relative to a center of second radial sidewall 2604' and extend circumferentially around second radial sidewall 2604'. The radial inlet aperture walls 2610 and the radial outlet aperture walls 3900 may have the same or different shapes with the same or different areas and axial locations. A number of the radial inlet aperture walls 2610 and the radial outlet aperture walls 3900 further may be the same or different. In the illustrative embodiment, a number of the radial inlet aperture walls 2610 and a number of the radial outlet aperture walls 3900 is six. The radial outlet aperture walls 3900 have a greater radial arclength 2810 and axial width 2812 relative to the radial inlet aperture walls 2610. As a result, an area of the radial outlet aperture walls 3900 is greater than an area of the radial inlet aperture walls 2610.

CFD simulations were performed with radial arclength 2810 for the radial inlet aperture walls 2610 of between 5-degrees and 40-degrees at 5-degree increments. The curve fitting results for end winding and stator surface heat transfer coefficients are shown in Table 3, where v is the average flow velocity in the stator.

TABLE 3

| Radial inlet circumferential angle (deg) | Stator surface analytical model | End winding analytical model |
| --- | --- | --- |
| 5 | $h_{stator}$ = 3.38v + 41.4 | $h_{winding}$ = 3.61v + 41.22 |
| 10 | $h_{stator}$ = 3.42v + 49.3 | $h_{winding}$ = 4.08v + 43.9 |
| 15 | $h_{stator}$ = 3.5v + 46.9 | $h_{winding}$ = 4.35v + 37.5 |
| 20 | $h_{stator}$ = 3.73v + 49.2 | $h_{winding}$ = 4.94v + 36.1 |
| 25 | $h_{stator}$ = 3.9v + 48.6 | $h_{winding}$ = 4.88v + 42.8 |
| 30 | $h_{stator}$ = 4v + 49.5 | $h_{winding}$ = 4.98v + 44.6 |
| 40 | $h_{stator}$ = 4.28v + 49.3 | $h_{winding}$ = 4.96v + 44.4 |

From the equations shown in Table 3, at different radial inlet circumferential angles, there is an almost constant offset. For the stator surface, the coefficient for velocity is increasing as the radial inlet angle increases. For end winding surface, however, the heat transfer coefficient first increases then approximately stays the same after 20-degrees. The constant heat transfer coefficient is due to the air swirling above the end windings. Optimization can also be done using the analytical model to find the desired inlet and outlet design.

Figure 40A:
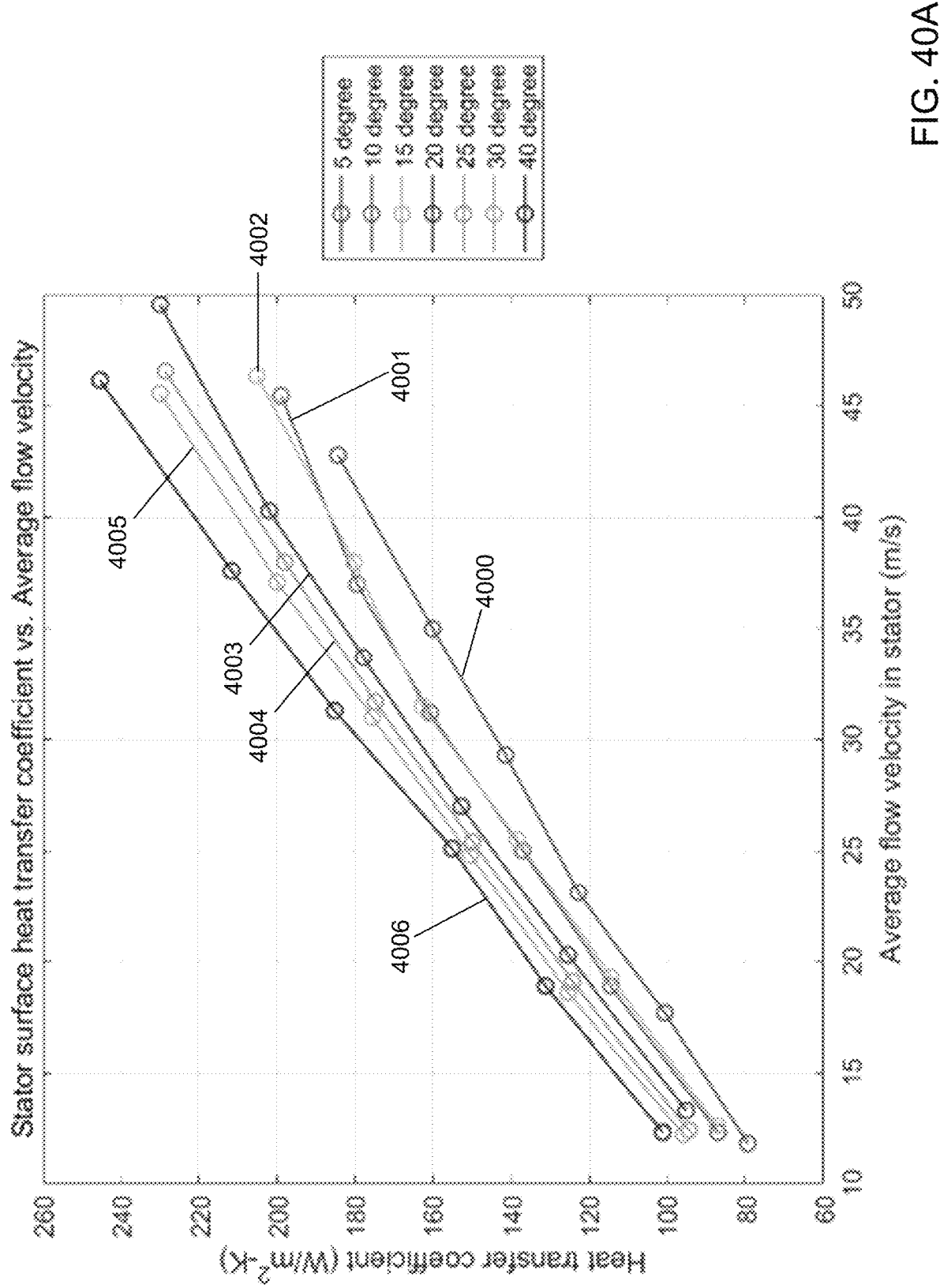
FIG. 40A shows a stator surface heat transfer coefficient comparison that results with six radial outlets of from 5-degrees to 40-degrees in accordance with an illustrative embodiment.

Referring to FIG. 40A, a first stator surface heat transfer coefficient comparison is shown that results from different radial inlet models in accordance with an illustrative embodiment. A first curve 4000 shows the stator surface heat transfer coefficient using the radial inlet aperture walls 2610 having a radial arclength 2810 of 5-degrees. A second curve 4001 shows the stator surface heat transfer coefficient using the radial inlet aperture walls 2610 having a radial arclength 2810 of 10-degrees. A third curve 4002 shows the stator surface heat transfer coefficient using the radial inlet aperture walls 2610 having a radial arclength 2810 of 15-degrees. A fourth curve 4003 shows the stator surface heat transfer coefficient using the radial inlet aperture walls 2610 having a radial arclength 2810 of 20-degrees. A fifth curve 4004 shows the stator surface heat transfer coefficient using the radial inlet aperture walls 2610 having a radial arclength 2810 of 25-degrees. A sixth curve 4005 shows the stator surface heat transfer coefficient using the radial inlet aperture walls 2610 having a radial arclength 2810 of 30-degrees. A seventh curve 4006 shows the stator surface heat transfer coefficient using the radial inlet aperture walls 2610 having a radial arclength 2810 of 40-degrees.

Figure 40B:
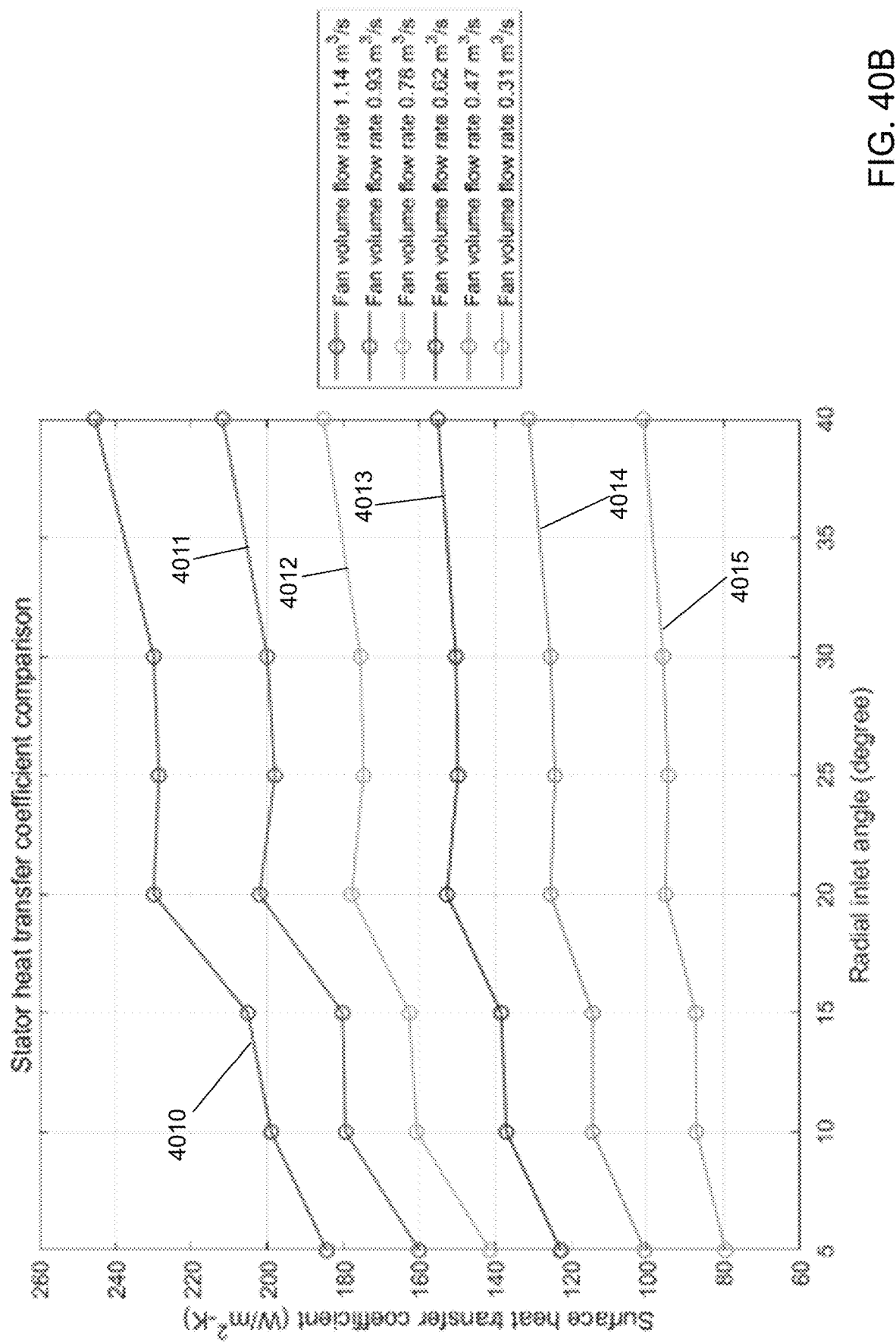
FIG. 40B shows a stator surface heat transfer coefficient comparison that results from different fan volume flow rates in accordance with an illustrative embodiment.

Referring to FIG. 40B, a stator surface heat transfer coefficient comparison is shown for various fan volume flow rates in accordance with an illustrative embodiment. A first curve 4010 shows the stator surface heat transfer coefficient for a fan volume flow rate of 1.14 m³/s. A second curve 4011 shows the stator surface heat transfer coefficient for a fan volume flow rate of 0.93 m³/s. A third curve 4012 shows the stator surface heat transfer coefficient for a fan volume flow rate of 0.78 m³/s. A fourth curve 4013 shows the stator surface heat transfer coefficient for a fan volume flow rate of 0.62 m³/s. A fifth curve 4014 shows the stator surface heat transfer for a fan volume flow rate of 0.47 m³/s. A sixth curve 4015 shows the stator surface heat transfer coefficient for a fan volume flow rate of 0.31 m³/s.

Figure 40C:
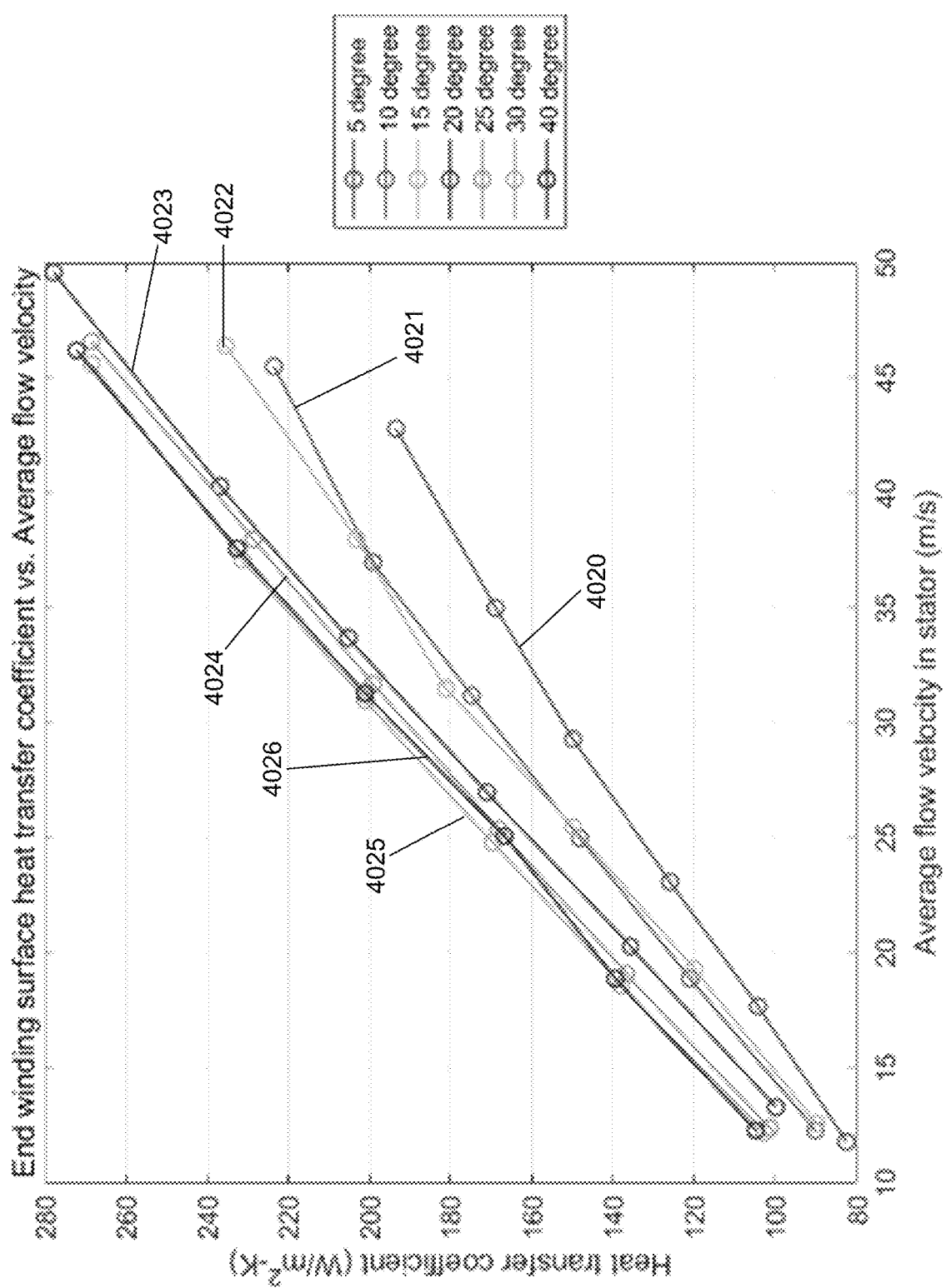
FIG. 40C shows an end winding surface heat transfer coefficient comparison that results with six radial outlets of from 5-degrees to 40-degrees in accordance with an illustrative embodiment.

Referring to FIG. 40C, a first end winding surface heat transfer coefficient comparison is shown that results from different outlet models in accordance with an illustrative embodiment. A first curve 4020 shows the end winding heat transfer coefficient using the radial inlet aperture walls 2610 having a radial arclength 2810 of 5-degrees. A second curve 4021 shows the end winding heat transfer coefficient using the radial inlet aperture walls 2610 having a radial arclength 2810 of 10-degrees. A third curve 4022 shows the end winding heat transfer coefficient using the radial inlet aperture walls 2610 having a radial arclength 2810 of 15-degrees. A fourth curve 4023 shows the end winding heat transfer coefficient using the radial inlet aperture walls 2610 having a radial arclength 2810 of 20-degrees. A fifth curve 4024 shows the end winding heat transfer coefficient using the radial inlet aperture walls 2610 having a radial arclength 2810 of 25-degrees. A sixth curve 4025 shows the end winding heat transfer coefficient using the radial inlet aperture walls 2610 having a radial arclength 2810 of 30-degrees. A seventh curve 4026 shows the end winding heat transfer coefficient using the radial inlet aperture walls 2610 having a radial arclength 2810 of 40-degrees.

Figure 40D:
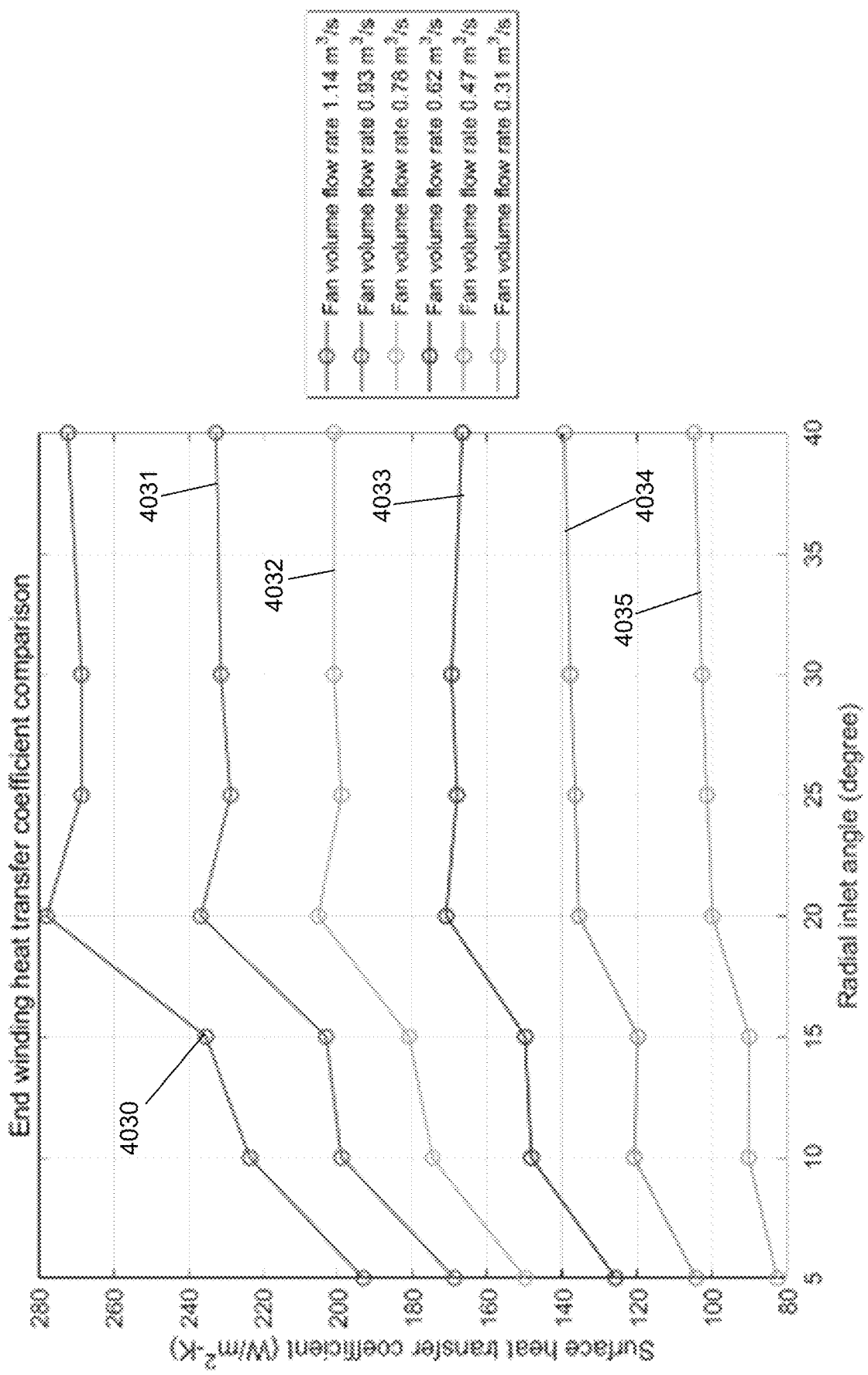
FIG. 40D shows an end winding surface heat transfer coefficient comparison that results from different fan volume flow rates in accordance with an illustrative embodiment.

Referring to FIG. 40D, a second end winding surface heat transfer coefficient comparison is shown that results from different outlet models in accordance with an illustrative embodiment. A first curve 4030 shows the end winding heat transfer coefficient for a fan volume flow rate of 1.14 m³/s. A second curve 4031 shows the end winding heat transfer coefficient for a fan volume flow rate of 0.93 m³/s. A third curve 4032 shows the end winding heat transfer coefficient for a fan volume flow rate of 0.78 m³/s. A fourth curve 4033 shows the end winding heat transfer coefficient for a fan volume flow rate of 0.62 m³/s. A fifth curve 4034 shows the end winding heat transfer for a fan volume flow rate of 0.47 m³/s. A sixth curve 4035 shows the end winding heat transfer coefficient for a fan volume flow rate of 0.31 m³/s. From FIG. 40A and FIG. 40C, it can be observed that the surface heat transfer coefficient has a linear relationship with stator average flow velocity.

To verify the self-cooling function, a thermal finite element analysis (FEA) was conducted with inlet design 2 (six radial inlets of 20-degrees and two axial inlets of 150-degrees) and outlet design 2 (four axial outlets of 75-degrees). The machine parameters and thermal boundary conditions are shown in Table 4.

TABLE 4

| Parameters | Value |
|---|---|
| Stator outer diameter [mm] | 300 |
| Rotor tip diameter [mm] | 200 |
| Machine speed [rpm] | 10,000 |
| Current density [$A_{rms}$/mm$^2$] | 5 |
| Output power [kW] | 30 |
| Total loss [W] | 1055 |
| Efficiency [%] | 96.6 |
| Front end winding surface heat transfer coefficient [W/m$^2$-K] | 278 |
| Rear end winding surface heat transfer coefficient [W/m$^2$-K] | 152 |
| Front stator surface heat transfer coefficient [W/m$^2$-K] | 230 |
| Rear stator surface heat transfer coefficient [W/m$^2$-K] | 150 |
| Stator inner surface heat transfer coefficient [W/m$^2$-K] | 433.9 |
| Rotor surface heat transfer coefficient [W/m$^2$-K] | 435.7 |
| In slot surface heat transfer coefficient [W/m$^2$-K] | 832.4 |
| Stator outer surface heat transfer coefficient [W/m$^2$-K] | 5 |

Figure 41B:
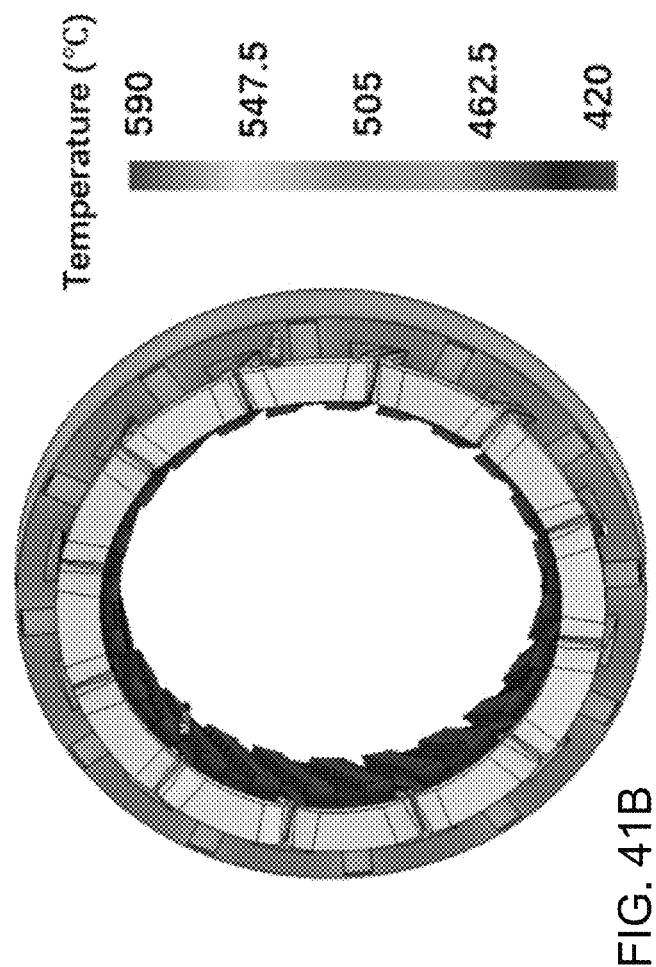
FIG. 41B shows a stator temperature contour plot without the housing of FIG. 26 in accordance with an illustrative embodiment.
Figure 41A:
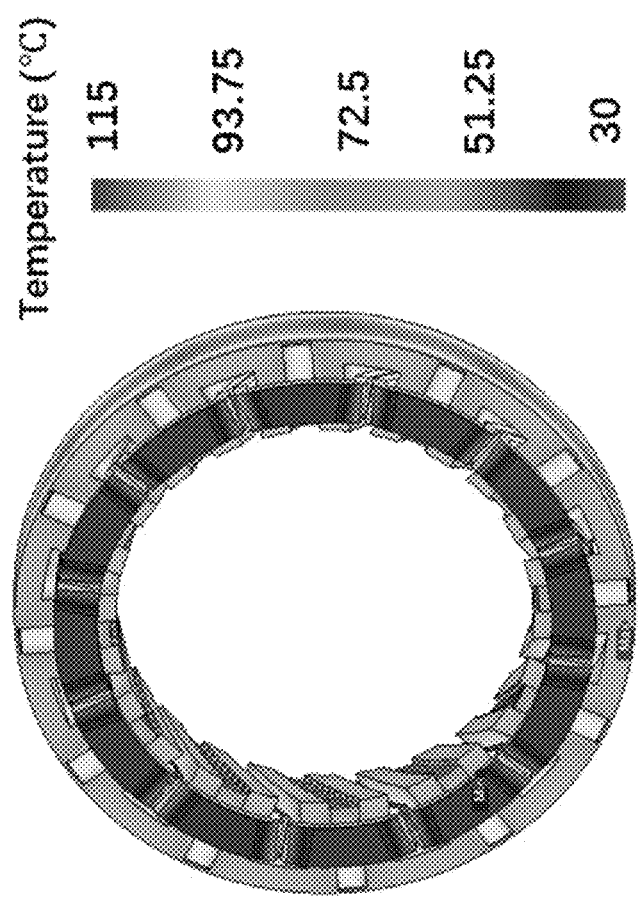
FIG. 41A shows a stator temperature contour plot with the housing of FIG. 26 in accordance with an illustrative embodiment.

A Nomex 410 slot liner was used in the design, which has a thickness of 0.179 mm and a thermal conductivity of 0.149 W/m-K. The equivalent heat transfer coefficient from the in-slot winding to stator core 108 can then be calculated using the thermal conductivity and thickness of the slot liner. For natural convection of the housing, the convective heat transfer coefficient of the stator outer surface is set as 5 W/m$^2$-K. The output power of the machine is 30 kW, where the total loss is 1055 W. The temperature distribution in stator 102 is shown in FIG. 41A. The rotor temperature is much lower than the stator temperature and therefore is not shown in FIG. 41A. Since both stator front and rear surfaces are cooled by air, the middle part of the stator iron has the highest temperature. The maximum temperature of the permanent magnets is 111° C., which is in the acceptable range.

If there is no forced convection from the air entering the housing, the stator inner surface and rotor surface heat transfer coefficients are set as 100 W/m$^2$-K to account for the high rotational speed, and the other end winding and stator surfaces are set to have heat transfer coefficients of 5 W/m$^2$-K. In this case, as shown in FIG. 41B, the maximum magnet temperature can be as high as 475-degrees Celsius. Active cooling with a water jacket would need to be included in the design to cool the machine. The effect of using a water jacket can be simulated by increasing the heat transfer coefficient of the stator outer surface. It is found that the water jacket can effectively cool the stator iron and permanent magnets. The maximum magnet temperature can be reduced to 139-degrees Celsius when the stator outer surface heat transfer coefficient is 300 W/m$^2$-K. However, the end windings cannot be cooled by the water jacket. Even when the stator outer surface heat transfer coefficient is 10,000 W/m$^2$-K, the maximum end winding temperature is still around 350-degrees Celsius.

Figure 41C:
FIG. 41C shows a winding temperature distribution at 15 $A_{rms}/mm^2$ current density with the third housing of FIG. 39 in accordance with an illustrative embodiment.

In the FEA simulation, RECOMA 35E samarium cobalt magnets from Arnold Magnetic Technologies were used that have a maximum operating temperature of 350-degrees Celsius. Since the maximum magnet temperature is 111-degrees Celsius at 5 $A_{rms}$/mm$^2$ current density, the current density of the integrated machine is increased to explore the potential of its improved cooling capability. The total loss, maximum magnet temperature, and maximum winding temperature at different current densities are shown in Table 5. At a current density of 15 $A_{rms}$/mm$^2$, the maximum magnet temperature is 340-degrees Celsius. However, the maximum winding temperature is very high. The temperature distribution in the windings at 15 $A_{rms}$/mm$^2$ is shown in FIG. 41C. It can be observed in FIG. 41C that the end winding surfaces have a relatively low temperature due to the cooling from the airflow. The in-slot windings, however, have higher temperature. This issue can be solved by using foil windings or adding scaffolds or other openings to the windings to allow air flow and further reduce the winding temperature.

TABLE 5

| Current density [$A_{rms}$/mm$^2$] | 5 | 5 | 10 | 15 |
|---|---|---|---|---|
| Total loss [W] | 1055 | 1055 | 2367 | 4147 |
| Cooling method | Self-cooling | No self-cooling | Self-cooling | Self-cooling |
| Maximum magnet temperature [° C.] | 111 | 475 | 212 | 340 |
| Maximum winding temperature [° C.] | 99 | 589 | 235 | 463 |

Figure 42:
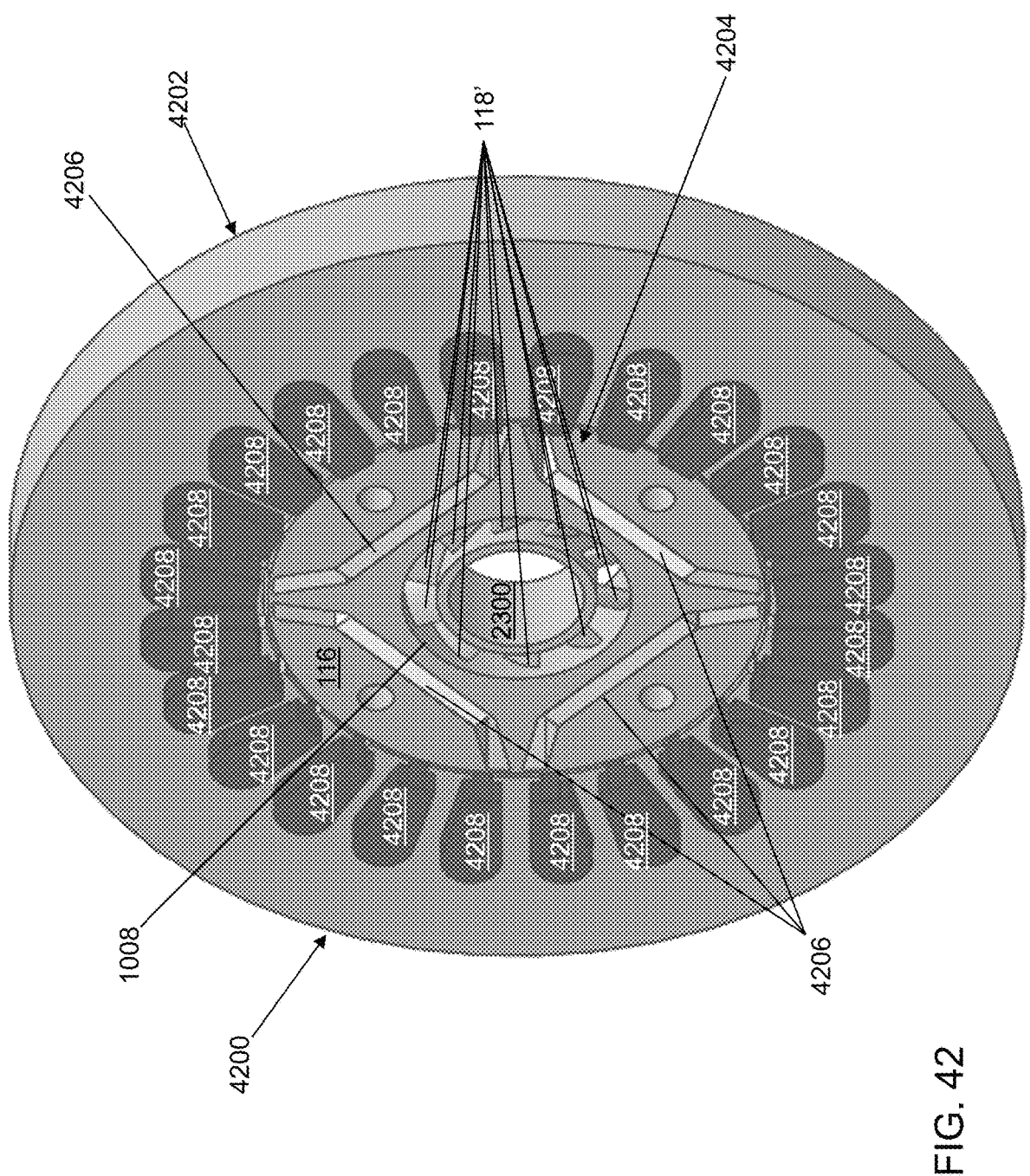
FIG. 42 depicts a perspective view of an electrical machine with a hub with blades interior of the rotor in accordance with an illustrative embodiment.

Referring to FIG. 42, a perspective view is shown of a sixth electrical machine 4200 with hub 2300 with the second plurality of blades 118' interior of a third rotor 4204 in accordance with an illustrative embodiment. Sixth electrical machine 4200 may include a fifth stator 4202 that included a second plurality of windings 4208 mounted in slots formed a plurality of teeth. A fourth plurality of magnets 4206 are mounted within a rotor core of third rotor 4204.

Sixth electrical machine 4200 implemented as a 24-slot 4-pole IPM machine with hub 2300 was used to verify the cooling effect. The machine design parameters and performances are listed in Table 6 below.

TABLE 6

| Parameters and Performances | Value |
|---|---|
| Stator outer diameter [mm] | 112 |
| Stator inner diameter [mm] | 56 |
| Rotor outer diameter [mm] | 55 |
| Rotor inner diameter [mm] | 15 |
| Blade tip diameter [mm] | 25.3 |
| Blade hub diameter [mm] | 17.7 |
| Stack length [mm] | 10 |
| Pole number | 4 |
| Slot number | 24 |
| Speed [rpm] | 5,000 |
| Winding turns per phase | 35 |
| Current density [$A_{rms}$/mm$^2$] | 10 |
| Average torque [Nm] | 0.7 |
| Fan power [W] | 0.014 |
| Output power [W] | 367 |
| Copper loss [W] | 22 |
| Stator iron loss [W] | 3.4 |
| Rotor iron loss [W] | 0.1 |
| Efficiency | 93.5% |

There are flux barriers designed in third rotor 4204, which are air voids to prevent the flow of flux between the fourth plurality of magnets 4206. At 5,000 rpm, 10 $A_{rms}$/mm$^2$ current density, the machine's output power is 367 W with an efficiency of 93.5%. The fan power associated with the second plurality of blades 118' is 0.014 W, which is very small because of the small fan size. For the IPM machine, since the magnets are inserted in the rotor iron, there is limited space for hub 2300 and the second plurality of blades 118'. For other machine types, such as the SPM machine, the fan size can be larger, providing more cooling effect.

Figure 43:
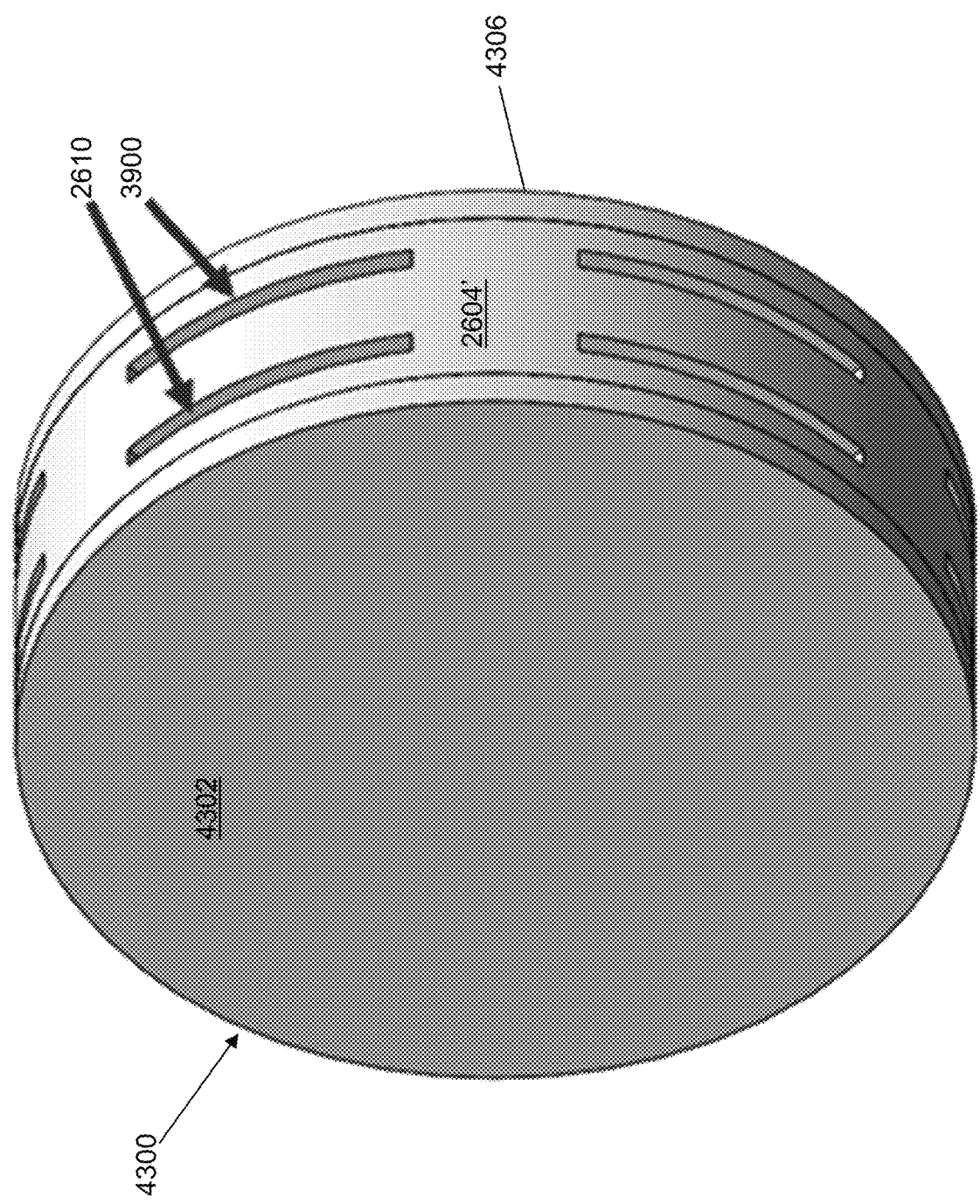
FIG. 43 depicts a perspective view of a fourth housing with radial inlets and radial outlets in accordance with an illustrative embodiment.

Referring to FIG. 43, a perspective view is shown of a second housing 4300 in accordance with an illustrative embodiment. Second housing 4300 may include a solid front wall 4302, second radial sidewall 2604', and a solid back wall 4306 that form an enclosure. The radial inlet aperture walls 2610 and the radial outlet aperture walls 3900 are formed in second radial sidewall 2604'. In the illustrative embodiment, of FIG. 43, the radial inlet aperture walls 2610 and the radial outlet aperture walls 3900 have the same shape and size and are positioned at the same axial locations. Air flow enters second housing 4300 and passes over the front end winding, fifth stator 4202, and third rotor 4204. Then, the flow is accelerated in the rotor stage and exits second housing 4300 after passing the rear surfaces. In this process, a small amount of flow also goes into the flux barrier space, cooling the surrounding surfaces. The CFD model is separated into the front and rear parts to simplify the model and improve accuracy.

Figure 44A:
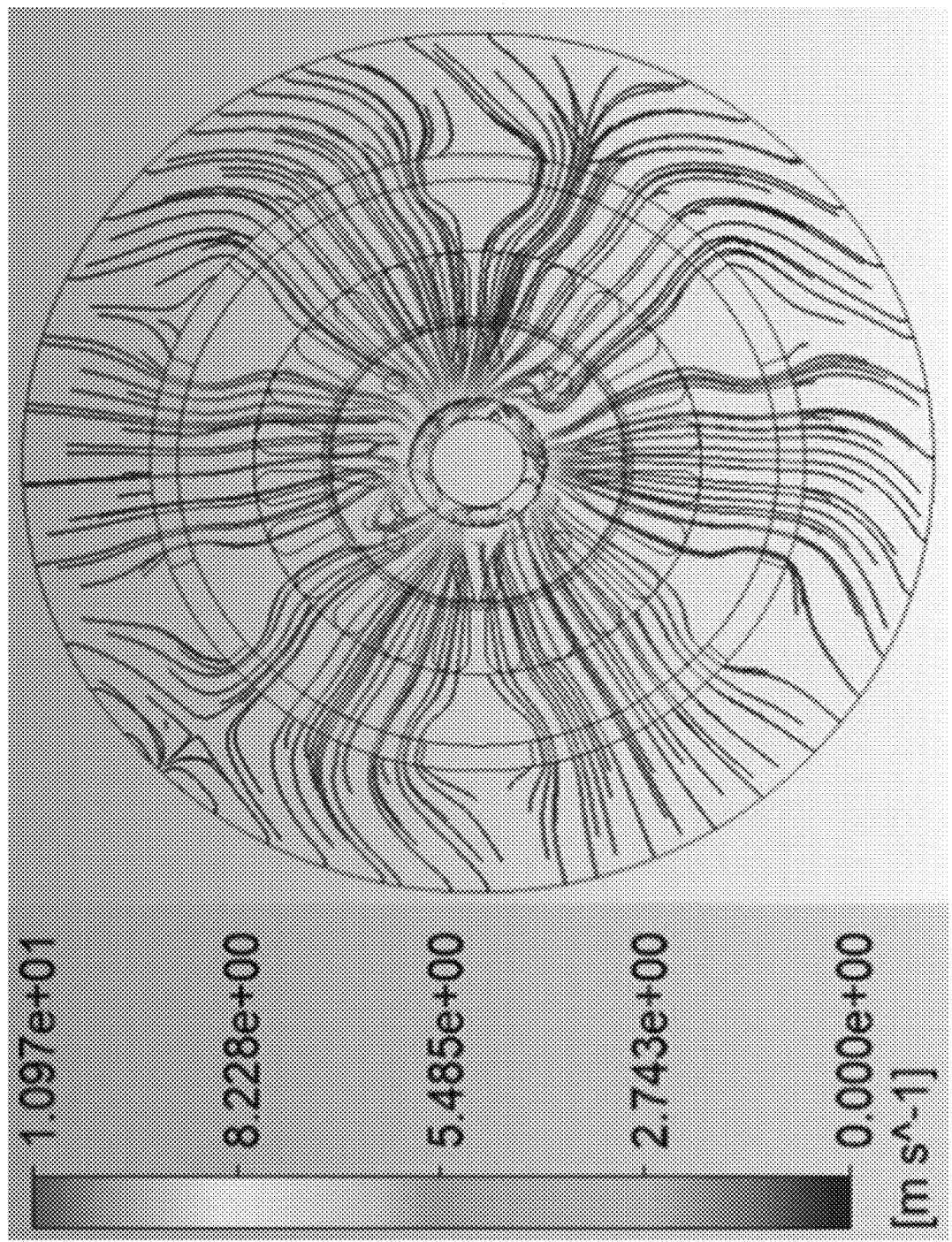
FIG. 44A shows a front view of an inlet air flow velocity pattern within the fourth housing of FIG. 43 with the electrical machine of FIG. 42 mounted inside the housing in accordance with an illustrative embodiment.
Figure 44B:
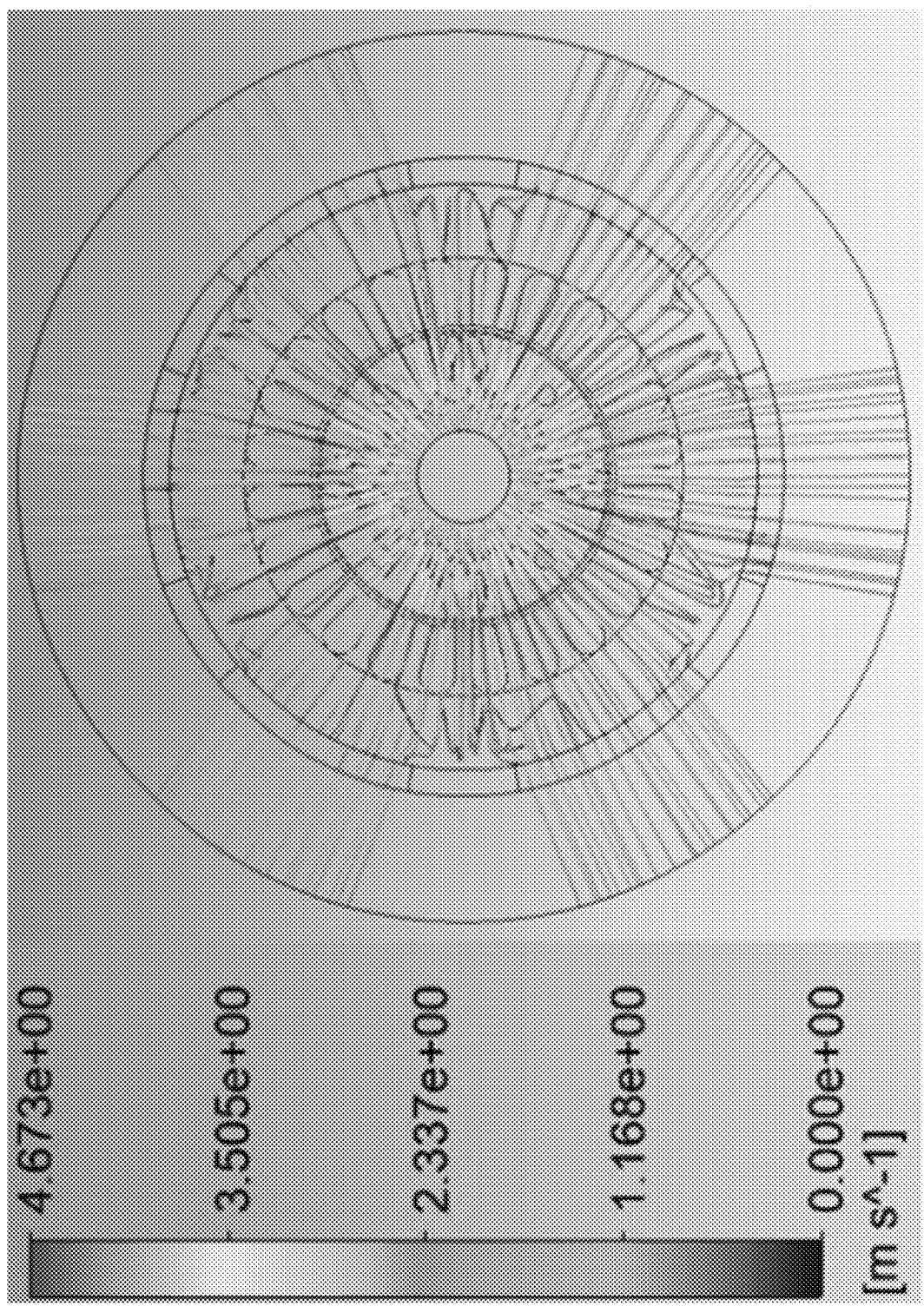
FIG. 44B shows a back view of an outlet air flow velocity pattern within the fourth housing of FIG. 43 with the electrical machine of FIG. 42 mounted inside the housing in accordance with an illustrative embodiment.

Referring to FIG. 44A, a front view is shown of an inlet air flow velocity pattern within second housing 4300 with sixth electrical machine 4200 mounted therein in accordance with an illustrative embodiment. Referring to FIG. 44B, a back view is shown of an outlet air flow velocity pattern within second housing 4300 with sixth electrical machine 4200 mounted therein in accordance with an illustrative embodiment.

Steady state thermal FEA was performed for sixth electrical machine 4200. The heat transfer coefficients associated with different surfaces are listed in Table 7.

TABLE 7

| Surface | Heat transfer coefficient [W/m²-k] | Surface | Heat transfer coefficient [W/m²-k] |
|---|---|---|---|
| Front end winding surface | 29 | Front rotor surface | 25 |
| Rear end winding surface | 18 | Rear rotor surface | 12 |
| Front stator surface | 22 | Rotor flux barrier surface | 16 |
| Rear stator surface | 9 | Air gap surface | 10 |
| Rotor blade hub surface | 100 | | |

The thermal analysis as conducted at 10 $A_{rms}$/mm² current density. The machine output power, losses, and maximum temperatures are shown in Table 8. Since for sixth electrical machine 4200, the losses on third rotor 4204 are minimal, the fourth plurality of magnets 4206 have a low temperature. Copper loss is the largest loss in sixth electrical machine 4200. As shown in Table 8, at 10 $A_{rms}$/mm² with self-cooling provided by hub 2300 and the radial inlet aperture walls 2610 and the radial outlet aperture walls 3900, the maximum winding temperature is 94-degrees Celsius. The maximum stator temperature is very close to the maximum winding temperature. Thus, even with a small fan zone with a minimum fan power, fifth stator 4202 and the end windings can still be effectively cooled by the produced airflow.

TABLE 8

| Current density [$A_{rms}$/mm²] | 10 | 10 |
|---|---|---|
| Cooling method | Self-cooling hub 2300/ second housing 4300 | No self-cooling |
| Output power [W] | 367 | 367 |
| Copper loss [W] | 22 | 43 |
| Stator iron loss [W] | 3.4 | 3.4 |
| Rotor iron loss [W] | 0.1 | 0.1 |
| Maximum winding temperature [° C.] | 94 | 453 |
| Maximum magnet temperature [° C.] | 107 | 467 |

Figure 45B:
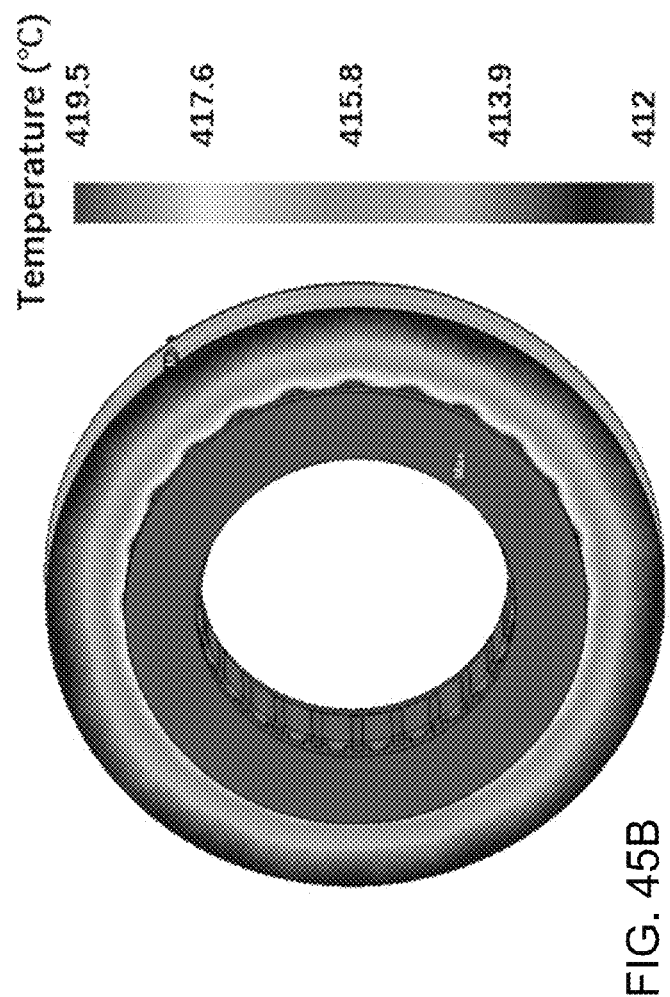
FIG. 45B shows a stator temperature distribution without the fourth housing in accordance with an illustrative embodiment.
Figure 45A:
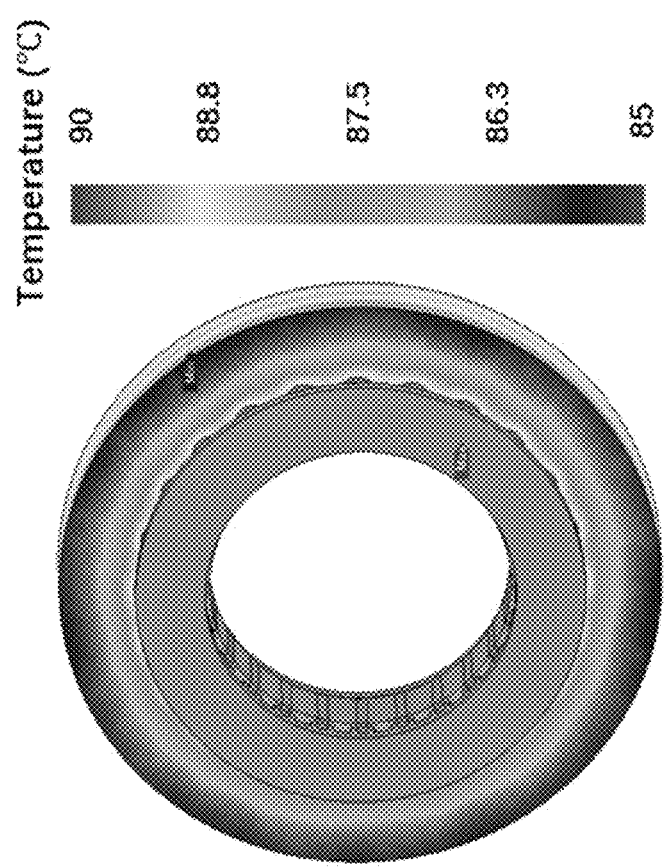
FIG. 45A shows a stator temperature distribution with the fourth housing of FIG. 43 in accordance with an illustrative embodiment.

Referring to FIG. 45A, a stator temperature distribution is shown for sixth electrical machine 4200 with self-cooling in accordance with an illustrative embodiment. Referring to FIG. 45B, a stator temperature distribution is shown for sixth electrical machine 4200 without self-cooling in accordance with an illustrative embodiment. FIGS. 45A and 45B shows the stator temperature distribution at 10 $A_{rms}$/mm². Without self-cooling, the maximum winding temperature under this operating condition can be as high as 453-degrees Celsius. This temperature is not attainable with copper wires. Without the cooling effect from the airflow, a more complex cooling scheme such as spray cooling of end windings may be necessary, which is more expensive and requires a complex arrangement that includes a pump for creating oil flow, scavenge system, filtering, etc.

As the current density of the electrical machine increases, adequate cooling is needed for windings, especially end windings, which are often the hot spots in the machine. Thermal management of the electrical machine's rotor is critical for permanent magnet machines to protect permanent magnets from demagnetization. For induction motors, where there are windings on the rotor, the temperature rise on the rotor needs to be limited to protect the winding insulation. Traditional cooling methods such as using a water jacket can effectively cool the stator iron from the machine's outer surface. However, the coolant cannot reach the rotor and end windings except by adding additional cooling paths, which will increase the machine's complexity. Oil-spray cooling is another common cooling method to cool the rotor, which also results in a complicated machine assembly structure. In addition, these methods also lead to a reduction of motor efficiency since the pump and the chiller consume a higher amount of power than a fan. These added components also increase the system volume and reduce the machine's power density. They also lower the system reliability.

The plurality of blades 118 and the second plurality of blades 118' solve these issues by combining a fan with the rotor structure to provide direct cooling to the rotor iron. With radial inlets on the housing, the end windings can also be effectively cooled by the airflow. The plurality of blades 118 and the second plurality of blades 118' further reduce the rotor weight. The area and position of inlets and outlets can be optimized to guide the flow to the hot spots that need cooling depending on the electrical machine architecture.

The term "air" is used herein to reference any gas. The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, in the detailed description, using "and" or "or" is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. An electrical machine comprising:
a rotor comprising
a rotor core configured to mount to a shaft for rotation of the rotor core and shaft together; and
a plurality of blades extending radially away from the rotor core;
a stator comprising
a stator core; and
a plurality of teeth extending from the stator core toward the rotor core, wherein the plurality of teeth defines a plurality of slots between successive teeth of the plurality of teeth;
a winding wound through the plurality of slots, wherein the stator is mounted radially relative to the rotor; and
a housing comprising
a front wall;
a back wall;
a radial sidewall mounted between the front wall and the back wall to define an enclosure;
a plurality of radial inlet aperture walls formed circumferentially around the radial sidewall; and
a plurality of radial outlet aperture walls formed circumferentially around the radial sidewall,
wherein an area of each of the plurality of radial outlet aperture walls is greater than an area of each of the plurality of radial inlet aperture walls,
wherein a number of the plurality of radial inlet aperture walls is same as a number of the plurality of radial outlet aperture walls.

2. The electrical machine of claim 1, wherein the plurality of radial inlet aperture walls are positioned above a front portion of the winding.

3. The electrical machine of claim 1, wherein the plurality of radial inlet aperture walls are evenly distributed circumferentially around the radial sidewall.

4. The electrical machine of claim 1, wherein the plurality of radial inlet aperture walls are aligned axially to encircle the radial sidewall.

5. The electrical machine of claim 1, wherein the area of each of the plurality of radial outlet aperture walls is greater than the area of each of the plurality of radial inlet aperture walls because an arclength of each of the plurality of radial outlet aperture walls is greater than an arclength of each of the plurality of radial inlet aperture walls.

6. The electrical machine of claim 1, wherein each radial inlet aperture wall of the plurality of radial inlet aperture walls has a radial arclength of greater than or equal to twenty degrees relative to a center of the rotor core.

7. The electrical machine of claim 6, wherein each radial inlet aperture wall of the plurality of radial inlet aperture walls has a radial arclength of less than or equal to 170 degrees relative to the center of the rotor core.

8. The electrical machine of claim 1, wherein each of the plurality of radial outlet aperture walls is axially offset from each of the plurality of radial inlet aperture walls between the front wall and the back wall.

9. The electrical machine of claim 1, wherein each radial outlet aperture wall of the plurality of radial outlet aperture walls is centered axially relative to a respective radial inlet aperture wall of the plurality of radial inlet aperture walls.

10. The electrical machine of claim 1, wherein the area of each of the plurality of radial outlet aperture walls is greater than the area of each of the plurality of radial inlet aperture walls because an axial width of each of the plurality of radial outlet aperture walls is greater than an axial width of each of the plurality of radial inlet aperture walls.

11. The electrical machine of claim 1, wherein each of the plurality of radial inlet aperture walls and each of the plurality of radial outlet aperture walls has an arc shape relative to a center of the radial sidewall.

12. The electrical machine of claim 1, further comprising an axial inlet aperture wall formed through the front wall to form a first opening through the front wall.

13. The electrical machine of claim 12, wherein a plurality of axial inlet aperture walls is formed through the front wall to form a plurality of openings through the front wall, wherein the axial inlet aperture wall is one of the plurality of axial inlet aperture walls.

14. The electrical machine of claim 13, wherein the plurality of axial inlet aperture walls is formed to align axially with the plurality of blades.

15. The electrical machine of claim 13, wherein each axial inlet aperture wall of the plurality of axial inlet aperture walls has a common shape and size with a radial arclength of greater than or equal to 75 degrees and less than or equal to 150 degrees relative to a center of the front wall.

16. The electrical machine of claim 13, further comprising a plurality of axial outlet aperture walls, wherein each axial outlet aperture wall of the plurality of axial outlet aperture walls is formed circumferentially through the back wall to form second openings through the back wall.

17. The electrical machine of claim 16, wherein each axial outlet aperture wall of the plurality of axial outlet aperture walls is centered axially relative to a respective axial inlet aperture wall of the plurality of axial inlet aperture walls.

18. An electrical machine comprising:
a hub comprising
a hub core configured to mount to a shaft for rotation; and
a plurality of blades extending radially away from the hub core;
a rotor core configured to mount to the plurality of blades;
a stator comprising
a stator core; and
a plurality of teeth extending from the stator core toward the rotor core, wherein the plurality of teeth defines a plurality of slots between successive teeth of the plurality of teeth;
a winding wound through the plurality of slots, wherein the stator is mounted radially relative to the rotor; and
a housing comprising
a front wall;
a back wall;
a radial sidewall mounted between the front wall and the back wall to define an enclosure, wherein the hub, the rotor core, and the stator are mounted within the enclosure;
a plurality of radial inlet aperture walls formed circumferentially around the radial sidewall; and
a plurality of radial outlet aperture walls formed circumferentially around the radial sidewall,
wherein an area of each of the plurality of radial outlet aperture walls is greater than an area of each of the plurality of radial inlet aperture walls,
wherein a number of the plurality of radial inlet aperture walls is same as a number of the plurality of radial outlet aperture walls.

19. The electrical machine of claim 18, wherein the plurality of radial inlet aperture walls are positioned above a front portion of the winding.

20. The electrical machine of claim 18, wherein the plurality of radial inlet aperture walls are evenly distributed circumferentially around the radial sidewall.

* * * * *

UNITED STATES PATENT AND TRADEMARK OFFICE
CERTIFICATE OF CORRECTION

| | | |
|---|---|---|
| PATENT NO. | : 12,355,328 B2 | Page 1 of 1 |
| APPLICATION NO. | : 17/937798 | |
| DATED | : July 8, 2025 | |
| INVENTOR(S) | : Bulent Sarlioglu et al. | |

It is certified that error appears in the above-identified patent and that said Letters Patent is hereby corrected as shown below:

In the Claims

<u>Claim 18, Column 32, Line 47:</u>
Delete the phrase "the rotor;" and replace with --the rotor core;--.

Signed and Sealed this
Fourteenth Day of October, 2025

John A. Squires
*Director of the United States Patent and Trademark Office*